(12) United States Patent
Marsden et al.

(10) Patent No.: US 10,717,754 B2
(45) Date of Patent: Jul. 21, 2020

(54) METAL COMPLEXES

(71) Applicant: University of Leeds, Leeds (GB)

(72) Inventors: Stephen Philip Marsden, Leeds (GB);
Patrick Columba McGowan, Leeds (GB); Roberta Lanaro, Leeds (GB);
Andrew John Blacker, Leeds (GB)

(73) Assignee: University of Leeds (GB)

( * ) Notice: Subject to any disclaimer, the term of this patent is extended or adjusted under 35 U.S.C. 154(b) by 0 days.

(21) Appl. No.: 16/063,049

(22) PCT Filed: Dec. 19, 2016

(86) PCT No.: PCT/GB2016/053986
§ 371 (c)(1),
(2) Date: Jun. 15, 2018

(87) PCT Pub. No.: WO2017/103623
PCT Pub. Date: Jun. 22, 2017

(65) Prior Publication Data
US 2018/0362566 A1 Dec. 20, 2018

(30) Foreign Application Priority Data
Dec. 18, 2015 (GB) .................................. 1522437.1

(51) Int. Cl.
C07F 15/00 (2006.01)
C07F 17/00 (2006.01)
B01J 31/18 (2006.01)
B01J 31/24 (2006.01)

(52) U.S. Cl.
CPC ....... *C07F 15/0033* (2013.01); *B01J 31/1815* (2013.01); *B01J 31/2433* (2013.01); *C07F 15/0073* (2013.01); *C07F 17/00* (2013.01); *B01J 2531/822* (2013.01); *B01J 2531/827* (2013.01)

(58) Field of Classification Search
CPC combination set(s) only.
See application file for complete search history.

(56) References Cited

U.S. PATENT DOCUMENTS
6,372,931 B1 4/2002 Blacker et al.

FOREIGN PATENT DOCUMENTS
CN 1618822 A 5/2005
WO WO-2007109365 A2 9/2007
WO WO-2009093059 A2 7/2009

OTHER PUBLICATIONS

Ito et al. Organonnet. 2010, 29, 1886-1889. (Year: 2010).*
Chemical Abstract Service STN Database, Registry No. 910910-81-5 [Entered STN: Oct. 21, 2006]. (Year: 2006).*
Jutzi et al. J. Organomet. Chem. 1995, 500, 175-185. (Year: 1995).*
Ito et al. Organometallics 2010, 29, 1886-1889. (Year: 2010).*
Kitamura et al. J. Org. Chem. 2002, 67, 8685-8687. (Year: 2002).*
Reiner et al. J. Organonnet. Chem. 2009, 694, 1934-1937. (Year: 2009).*
Batuecas, M., et al., "Redox Isomerization of Allylic Alcohols Catalyzed by Osmium and Ruthenium Complexes Containing a Cyclopentadienyl Ligand with a Pendant Amine or Phosphoramidite Group: X-ray Structure of an $\eta^3$-1-Hydroxyallyl-Metal-Hydride Intermediate", Organometallics, vol. 29, No. 9, (2010), pp. 2166-2175.
Grotjahn, D., et al., "High Arenophilicity and Water Tolerance in Direct Derivatization of Peptides and Proteins by Metal $\pi$-Coordination", Journal of the American Chemical Soceity, vol. 120, No. 45, (1998), pp. 11814-11815.
Hanasaka, F., et al., "Synthesis of New Iridium N-Heterocyclic Carbene Complexes Bearing a Functionalized Cp* Ligand and Their High Catalytic Activities in the Oppenauer-Type Oxidation of Alcohol", Organometallics, vol. 25, No. 19, (2006), pp. 4643-4647.
International Search Report for PCT/GB2016/053986 dated Mar. 20, 2017.
Ito, M., et al., "Synthesis and Structure of Protic Amine Tethered Rhodium(III) Peralkylcyclopentadienyl Complexes", Organometallics, vol. 29, No. 8, (2010), pp. 1886-1889.
Jutzi, P., et al., "Rhodium and Iridium Complexes with the 1-(2-(Dimethylamino)ethyl)-2,3,4,5-tetramethylcyclopentadienyl Ligand", Organometallics, vol. 13, No. 9, (1994), pp. 3854-3861.
Leong, W.L.J., et al., "Synthesis of cyclopentadienyl ruthenium(II) complexes containing tethered functionalities", Inorganica Chimica Acta, vol. 362, No. 6, (2009), pp. 2089-2092.
Li, L., et al., "Chelate ring closing and opening behavior in cyclopentadienyl cobalt(III) complexes with pendant nitrogen functional group", Journal of Organometallic Chemistry, vol. 695, No. 4, (2010), pp. 588-594.
Molander, G., et al., "Chromium(III) catalyzed synthesis of allenes from propargyl detrivatives via a carbometalation-elimination sequence", Tetrahedron Letters, vol. 46, No. 13, (2005), pp. 2345-2349.
Search Report for patent application GB1522437.1 issued by the Intellectual Property Office (UK) dated Nov. 1, 2016.
Varela-Fernández, A., et al., "Osmium-Catalyzed 7-endo Heterocyclization of Aromatic Alkynols into Benzoxepines", Angewandte Chemie International Edition, vol. 49, No. 25, (2010), pp. 4278-4281.

(Continued)

*Primary Examiner* — Amanda L. Aguirre
(74) *Attorney, Agent, or Firm* — Faegre Drinker Biddle & Reath LLP

(57) ABSTRACT

Metal complexes such as those of formula (I) are contemplated by the present invention. The metal complexes may be used in catalytic reactions as a catalyst. The catalytic reaction may be an autotransfer process, for example hydrogen borrowing. Improved catalytic activity has been observed with certain metal complexes of the invention.

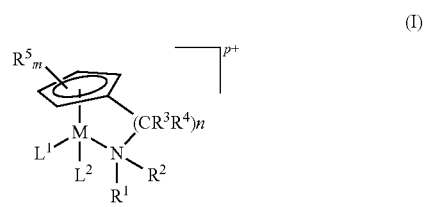

(I)

17 Claims, 12 Drawing Sheets

(56) References Cited

OTHER PUBLICATIONS

Written Opinion of the International Searching Authority for PCT/GB2016/053986 dated Mar. 20, 2017.

Xu, J., et al., "Constrained geometry nitrogen-functionalised diphenylcyclopentadienyl chromium (III) complex: synthesis, structure and catalytic properties for ethylene polymerisation", Journal of Chemical Research, vol. 9, (2006), pp. 552-554.

Ito, M., et al., "Bifunctional Triflylamide-Tethered $C_p$'Rh and $C_p$'Ir Complexes: A New Entry for Asymmetric Hydrogenation Catalysts", Organometiallics, 2010, vol. 29, pp. 2397-2399.

\* cited by examiner

US 10,717,754 B2

METAL COMPLEXES

CROSS-REFERENCE TO RELATED APPLICATIONS

This application is a national stage application (under 35 U.S.C. § 371) of PCT/GB2016/053986, filed Dec. 19, 2016, which claims benefit of British Application No. 1522437.1, filed Dec. 18, 2015, both of which are incorporated herein by reference in their entirety.

This invention relates to metal complexes. The metal complexes comprise a tethered ligand. The metal complexes may be used in catalytic reactions as a catalyst. The catalytic reaction may be an autotransfer process, for example hydrogen borrowing.

BACKGROUND

In the literature, both heterogeneous and homogeneous catalysts have been reported to promote a hydrogen autotransfer process or hydrogen borrowing. Heterogeneous catalysts have some advantages over homogeneous ones, such as their greater ease of recovery from the reaction mixture. However, high pressures and temperatures are often required and, therefore, the use of homogeneous catalysts frequently allows reactions to occur at a lower temperature and with higher selectivity than heterogeneous catalysts.

Grigg and co-workers reported the first hydrogen borrowing reaction via homogeneous catalysis in 1981 (R. Grigg, T. R. B. Mitchell, S. Sutthivaiyakit and N. Tongpenyai, *J. Chem. Soc. Chem. Commun.*, 1981, 611-812). The authors achieved the N-alkylation of amines by alcohols using metal-phosphine complexes generated in situ and preformed metal-phosphine catalysts. Iridium, ruthenium and rhodium complexes have been examined and the best results were obtained with preformed rhodium-phosphine complex, RhH(PPh$_3$)$_4$. The substrate scope was limited to relatively volatile alcohols only.

Since this first example reported by Grigg et al., a great effort has been made to develop better catalysts for the alkylation of amines. Several other complexes were synthesised and tested in hydrogen borrowing reactions. The catalysts which gave the best activities and yields included ruthenium-based catalysts.

In 1982 Murahashi and co-workers demonstrated that aliphatic amines were competent substrates for N-alkylation with alcohols using a [RuH$_2$(PPh$_3$)$_4$] catalyst (S.-I. Murahashi, K. Kondo and T. Hakata, *Tetrahedron Lett.*, 1982, 23, 229-232) and aryl amines with [RuCl$_2$(PPh$_3$)$_3$]. The substrate scope in these two examples was still quite limited and the reaction conditions were harsh, requiring a high temperature (180° C.).

More recently, better catalytic systems have been reported. Williams and co-workers demonstrated that [Ru(p-cymene)Cl$_2$]$_2$, activated by the addition of either bis(diphenylphosphino)ferrocene (dppf) or DPEphos, was an active catalyst system for the alkylation of amines by primary alcohols (summarised in M. H. S. A. Hamid, C. L. Allen, G. W. Lamb, A. C. Maxwell, H. C. Maytum, A. J. A. Watson and J. M. J. Williams, *J. Am. Chem. Soc.*, 2009, 131, 1766-1774). The addition of an additive, one of the phosphine ligands, was paramount to achieve good yield. When [Ru(p-cymene)Cl$_2$]$_2$ was used alone as the catalyst, the N-alkylation proceeded slowly. This catalytic system showed a broad tolerance of functional groups but it did not work when secondary alcohols were used as the substrate. The addition of a further ligand to promote the reaction is undesirable. Furthermore, the reliance on the additive to provide a viable reaction rate is undesirable. Therefore, it is an aim of certain embodiments of the present invention to remove the need for inclusion of additional ligands.

Beller and co-workers further improved this family of ruthenium complexes, reporting that [Ru$_3$(CO)$_{12}$] promotes the N-alkylation of primary and secondary amines using both primary and secondary alcohols (A. Tillack, D. Hollmann, D. Michalik and M. Beller, *Tetrahedron Lett.*, 2006, 47, 8881-8885 and A. Tillack, D. Hollmann, K. Mevius, D. Michalik, S. Bähn and M. Beller, *European J. Org. Chem.*, 2008, 4745-4750). To obtain higher yields, a phosphine ligand was added in a catalytic amount.

The dimeric iridium complex $\eta^5$-(pentamethylcyclopentadienyl)iridium(III) dichloride [Cp*IrCl$_2$]$_2$, has also been applied in hydrogen borrowing (for a review, see K. Fujita and R. Yamaguchi, *Synlett*, 2005, 560-571). This iridium dimer has been efficaciously used in the N-alkylation of primary and secondary amines. Primary and secondary alcohols could be used, though with bulky substrates the catalyst loading was increased up to 5 mol % of iridium in order to obtain the products in high yield. Functional groups that could be tolerated were quite broad and included both electron-withdrawing and electron-donating groups, such as ethers, esters, halogens, nitro groups and nitrile groups.

Other iridium complexes, such as the dimer [Cp*IrI$_2$]$_2$, (SCRAM), have shown a better activity in protic solvents, such as water and t-amyl alcohol.

One of the first examples was the dimer [Cp*IrI$_2$]$_2$, (SCRAM), which gave good yields in water and proceeded without adding base (O. Saidi, A. J. Blacker, M. M. Farah, S. P. Marsden and J. M. J. Williams, *Chem. Commun.*, 2010, 46, 1541-1543).

Recently, a monomeric iridium catalysthas showed high activity in the N-alkylation reaction using water as the solvent (R. Kawahara, K. Fujita and R. Yamaguchi, *Adv. Synth. Catal.*, 2011, 353, 1161-1168). The substrate scope was broad; however, a high concentration is required (7 M) in order to achieve high yields and secondary alcohols could efficaciously be used only for the alkylation of primary amines.

In order to improve the activity of catalysts used in hydrogen borrowing new iridium complexes containing N-heterocyclic carbenes (NHCs) were investigated (A. da Costa, M. Viciano, M. Sanaú, S. Merino, J. Tejeda, E. Peris and B. Royo, *Organometallics*, 2008, 27, 1305-1309; A. Prades, R. Corberan, M. Poyatos and E. Peris, *Chem.—A Eur. J.*, 2008, 14, 11474-11479; D. Gnanamgari, E. L. O. Sauer, N. D. Schley, C. Butler, C. D. Incarvito and R. H. Crabtree, *Organometallics*, 2009, 28, 321-325). The yields obtained with these catalysts were comparable to results obtained with [Cp*IrCl$_2$]$_2$, but the substrate scope was more limited.

Generally, the iridium dimer [Cp*IrCl$_2$]$_2$ is accepted to be a potent catalyst for hydrogen borrowing processes.

The present invention aims to provide alternative metal complexes preferably with improved catalytic activity. It is an aim of the present invention to provide a metal complex which has improved (i.e. reduced) loading of the metal complex in a catalytic reaction. It is also an aim of the present invention to increase the rate of catalytic reactions comprising a metal complex of the invention. The invention aims to achieve these improvements with a high tolerability to functional groups on substrates, substitution on substrates, primary or secondary alcohols and primary or secondary amines, the substrates, alcohols and amine being present in a catalytic reaction mediated by the metal complex of the invention. Prior art metal complexes have demonstrated limited tolerance to solvents. Therefore, the invention aims to provide metal complexes with catalytic activity in a range of solvents, such as in polar solvents, dipolar solvents and apolar solvents, for example water and other aprotic solvents, DMF, NMP or DMSO. Certain embodiments of the invention aim to potentially provide enantioselective methodologies to prepare chiral amines.

The present invention satisfies some or all of the above aims and overcomes problems of the prior art.

BRIEF SUMMARY OF THE DISCLOSURE

In accordance with the present invention there is provided a metal complex with a tethered ligand. The tethered ligand may be a substituted or unsubstituted cyclopentadienylalkylamine, for example a tetramethyl-cyclopentadienylalkylamine. In a first aspect of the invention there is provided a metal complex of formula (I)

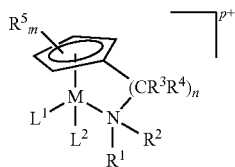

(I)

wherein
M is a transition metal;
$L^1$ and $L^2$ are independently selected from: a halogen, a nitrile, an amine, a phosphine, a phosphite, a sulfonate ester, a N-heterocyclic carbene or a 5 or 6 membered heterocyclic ring or $L^1$ and $L^2$ taken together are a bidentate ligand selected from: a diamine, a diphosphine, a diphosphite, a disulfonate ester, an amino acid or derivative thereof, an amino alcohol, aminosulfonamides, an N-heterocyclic carbene, a diketonate and substituted or unsubstituted bipyridine,
wherein $L^1$ and $L^2$ groups are unsubstituted or optionally substituted by halo, $C_{1-4}$ alkyl, $C_{1-4}$ haloalkyl, $-OR^4$, $-NR^AR^B$, $-CN$, $-SO_2R^A$;
$R^1$ and $R^2$ are each independently represented by H, substituted or unsubstituted: $C_{1-14}$ alkyl, $C_{1-14}$ haloalkyl, $C_{3-8}$ carbocyclic, and a 3 to 8 membered heterocyclic ring, $C_{1-14}$ alkyl substituted with phenyl, fluorous tag, or a solid support,
or $R^1$ and $R^2$ together form a 3 to 8 membered heterocyclic ring;
$R^3$ and $R^4$ are each independently selected from: H, halo, $C_{1-6}$ alkyl, $C_{1-6}$ haloalkyl, $C_{3-8}$ cycloalkyl, and $-OR^{41}$;
or $R^3$ and $R^4$ along with the shared, adjacent or non-adjacent carbon atoms to which they are attached together form a 3 to 8 membered carbocyclic ring (optionally a 5 or 6 membered carbocyclic ring),
or one of $R^1$ and $R^2$ and one of $R^3$ and $R^4$, together with the atoms to which they are attached, form a 3 to 8 membered heterocyclic ring;
$R^5$ is selected from halo, $C_{1-6}$ alkyl, $C_{1-6}$ haloalkyl and $C_{3-6}$ cycloalkyl, $C_6$ aryl or 5 or 6 membered heteroaryl
or two adjacent $R^5$ groups, together with the atoms to which they are attached, form a 5 or 6 membered carbocyclic ring;
p is 0 or 1 or more;
n is selected from 1 to 10;
m is selected from 0, 1, 2, 3 or 4;
$R^A$, $R^B$ and $R^{41}$ are at each occurrence independently selected from: H, $C_{1-6}$ alkyl or $C_{1-6}$ haloalkyl.

As is evident to the skilled person the metal complex of formula (I) may be a non-ionic or a cationic molecule depending on the value of p. When p is 0, the metal complex of formula (I) is non-ionic. When p is 1 or 2 the metal complex is cationic. In embodiments p is 0 or 2. In embodiments p is 0. In embodiments p is 2. When p is 1 or 2 the metal complex may be a compound according to formula (II). Accordingly, the present invention provides a compound according to formula (II):

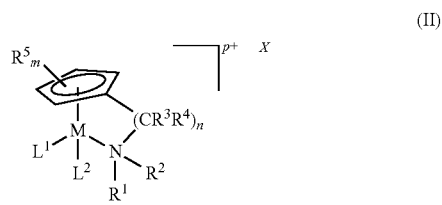

(II)

wherein X is 1, 2 or 3 anion molecules, p is 1 or more, and other groups take on the definition as defined elsewhere herein.

X may be selected from any 1, 2 or 3 suitable monoanionic, dianionic or trianionic molecule. X may be selected from hydroxide, fluoride, chloride, bromide, iodide, acetate, formate, fluorate, fluorite, bromate, bromite, iodate, iodite, chlorate, chlorite, hydrogen carbonate, hypofluorite, hypochlorite, hypobromite, hypoiodite, perfluorate, perchlorate, perbromate, periodate, chromate, cyanate, cyanide, dihydrogen phosphate, dihydrogen phosphite, nitrate, hydrogen oxalate, hydrogen sulfate, hydrogen sulfite, permanganate, nitrite, thiocyanate, hydride, hexafluorophosphate, hexafluoroantiminate, tetrafluoroborate, peroxide, $[B[3,5-(CF_3)_2C_6H_3]_4]^-$ (BARF), $B(C_6F_5)_4^-$, $Al(OC(CF_3)_3)_4^-$. sulfate, sulfite, sulfide, persulfate, thiosulfate, hyposulfite, hydrogen phosphate, hydrogen phosphite, metasilicate, carbonate, percarbonate, oxalate, benzoate, tartrate, borate, boride, citrate, hypophosphite, nitride, phosphate, phosphide, and phosphite.

Optionally, X may be 1, 2 or 3 (optionally 1 or 2) anion molecules selected from: fluoride, chloride, bromide, iodide, hexafluorophosphate, hexafluoroantimonate or tetrafluoroborate.

Preferably, X may represent the presence of 1 or 2 anion molecules. The number of molecules is dependent on the charge on the metal complex and the charge on the anion. For example, p may be 2, the metal complex therefore has a charge of +2, and the anion may be any of X mentioned above, optionally fluoride, chloride, bromide, iodide hexafluorophosphate, hexafluoroantiminate or tetrafluoroborate, which both have a −1 charge; therefore, X may represent 2 Cl, $2PF_6$, $2BF_4$ or 2 $SbF_6$.

Equally p may be 1 and X may therefore represent one of each of: Cl, $PF_6$, $BF_4$ or $SbF_6$.

X may represent Cl, $PF_6$, $BF_4$, $SbF_6$, 2Cl, $2PF_6$, $2BF_4$ or $2SbF_6$.

Optionally, $R^5$ is $C_{1-6}$ alkyl, e.g. methyl. Optionally, m is 0 or 4, e.g. 4.

In a preferred embodiment m is 4 and $R^5$ is methyl. Therefore, the cyclopentadienyl ring of formula (I) may be a tetramethylcyclopentadienyl ring. Therefore, in a preferred embodiment the metal complex of formula (I) is a metal complex according to formula (III):

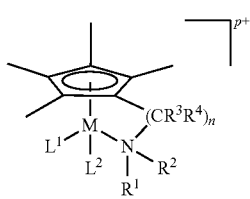

(III)

Any cationic compound disclosed herein may further comprise X, being 1, 2, or 3 (optionally 1 or 2) anion molecules. The metal complex of formula (III) can be a metal complex according to formula (IVa) or (IVb):

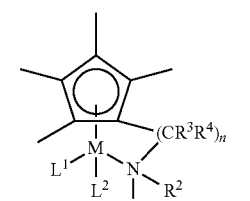

(IVa)

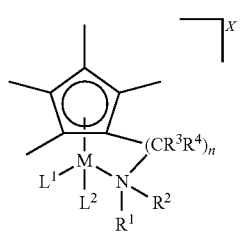

(IVb)

M may be ruthenium, rhodium, iridium, cobalt, nickel, palladium, platinum, iron or osmium. M may be ruthenium, rhodium, iridium, cobalt, nickel, palladium, or platinum. In a preferred embodiment, M is iridium or rhodium. Optionally, M is iridium.

In embodiments where the compound is a compound according to formula (IVa) M is iridium and n is 3. In embodiments where the compound is a compound according to formula (IVb) M is iridium or rhodium. In embodiments where the compound is a compound according to formula (IVb) M is iridium or rhodium and X represents 1 or 2 anions selected from definitions of X found elsewhere herein, e.g. Cl, $PF_6$, $BF_4$, $SbF_6$, 2Cl, $2PF_6$, $2BF_4$ or $2SbF_6$.

$L^1$ and $L^2$ may be independently selected from: a halogen, a nitrile, an amine, a phosphine or a 5 or 6 membered heterocyclic ring or $L^1$ and $L^2$ taken together are a bidentate ligand selected from: a diamine, a diphosphine, and substituted or unsubstituted bipyridine, wherein $L^1$ and $L^2$ groups are unsubstituted or optionally substituted by halo, $C_{1-4}$ alkyl, $C_{1-4}$ haloalkyl, $-OR^A$, $-NR^AR^B$, $-CN$, $-SO_2R^A$.

$L^1$ and $L^2$ are independently selected from: halo, $C_{1-10}$ alkylnitriles, $C_{6-10}$ arylnitriles, $C_{3-10}$ cycloalkylnitriles, $C_{5-10}$ heteroarylnitriles, $C_{3-10}$ heterocycloalkylnitriles, bipyridine, $C_{1-10}$ alkylamines, $C_{6-10}$ arylamines, $C_{3-10}$ cycloalkylamines, $C_{5-10}$ heteroarylamines, $C_{3-10}$ heterocycloalkylamines, $C_{1-10}$ alkylphosphines, $C_{6-10}$ arylphosphines, $C_{3-10}$ cycloalkylphosphines, $C_{5-10}$ heteroarylphosphines, $C_{3-10}$ heterocycloalkylphosphines, $C_{1-10}$ alkylsulfonates, $C_{6-10}$ arylsulfonates, $C_{3-10}$ cycloalkylsulfonates, $C_{5-10}$ heteroarylsulfonates, $C_{3-10}$ heterocycloalkylsulfonates, $C_{3-6}$ cycloalkylphosphines, a $C_{1-10}$ alkylsulfonate ester, a N-heterocyclic carbene or a pyrrolyl, pyrazolyl, imidazolyl, pyridyl, pyridazinyl, pyrimidinyl, pyrazinyl, or $L^1$ and $L^2$ taken together are a bidentate ligand selected from: bipyridine, $C_{1-10}$ alkyldiamine, $C_{6-10}$ aryldiamine, $C_{3-10}$ cycloalkyldiamine, $C_{5-10}$ heteroaryldiamine, $C_{3-10}$ heterocycloalkyldiamine, $C_{1-10}$ alkyldiphosphine, $C_{6-10}$ aryldiphosphine, $C_{3-10}$ cycloalkyldiphosphines, $C_{5-10}$ heteroaryldiphosphines, $C_{3-10}$ heterocycloalkyldiphosphines, $C_{1-10}$ alkyldisulfonates, $C_{6-10}$ aryldisulfonates, $C_{3-10}$ cycloalkyldisulfonates, $C_{5-10}$ heteroaryldisulfonates, $C_{3-10}$ heterocycloalkyldisulfonates, amino acids (encompassing all 20 proteinogenic amino acids, non-natural alpha-amino acids such as phenylglycines and tert-leucine, and beta-amino acids such as 3-aminopropionic acid) or derivatives thereof, N-heterocyclic carbenes including imidizalolylidene, imidazolinylidene, thiazolylidene, oxazolylidene, triazolylidene, benzimidazolylidene, pyrrolidinylidene, 'abormal' imidazolylidene or diamidocarbene carbenes, and diketonates such as acetylacetonates, 1-aryl-1,3-butanedionates, 1-heteroaryl-1,3-butanedionates, 1,3-diaryl-1,3-propanedionate, 1,3-diheteroaryl-1,3-propanedionates and 1-aryl,3-heteroaryl-1,3-propanedionates; wherein the $L^1$ and $L^2$ groups are unsubstituted or optionally substituted by halo, $C_{1-4}$ alkyl, $C_{1-4}$ haloalkyl, $-OR^A$, $-NR^AR^B$, $-CN$, $-SO_2R^A$.

$L^1$ and $L^2$ may be independently selected from: a halogen, $C_{1-10}$ alkylnitriles, $C_{6-10}$ arylnitriles, $C_{1-10}$ alkylamines, $C_{6-10}$ arylamines, a phosphine or a 5 or 6 membered heterocyclic ring or $L^1$ and $L^2$ taken together are a bidentate ligand selected from: $C_{1-10}$ alkyldiamine, $C_{6-10}$ aryldiamine, a diphosphine, and substituted or unsubstituted bipyridine; wherein $L^1$ and $L^2$ groups are unsubstituted or optionally substituted by halo, $C_{1-4}$ alkyl, $C_{1-4}$ haloalkyl, $-OR^A$, $-NR^AR^B$, $-CN$, $-SO_2R^A$.

$L^1$ and $L^2$ may be independently selected from: a halogen, $C_{1-10}$ alkylnitriles, $C_{6-10}$ arylnitriles, $C_{1-10}$ alkylamines, $C_{6-10}$ arylamines, a phosphine or a 5 or 6 membered heterocyclic ring or $L^1$ and $L^2$ taken together are a bidentate ligand selected from: $C_{1-10}$ alkyldiamine, $C_{6-10}$ aryldiamine, a $C_{1-10}$ alkyldiphosphine, and substituted or unsubstituted bipyridine; wherein $L^1$ and $L^2$ groups are unsubstituted or optionally substituted by halo, $C_{1-4}$ alkyl, $C_{1-4}$ haloalkyl, $-OR^A$, $-NR^AR^B$, $-CN$, $-SO_2R^A$.

$L^1$ and $L^2$ are independently selected from: halo, $C_{1-10}$ alkylnitriles, or a 5 or 6 membered heteroaryl ring or $L^1$ and $L^2$ taken together are bipyridine or $C_{1-10}$ alkyldiphosphine (e.g. $Ph_2PCH_2PPh_2$).

$L^1$ and $L^2$ are independently selected from: chloro, iodo, acetonitrile, or pyridine or $L^1$ and $L^2$ taken together are bipyridine or $Ph_2PCH_2PPh_2$.

In a preferred embodiment $L^1$ and $L^2$ are chloro, iodo or acetonitrile.

In embodiments, p may be 0, 1, 2, or 3. Optionally, p may be 0 or 2

Where p is 0, $L^1$ and $L^2$ are preferably halo, for example Cl. Where p is 2, $L^1$ and $L^2$ are preferably acetonitrile.

Where p is not 0, $L^1$ and $L^2$ may be ligands capable of forming a dative covalent bond to the metal center. Accordingly, when p is not 0, the $M-L^1$ and $M-L^1$ bonds may be dative covalent bonds.

$R^1$ and $R^2$ may be independently selected from: H, methyl, ethyl, phenyl, benzyl, iso-propyl, tert-butyl, a fluorous tag, a solid support or one of $R^1$ and $R^2$ and one of $R^3$ and $R^4$ together with the atoms to which they are attached form a 5 or 6 membered heterocyclic ring. In an embodiment $R^1$ is H and $R^2$ is selected from: H, methyl, ethyl, phenyl, benzyl, iso-propyl, tert-butyl, a fluorous tag, a solid support or $R^2$ and one of $R^3$ and $R^4$ together with the atoms to which they are attached form a 5 or 6 membered heterocyclic ring. The fluorous tag may be $CH_2CH_2OCH_2CH_2C_8F_{17}$.

$R^1$, $R^3$ and $R^4$ may be H and $R^2$ may be selected from: H, methyl, ethyl, phenyl, benzyl, iso-propyl, tert-butyl, a fluorous tag, and a solid support or $R^2$ and an $R^3$ on an atom adjacent to the N atom bearing $R^1$ and $R^2$, together with the atoms to which $R^2$ and the $R^3$ are attached form a 5 or 6 membered heterocyclic ring.

Alternatively, $R^1$ and $R^2$ may be independently selected from H, methyl, ethyl, phenyl, benzyl, iso-propyl, tert-butyl, a fluorous tag, or a solid support, and $R^3$ and $R^4$ are each independently selected from: H, methyl, propyl, iso-propyl, cyclopropyl or tert-butyl, or $R^3$ and $R^4$ along with the shared, adjacent or non-adjacent carbon atoms to which they are attached together form a 5 or 6 membered carbocyclic ring.

Preferably, $R^1$ and $R^2$ are selected from H and Me. In embodiments at least one of $R^1$ and $R^2$ is H. Thus, in embodiments the invention does not encompass complexes where $R^1$ and $R^2$ are both not H.

$R^3$ and $R^4$ may be H, $C_{1-6}$ alkyl, cycloalkyl, phenyl or a 5 or 6 membered heteroaryl ring or one of $R^1$ and $R^2$ and one of $R^3$ and $R^4$ together with the atoms to which they are attached form a 3 to 8 membered ring, or $R^3$ and $R^4$ and the shared, adjacent or non-adjacent carbon atoms to which they are attached form a 3 to 8 membered (preferably 5 or 6 membered) cycloalkyl or cycloalkylene ring or a phenyl ring. $R^3$ and $R^4$ may be H, methyl, propyl, iso-propyl, cyclopropyl or tert-butyl. Preferably, $R^3$ and $R^4$ are H and iso-propyl. In embodiments, n is 1 to 6, optionally 1 to 4. In a preferred embodiment n is 2, 3 or 4. Particularly preferred is for n to be 3. In embodiments n is 3 and $R^3$ and $R^4$ are H. In certain embodiments n is 3 when p is 0 and n is 3 to 6 when p is not 0.

As will be appreciated by the skilled person, where $R^3$ and $R^4$ and the shared carbon atom to which they are attached form a ring, the ring will have the appearance of a spirocyclic ring. For example, such as the structure shown below:

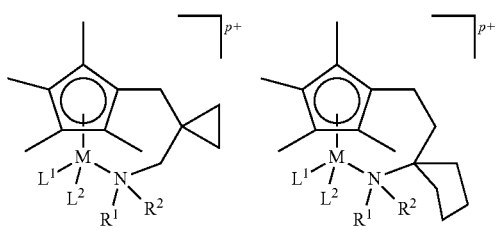

As will be appreciated by the skilled person, where $R^3$ and $R^4$ and the adjacent carbon atom to which they are attached form a ring, the ring might have the appearance of a structure shown below, for example:

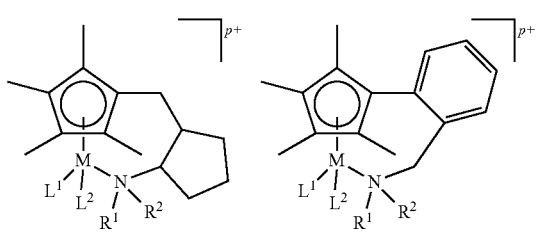

As will be appreciated by the skilled person, where $R^3$ and $R^4$ and the non-adjacent carbon atom to which they are attached form a ring, the ring might have the appearance of a structure shown below, for example:

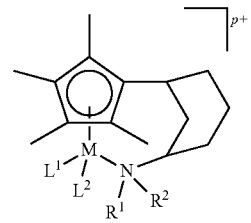

In a preferred embodiment the metal complex of formula (I) is a metal complex according to formula (V):

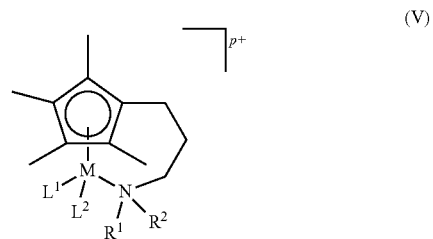

In a preferred embodiment $L^1$ and $L^2$ are chloro, iodo or acetonitrile, $R^1$ and $R^2$ are selected from H and Me, and p is 0 or 2. In a preferred embodiment $L^1$ and $L^2$ are chloro, iodo or acetonitrile, $R^1$ and $R^2$ are selected from H and Me, and p is 0 or 2 and when p is 2 X is present and X represents 2Cl or $2SbF_6$.

Metal complexes of the invention are:

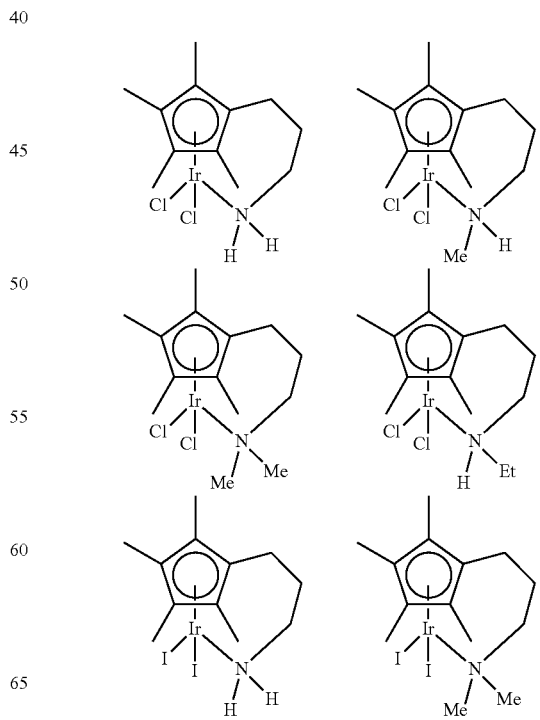

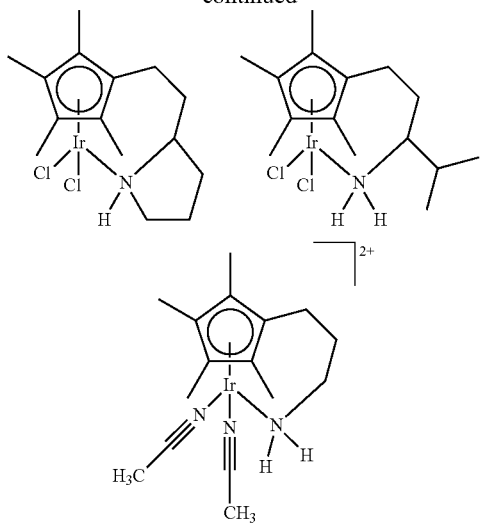
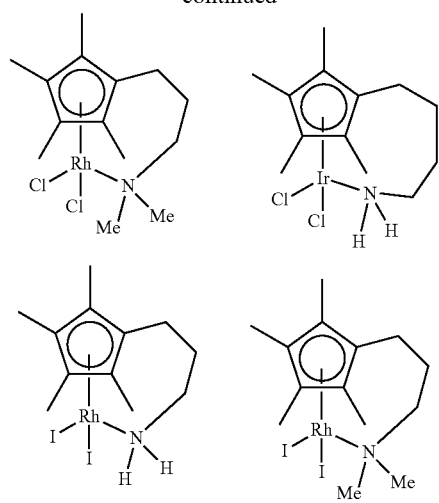
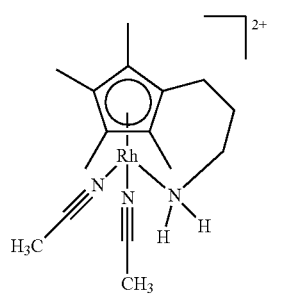
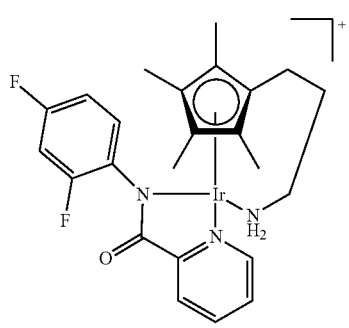
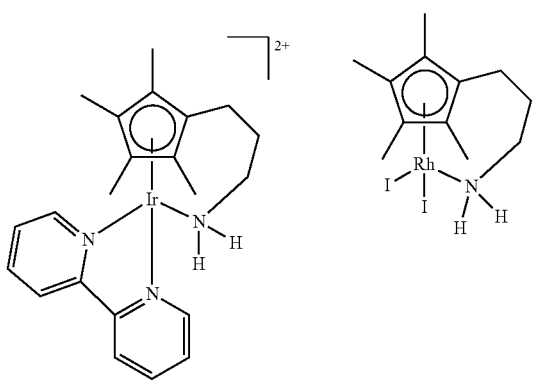
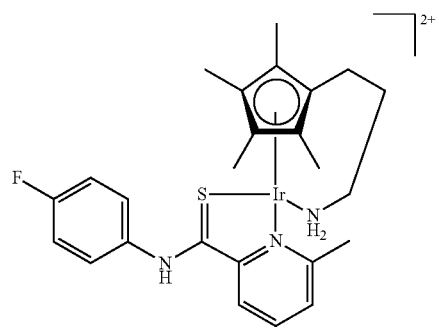
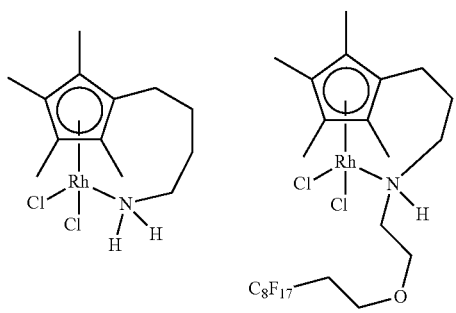
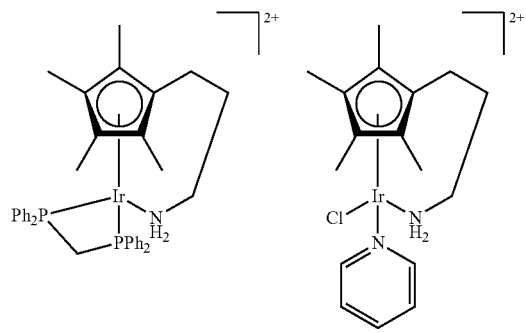

-continued
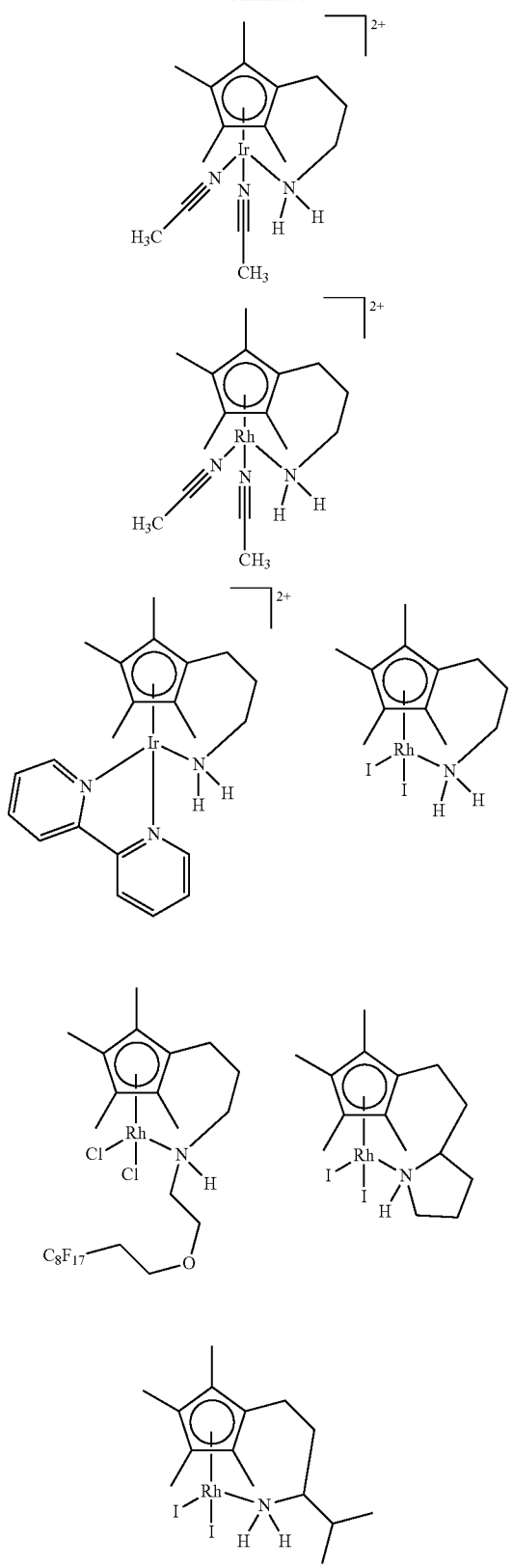
The cationic species shown above may further comprise X as defined above. In particular, X may be 2Cl⁻ or 2SbF₆⁻. X may be 2BF₄⁻, 2PF₆⁻, 2Cl⁻ or 2SbF₆⁻.
Metal complexes of the invention are:
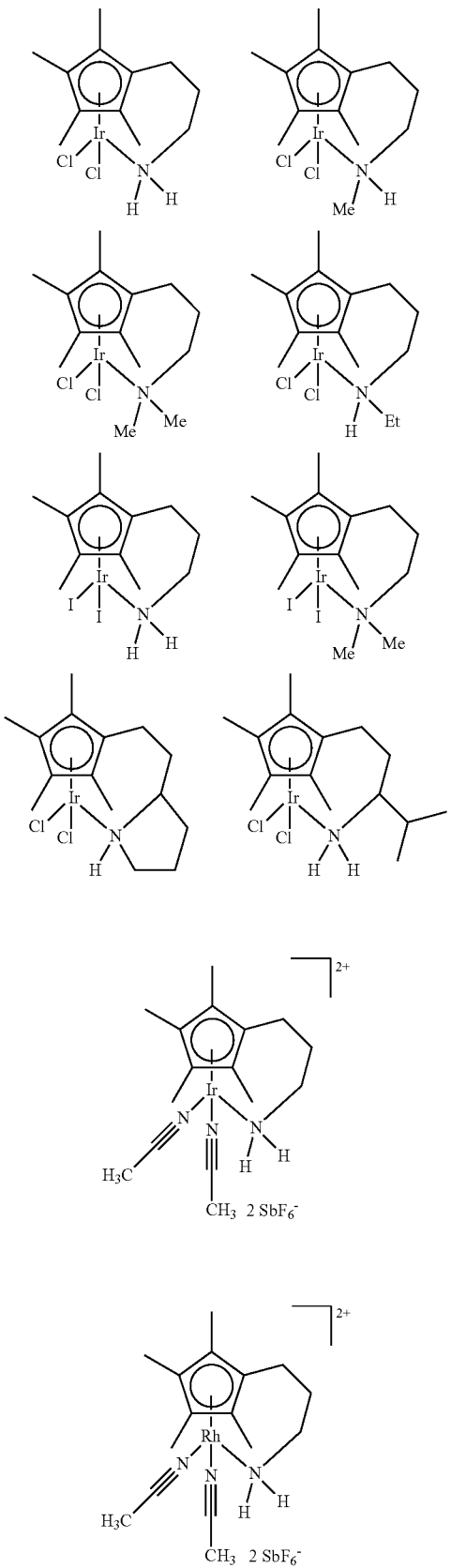

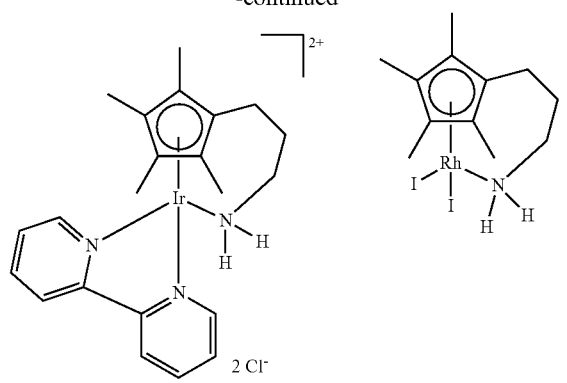
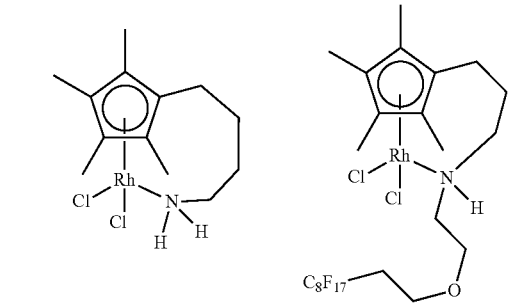
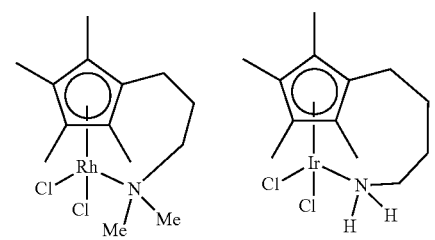
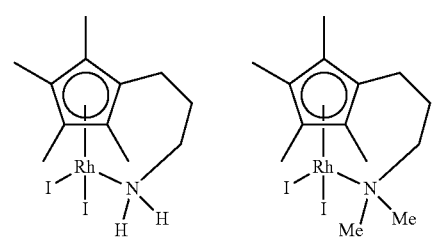
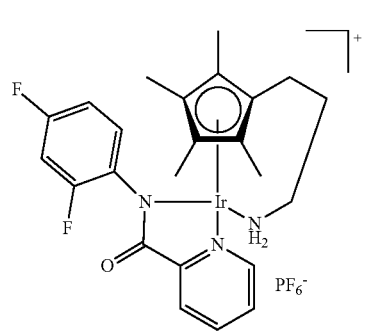
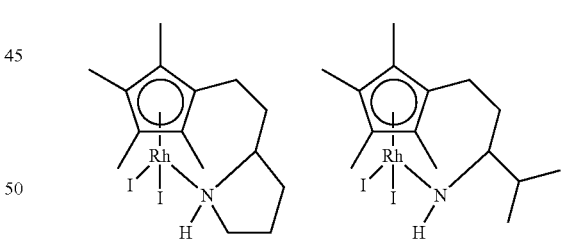
Particularly preferred metal complexes of the invention are:
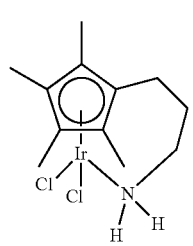

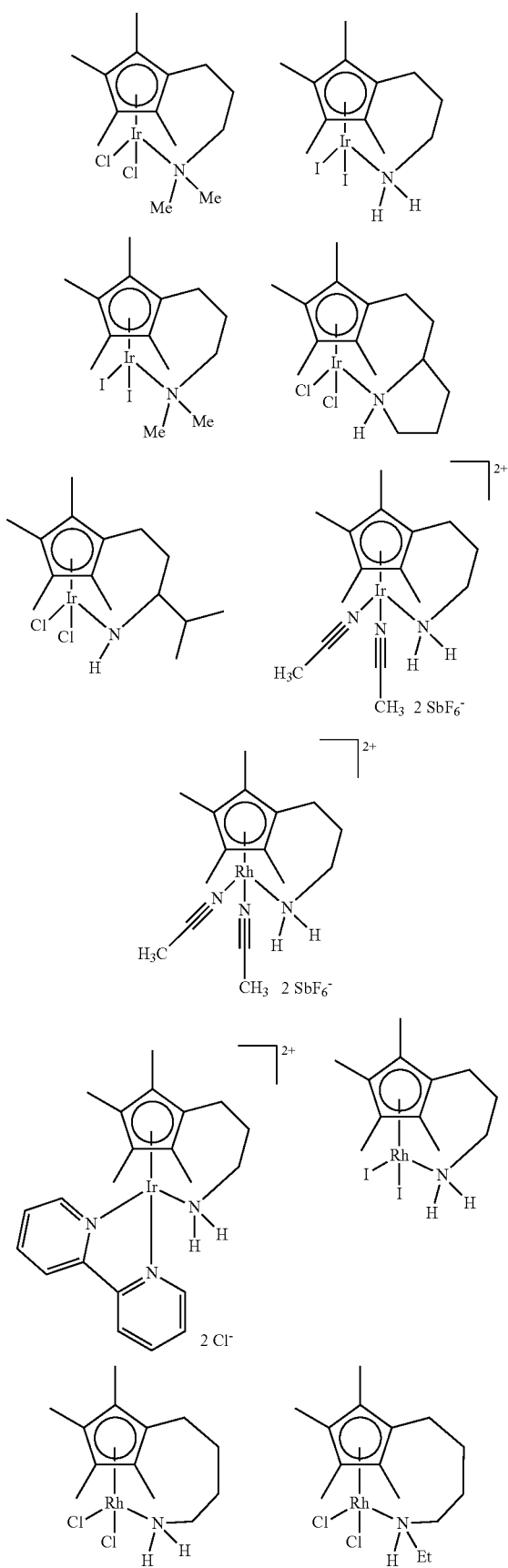
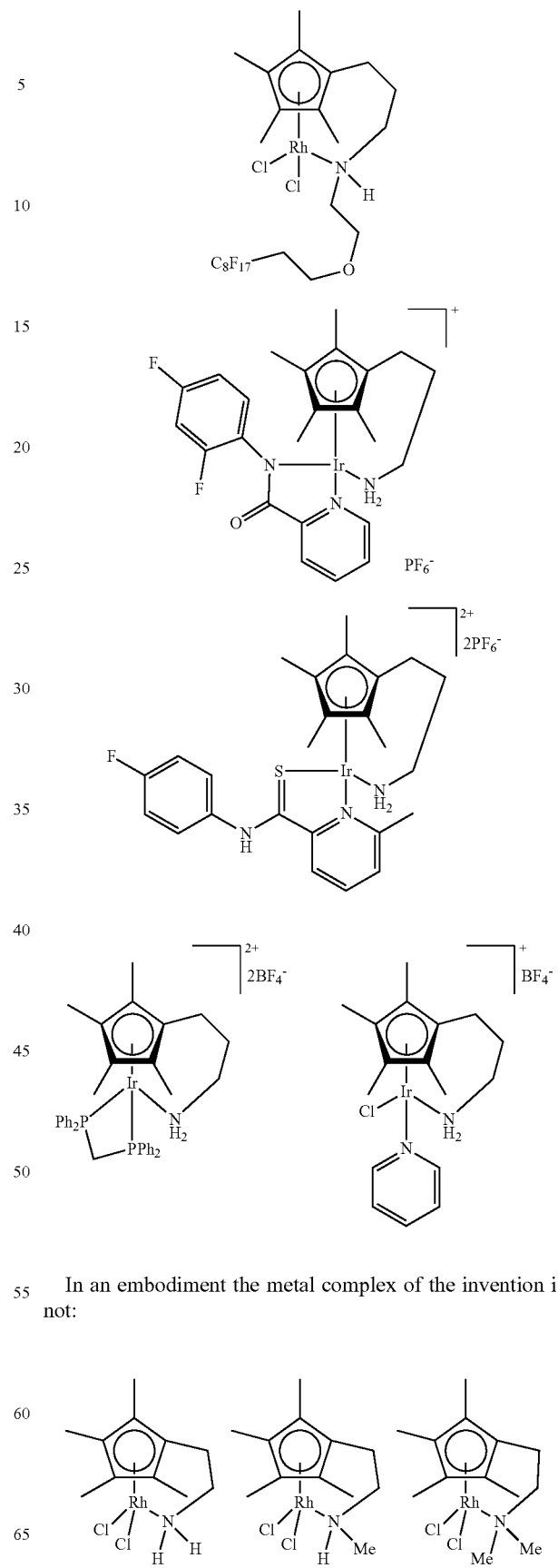
In an embodiment the metal complex of the invention is not:

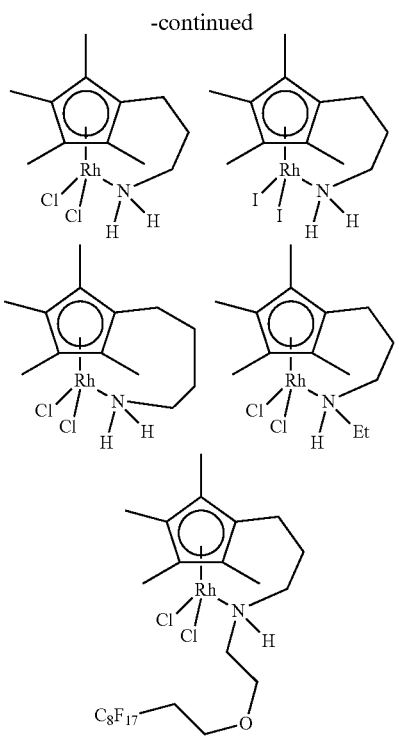

In embodiments M is not rhodium when p is 0. In an embodiment of the invention M is iridium when p is 0 and M is iridium or rhodium when p is 2.

In an aspect of the invention there is provided a catalytic process. The catalytic process comprising adding a metal complex of the invention to a reaction mixture. The reaction mixture optionally further comprising a solvent and at least one (preferably at least 2) starting materials. The starting materials are optionally an amine and an alcohol. The amines are optionally primary aliphatic amines, primary aromatic amines, primary heteroaromatic amines, secondary dialiphatic amines, secondary diaromatic amines, secondary diheteroaromatic amines, secondaryaryl(heteroaryl) amines, secondary alkyl/aromatic amines, secondary alkyl/heteroaromatic amines primary sulphonamides, secondary N-alkylsulphonamides, secondary N-arylsulphonamides, secondary N-heteroarylsulphonamides, primary sulphinamides, secondary N-alkylsulphinamides, secondary N-arylsulphinamides, secondary N-heteroarylsulphinamides, primary carbamates, secondary N-alkylcarbamates, secondary N-arylcarbamates, secondary N-heteroarylcarbamates, primary amides, secondary N-alkylamides, secondary N-arylamides, secondary N-heteroarylamides, primary ureas, secondary N-alkylureas, secondary N-arylureas, secondary N-heteroarylureas. The alcohols may be primary aliphatic, allylic, benzylic or heterobenzylic, or secondary aliphatic, secondary benzylic, secondary heterobenzylic or secondary allylic. Both alcohol and amine components may additionally comprise functional substitution including halogens, alkyl groups, alcohols, alkoxy groups, free amines, alkyl amines, carbonyl groups, carboxyl groups, alkenes, nitriles, sulphides, sulphoxides, sulphones, sulphinamides, sulphonamides, carbamates, ureas and amides.

The process may optionally further comprise the step of generating a product. Optionally the product is a N-alkylation product, for example an amine.

The solvent may be any industrially applicable solvent exemplified by, but not limited to, those discussed in Henderson et al, Green Chem., 2011, 13, 854. Optionally the solvent may be selected from: toluene, 1,4-dioxane, 2-methyltetrahydydrofuran, acetonitrile, t-amyl-alcohol, t-butanol, isopropyl acetate, dimethylformamide, dimethylsulfoxide, N-methylpyrollidone, water and mixtures thereof.

BRIEF DESCRIPTION OF THE DRAWINGS

Embodiments of the invention are further described hereinafter with reference to the accompanying drawings, in which.

DETAILED DESCRIPTION

Figure 1:
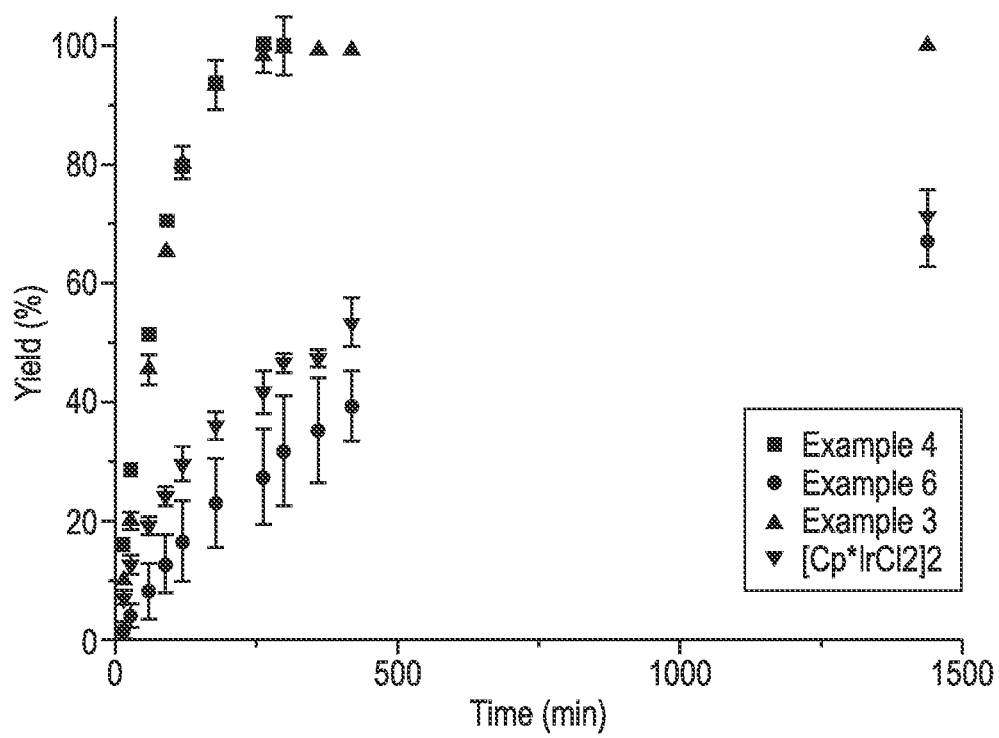
FIG. 1 is a graph showing the reaction rate of metal complexes of the invention with different N substituents and a comparative complex.

Given below are definitions of terms used in this application. Any term not defined herein takes the normal meaning as the skilled person would understand the term.

The term "halo" refers to one of the halogens, group 17 of the periodic table. In particular the term refers to fluorine, chlorine, bromine and iodine. Preferably, the term refers to iodine or chlorine.

The term "alkyl" refers to a linear or branched hydrocarbon chain. An alkyl ring may be a "$C_{1-14}$ alkyl" containing 1, 2, 3, 4, 5, 6, 7, 8, 9, 10, 11, 12, 13, or 14 carbon atoms. For example, the term "alkyl" encompasses methyl, ethyl, n-propyl, iso-propyl, n-butyl, sec-butyl, tert-butyl, n-pentyl and n-hexyl. Alkylene groups may likewise be linear or branched and may have two places of attachment to the remainder of the molecule. Furthermore, an alkylene group may, for example, correspond to one of those alkyl groups listed in this paragraph. The alkyl and alkylene groups may be unsubstituted or substituted by one or more substituents. Possible substituents are described below. Substituents for the alkyl group may be halogen, e.g. fluorine, chlorine, bromine and iodine, OH, $C_{1-6}$ alkoxy.

The term "alkoxy" refers to an alkyl group which is attached to a molecule via oxygen. This includes moieties where the alkyl part may be linear or branched and may contain, for example in a $C_{1-6}$ alkoxy 1, 2, 3, 4, 5 or 6 carbon atoms, for example methyl, ethyl, n-propyl, iso-propyl, n-butyl, sec-butyl, ten-butyl, n-pentyl and n-hexyl. Therefore, the alkoxy group may be methoxy, ethoxy, n-propoxy, iso-propoxy, n-butoxy, sec-butoxy, ter-butoxy, n-pentoxy and n-hexoxy. The alkyl part of the alkoxy group may be unsubstituted or substituted by one or more substituents. Possible substituents are described below. Substituents for the alkyl group may be halogen, e.g. fluorine, chlorine, bromine and iodine, OH, $C_{1-6}$ alkoxy.

The term "$C_{1-4}$ haloalkyl" or "$C_{1-6}$ haloalkyl" refers to a hydrocarbon chain substituted with at least one halogen atom independently chosen at each occurrence, for example fluorine, chlorine, bromine and iodine. The halogen atom may be present at any position on the hydrocarbon chain. For example, "$C_{1-4}$ haloalkyl" or "$C_{1-6}$ haloalkyl" may refer to chloromethyl, fluoromethyl, trifluoromethyl, chloroethyl e.g. 1-chloroethyl and 2-chloroethyl, trichloroethyl e.g. 1,2,2-trichloroethyl, 2,2,2-trichloroethyl, fluoroethyl e.g. 1-fluoromethyl and 2-fluoroethyl, trifluoroethyl e.g. 1,2,2-trifluoroethyl and 2,2,2-trifluoroethyl, chloropropyl, trichloropropyl, fluoropropyl, trifluoropropyl.

The term "$C_{2-6}$ alkenyl" refers to a branched or linear hydrocarbon chain containing at least one double bond and having 2, 3, 4, 5 or 6 carbon atoms. The double bond(s) may be present as the E or Z isomer. The double bond may be at any possible position of the hydrocarbon chain. For example, the "$C_{2-6}$ alkenyl" may be ethenyl, propenyl, butenyl, butadienyl, pentenyl, pentadienyl, hexenyl and hexadienyl.

The term "$C_2$. alkynyl" refers to a branched or linear hydrocarbon chain containing at least one triple bond and having 2, 3, 4, 5 or 6 carbon atoms. The triple bond may be at any possible position of the hydrocarbon chain. For example, the "$C_{2-6}$ alkynyl" may be ethynyl, propynyl, butynyl, pentynyl and hexynyl.

The term "$C_{1-6}$ heteroalkyl" refers to a branched or linear hydrocarbon chain containing 1, 2, 3, 4, 5, or 6 carbon atoms and at least one heteroatom selected from N, O and S positioned between any carbon in the chain or at an end of the chain. For example, the hydrocarbon chain may contain one or two heteroatoms. The $C_{1-6}$ heteroalkyl may be bonded to the rest of the molecule through a carbon or a heteroatom. For example, the "$C_{1-6}$ heteroalkyl" may be $C_{1-6}$ N-alkyl, $C_{1-6}$ N,N-alkyl, or $C_{1-6}$ O-alkyl.

The term "carbocyclic" refers to a saturated or unsaturated carbon containing ring system. A "carbocyclic" system may be monocyclic or a fused polycyclic ring system, for example, bicyclic or tricyclic. A "carbocyclic" moiety may contain from 3 to 14 carbon atoms, for example, 3 to 8 carbon atoms in a monocyclic system and 7 to 14 carbon atoms in a polycyclic system. "Carbocyclic" encompasses cycloalkyl moieties, cycloalkenyl moieties, aryl ring systems and fused ring systems including an aromatic portion.

The term "heterocyclic" refers to a saturated or unsaturated ring system containing at least one heteroatom selected from N, O or S. A "heterocyclic" system may contain 1, 2, 3 or 4 heteroatoms, for example 1 or 2. A "heterocyclic" system may be monocyclic or a fused polycyclic ring system, for example, bicyclic or tricyclic. A "heterocyclic" moiety may contain from 3 to 14 carbon atoms, for example, 3 to 8 carbon atoms in a monocyclic system and 7 to 14 carbon atoms in a polycyclic system. "Heterocyclic" encompasses heterocycloalkyl moieties, heterocycloalkenyl moieties and heteroaromatic moieties. For example, the heterocyclic group may be: oxirane, aziridine, azetidine, oxetane, tetrahydrofuran, pyrrolidine, imidazolidine, succinimide, pyrazolidine, oxazolidine, isoxazolidine, thiazolidine, isothiazolidine, piperidine, morpholine, thiomorpholine, piperazine, and tetrahydropyran.

The term "$C_{3-8}$ cycloalkyl" refers to a saturated hydrocarbon ring system containing 3, 4, 5, 6, 7 or 8 carbon atoms. For example, the "$C_{3-8}$ cycloalkyl" may be cyclopropyl, cyclobutyl, cyclopentyl, cyclohexyl, cycloheptyl and cyclooctyl.

The term "$C_{3-6}$ cycloalkenyl" or "$C_{3-8}$ cycloalkenyl" refers to an unsaturated hydrocarbon ring system containing 3, 4, 5 or 6 carbon atoms or 3, 4, 5, 6, 7 or 8 carbon atoms respectively that is not aromatic. The ring may contain more than one double bond provided that the ring system is not aromatic. For example, the "$C_{3-8}$ cycloalkyl" may be cyclopropenyl, cyclobutenyl, cyclopentenyl, cyclopentadienyl, cyclohexenyl, cyclohexadienly, cycloheptenyl, cycloheptadiene, cyclooctenyl and cycloatadienyl.

The term "$C_{3-10}$ heterocycloalkyl" refers to a saturated hydrocarbon ring system containing 3, 4, 5, 6, 7 or 8 carbon atoms and at least one heteroatom within the ring selected from N, O and S. For example there may be 1, 2 or 3 heteroatoms, optionally 1 or 2. The "$C_{3-10}$ heterocycloalkyl" may be bonded to the rest of the molecule through any carbon atom or heteroatom. The "$C_{3-10}$ heterocycloalkyl" may have one or more, e.g. one or two, bonds to the rest of the molecule: these bonds may be through any of the atoms in the ring. For example, the "$C_{3-10}$ heterocycloalkyl" may be oxirane, aziridine, azetidine, oxetane, tetrahydrofuran, pyrrolidine, imidazolidine, succinimide, pyrazolidine, oxazolidine, isoxazolidine, thiazolidine, isothiazolidine, piperidine, morpholine, thiomorpholine, piperazine, and tetrahydropyran.

The term "$C_{3-10}$ heterocycloalkenyl" refers to an unsaturated hydrocarbon ring system, that is not aromatic, containing 3, 4, 5, 6, 7 or 8 carbon atoms and at least one heteroatom within the ring selected from N, O and S. For example there may be 1, 2 or 3 heteroatoms, optionally 1 or 2. The "$C_{3-10}$ heterocycloalkenyl" may be bonded to the rest of the molecule through any carbon atom or heteroatom. The "$C_{3-10}$ heterocycloalkenyl" may have one or more, e.g. one or two, bonds to the rest of the molecule: these bonds may be through any of the atoms in the ring. For example, the "$C_{3-10}$ heterocycloalkyl" may be tetrahydropyridine, dihydropyran, dihydrofuran, pyrroline.

The term "aromatic" when applied to a substituent as a whole means a single ring or polycyclic ring system with 4n+2 electrons in a conjugated π system within the ring or ring system where all atoms contributing to the conjugated π system are in the same plane.

The term "aryl" refers to an aromatic hydrocarbon ring system. The ring system has 4n+2 electrons in a conjugated r system within a ring where all atoms contributing to the conjugated r system are in the same plane. For example, the "aryl" may be phenyl and naphthyl. The aryl system itself may be substituted with other groups.

The term "heteroaryl" refers to an aromatic hydrocarbon ring system with at least one heteroatom within a single ring or within a fused ring system, selected from O, N and S. The ring or ring system has 4n+2 electrons in a conjugated r system where all atoms contributing to the conjugated r system are in the same plane. For example, the "heteroaryl"

may be imidazole, thiene, furane, thianthrene, pyrrol, benzimidazole, pyrazole, pyrazine, pyridine, pyrimidine and indole.

By "acyl" is meant an organic radical derived from, for example, an organic acid by the removal of the hydroxyl group, e.g. a radical having the formula R—C(O)—, where R may be selected from H, $C_{1-6}$ alkyl, $C_{3-8}$ cycloalkyl, phenyl, benzyl or phenethyl group, eg R is H or $C_{1-3}$ alkyl. In one embodiment acyl is alkyl-carbonyl. Examples of acyl groups include, but are not limited to, formyl, acetyl, propionyl and butyryl. A particular acyl group is acetyl.

By "phosphine" it is meant an organophosphorous compound with three organic groups attached to a phosphorous atom, for example triphenylphosphine, tricyclohexylphosphine, or biscyclohexylphenylphosphine. The phosphine may be a phosphorous atom attached to three of the same groups or three different groups, for example the phosphine may be $P(R^C)_3$, or the phosphine may be attached to three different groups ($PR^{C1}R^{C2}R^{C3}$) or two of the same groups and one other different group ($PR^{C1}(R^{C2})_2$). Accordingly, the phosphine of any compound of the present invention may be $PR^{C1}R^{C2}R^{C3}$ wherein $R^{C1}$, $R^{C2}$ and $R^{C3}$ are each independently selected at each occurrence from: $C_{1-10}$ alkyl, $C_{6-10}$ aryl, $C_{3-10}$ cycloalkyl, $C_{5-10}$ heteroaryl, and $C_{3-10}$ heterocycloalkyl. Optionally, $R^{C1}$, $R^{C2}$ and $R^{C3}$ are each independently selected at each occurrence from: $C_{6-10}$ aryl, $C_{3-10}$ cycloalkyl, for example, phenyl and cyclohexyl.

A "diphosphine" is similarly an organophosphorous compound with two phosphorous atoms each having 2 organic substituents with a further substituent attached to both phosphorous atoms for example 2,2'-bis(diphenylphosphino)-1,1'-binaphthyl (BINAP). Accordingly, a diphosphine may be $R^{C1}R^{C2}P—R^D—PR^{C4}R^{C5}$), wherein $R^{C1}$, $R^{C2}$, $R^{C4}$, and $R^{C5}$ are each independently selected at each occurrence from: $C_{1-10}$ alkyl, $C_{1-10}$ aryl, $C_{3-10}$ cycloalkyl, $C_{5-10}$ heteroaryl, and $C_{3-10}$ heterocycloalkyl and $R^D$ is selected from $C_{1-10}$ alkylene, $C_{6-10}$ arylene, $C_{3-10}$ cycloalkylene, $C_{5-10}$ heteroarylene, $C_{3-10}$ heterocycloalkylene, bi-$C_{6-10}$ arylene, bi-$C_{3-10}$ cycloalkylene, bi-$C_{5-10}$ heteroarylene, and bi-$C_{3-10}$ heterocycloalkylene. Optionally, $R^{C1}$, $R^{C2}$, $R^{C4}$, and $R^{C5}$ are each independently selected at each occurrence from: $C_{1-10}$ alkyl, $C_{6-10}$ aryl, $C_{3-10}$ cycloalkyl, and $R^D$ is selected from $C_{1-10}$ alkylene, $C_{6-10}$ arylene, $C_{3-10}$ cycloalkylene, bi-$C_{6-10}$ arylene, bi-$C_{3-10}$ cycloalkylene, for example phenyl, cyclohexyl napthyl, and binapthyl.

A "bidentate ligand" is a single molecule with two atoms capable of bonding to a metal centre. The bidentate ligand may be a nitrile, an amine, a phosphine or a sulfonate ester, it will be appreciated by the person skilled in the art that the presence of a single amine group, etc, will result in a molecule being termed as an amine. Therefore, a bidentate ligand that is an amine, for example, may comprise a single amine group (acting as a first point of attachment to the metal centre) and the same or a different functional group (acting as a second point of attachment to the metal centre.

A "fluorous tag" is a highly fluorinated group. The flourous tag is sufficiently fluorinated to provide an affinity towards fluorinated solvents or to flourous solid-phase extraction. A fluorous tag may be bonded directly to the metal complex or a linker group may be present between the metal complex and the flourous tag. For example, the flourous tag may be $C_8F_{17}$. An exemplary flourous tag and linker is $CH_2CH_2OCH_2CH_2C_8F_{17}$.

Where a moiety is substituted, it may be substituted at any point on the moiety where chemically possible and consistent with atomic valency requirements. The moiety may be substituted by one or more substituents, e.g. 1, 2, 3 or 4 substituents; optionally there are 1 or 2 substituents on a group. Where there are two or more substituents, the substituent(s) may be the same or different. The substituent(s) may be selected from: OH, NHR, amidino, guanidino, hydroxyguanidino, formamidino, isothioureido, ureido, mercapto, C(O)H, acyl, acyloxy, carboxy, sulfo, sulfamoyl, carbamoyl, cyano, azo, nitro, halo, $C_{1-6}$ alkyl, $C_{1-6}$ alkoxy, $C_{1-6}$ haloalkyl, $C_{3-8}$ cycloalkyl, $C_{2-8}$ alkenyl, $C_{2-8}$ alkynyl, aryl, heteroaryl or alkaryl. Where the group to be substituted is an alkyl group the substituent may be $=O$. R may be selected from H, $C_{1-6}$ alkyl, $C_{3-8}$ cycloalkyl, phenyl, benzyl or phenethyl group, e.g. R is H or $C_{1-3}$ alkyl. Where the moiety is substituted with two or more substituents and two of the substituents are adjacent the adjacent substituents may form a $C_{4-8}$ ring along with the atoms of the moiety on which the substituents are substituted, wherein the $C_{4-8}$ ring is a saturated or unsaturated hydrocarbon ring with 4, 5, 6, 7, or 8 carbon atoms or a saturated or unsaturated hydrocarbon ring with 4, 5, 6, 7, or 8 carbon atoms and 1, 2 or 3 heteroatoms.

Substituents are only present at positions where they are chemically possible, the person skilled in the art being able to decide (either experimentally or theoretically) without inappropriate effort which substitutions are chemically possible and which are not.

The invention contemplates salts of the metal complex of the invention. These may include the acid addition and base salts of the metal complex. These may be acid addition and base salts of the compounds. In addition the invention contemplates solvates of the compounds. These may be hydrates or other solvated forms of the compound.

Suitable acid addition salts are formed from acids which form non-toxic salts. Examples include the acetate, aspartate, benzoate, besylate, bicarbonate/carbonate, bisulfate/sulfate, borate, camsylate, citrate, edisylate, esylate, formate, fumarate, gluceptate, gluconate, glucuronate, hexafluorophosphate, hibenzate, hydrochloride/chloride, hydrobromide/bromide, hydroiodide/iodide, isethionate, lactate, malate, maleate, malonate, mesylate, methylsulfate, naphthylate, 1,5-naphthalenedisulfonate, 2-napsylate, nicotinate, nitrate, orotate, oxalate, palmitate, pamoate, phosphate/hydrogen phosphate/dihydrogen phosphate, saccharate, stearate, succinate, tartrate, tosylate and trifluoroacetate salts.

Suitable base salts are formed from bases which form non-toxic salts. Examples include the aluminium, arginine, benzathine, calcium, choline, diethylamine, diolamine, glycine, lysine, magnesium, meglumine, olamine, potassium, sodium, tromethamine and zinc salts. Hemisalts of acids and bases may also be formed, for example, hemisulfate and hemicalcium salts. For a review on suitable salts, see "Handbook of Pharmaceutical Salts: Properties, Selection, and Use" by Stahl and Wermuth (Wiley-VCH, Weinheim, Germany, 2002).

Salts of metal complex of formula (I) may be prepared by one or more of three methods:
(i) by reacting the compound of the invention with the desired acid or base;
(ii) by removing an acid- or base-labile protecting group from a suitable precursor of the compound of the invention or by ring-opening a suitable cyclic precursor, for example, a lactone or lactam, using the desired acid or base;
(iii) by converting one salt of the compound of the invention to another by reaction with an appropriate acid or base or by means of a suitable ion exchange column;
(iv) or by salt metatheis.

All three reactions are typically carried out in solution. The resulting salt may precipitate out and be collected by filtration or may be recovered by evaporation of the solvent. The degree of ionisation in the resulting salt may vary from completely ionised to almost non-ionised.

The metal complex of the invention may exist in both unsolvated and solvated forms. The term 'solvate' is used herein to describe a molecular complex comprising the compound of the invention and a stoichiometric amount of one or more pharmaceutically acceptable solvent molecules, for example, ethanol. The term 'hydrate' is employed when said solvent is water.

Hereinafter all references to metal complex of any formula include references to salts, solvates and complexes thereof and to solvates and complexes of salts thereof.

The metal complex of the invention include metal complex of a number of formula as herein defined, including all polymorphs and crystal habits and isomers thereof (including optical, geometric and tautomeric isomers) as hereinafter defined and isotopically-labelled metal complex of the invention.

The present invention also includes all industrially acceptable isotopically-labelled metal complexes of the invention wherein one or more atoms are replaced by atoms having the same atomic number, but an atomic mass or mass number different from the atomic mass or mass number most commonly found in nature.

Examples of isotopes suitable for inclusion in the metal complex of the invention include isotopes of hydrogen, such as $^2H$ and $^3H$, carbon, such as $^{11}C$, $^{13}C$ and $^{14}C$, chlorine, such as Cl, fluorine, such as $^{18}F$, iodine, such as $^{123}I$ and $^{125}I$, nitrogen, such as $^{13}N$ and $^{15}N$, oxygen, such as $^{15}O$, $^{17}O$ and $^{18}O$, phosphorus, such as UP, and sulphur, such as $^{35}S$.

For some of the steps of the process of preparation of the metal complex of the invention, it may be necessary to protect potential reactive functions that are not wished to react, and to cleave said protecting groups in consequence. In such a case, any compatible protecting radical can be used. In particular methods of protection and deprotection such as those described by T. W. Greene (Protective Groups in Organic Synthesis, A. Wiley-Interscience Publication, 1981) or by P. J. Kocienski (Protecting groups, Georg Thieme Verlag, 1994), can be used. All of the above reactions and the preparations of novel starting materials used in the preceding methods are conventional and appropriate reagents and reaction conditions for their performance or preparation as well as procedures for isolating the desired products will be well-known to those skilled in the art with reference to literature precedents and the examples and preparations hereto.

Also, the metal complex of the present invention as well as intermediates for the preparation thereof can be purified according to various well-known methods, such as for example crystallization or chromatography. The Metal complex of the invention may exist in a single crystal form or in a mixture of crystal forms or they may be amorphous.

EXAMPLES

General synthetic procedure for alcohol amination reactions using catalyst metal complex of the invention. To a stirred suspension of iridium complex example 3 (4.4 mg, 0.01 mmol) in toluene (0.5 ml) under nitrogen were added the corresponding alcohol (1.0 mmol) and the corresponding amine (1.0 mmol). The resulting solution was heated at 110° C. for 18 hours. The solvent was removed under reduced pressure and purification by filtration or by flash chromatography gave the product amines.

Ligand and Ligand Precursor Synthesis

Intermediate 1: N-Boc-4-(2'-Aminoethyl)-3,5-dimethyl-hepta-2,5-dien-4-ol

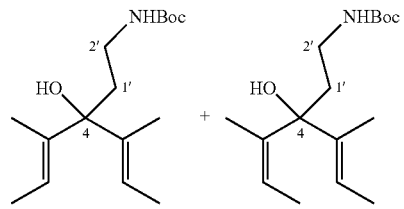

Lithium wire (516 mg, 74.0 mmol) was washed with hexane, cut into small pieces and suspended in Et$_2$O (15 ml). 2-Bromo-2-butene (1.8 ml, 18 mmol, mixture of cis and trans isomers) was added in one portion to the mixture and stirred until the reaction started, observed by the reflux of the solvent; another aliquot of 2-bromo-2-butene (2.0 ml, 20 mmol) in Et$_2$O (10 ml) was added dropwise to maintain a gentle reflux. The suspension was stirred for 2 hours at RT and then cooled to −78° C. A solution of N-Boc-β-alanine methyl ester (2.40 g, 12.0 mmol) in Et$_2$O (10 ml) was added dropwise, the mixture was warmed to RT, stirred overnight and quenched with careful addition of saturated aqueous NH$_4$Cl (60 ml). The phases were separated and the product was extracted with Et$_2$O (2×30 ml). The combined organic extracts were dried with Na$_2$SO$_4$ and the solvent was removed under reduced pressure. Purification by flash chromatography (SiO$_2$, eluting with hexane-EtOAc (95:5)) gave Intermediate 1 as a colourless oil as a 1:1 mixture of trans-trans and cis-trans isomers which was used without any other purification (1.50 g, 5.30 mmol, 44%).

R$_f$=0.30 (hexane-EtOAc 80:20); $^1$H NMR (500 MHz, CDCl$_3$, δ/ppm): 5.65-5.59 (2H, m, 2CH for the trans-trans isomer), 5.44-5.34 (2H, m, 2CH for the trans-cis isomer), 5.18-5.10 (2H, m, 2NH), 3.30-3.22 (4H, m, 2H-2'), 1.95-1.86 (4H, m, 2H-1'), 1.77 (6H, s, 2CH$_3$), 1.69-1.60 (18H, m, 6CH$_3$), 1.44 (18H, s, 2C(CH$_3$)$_3$); $^{13}$C NMR (125 MHz, CDCl$_3$, δ/ppm): 156.1 (C(O)), 139.7 (C$_q$CH$_3$), 139.0 (C$_q$CH$_3$), 137.7 (C$_q$CH$_3$), 123.1 (CH for the trans-cis isomer), 118.6 (CH for the trans-trans isomer), 80.7 (C(CH$_3$)$_3$), 79.8 (C-4), 78.9 (C-4), 39.1 (C-1'), 36.7 (C-2'), 28.4 (C(CH$_3$)$_3$), 23.3 (CH$_3$), 22.7 (CH$_3$), 14.7 (CH$_3$), 14.4 (CH$_3$), 13.2 (CH$_3$), 12.5 (CH$_3$); IR (ν$_{max}$, neat, cm$^{-1}$): 3387 (N—H and O—H), 2976, 2933, 1696 (C=O), 1509, 1452, 1366, 1279, 1250, 1173; HRMS (ESI+) m/z: Calculated for C$_{16}$H$_{29}$NNaO$_3$ (M+Na$^+$): 306.2040, found: 306.2034.

Intermediate 2: N-Boc-4-(3'-Aminopropyl)-3,5-dimethyl-hepta-2,5-dien-4-ol

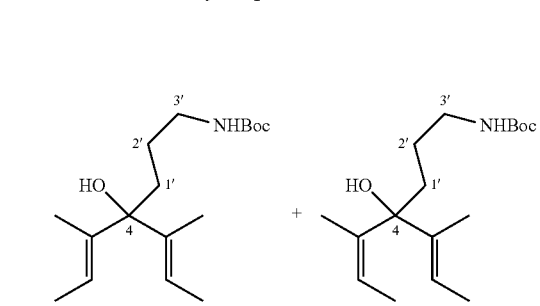

Lithium wire (340 mg, 48.6 mmol) was washed with hexane, cut into small pieces and suspended in Et$_2$O (10 ml). A solution of 2-bromo-2-butene (2.4 ml, 24 mmol, mixture of cis and trans isomers) in Et$_2$O (10 ml) was added dropwise and the suspension was stirred for 2 hours at RT. N-Boc-2-pyrrolidinone (1.50 g, 8.10 mmol) dissolved in Et$_2$O (8.0 ml) was added dropwise, the mixture was stirred for 2 hours at RT and quenched with careful addition of saturated aqueous NH$_4$Cl (40 ml). The two phases were separated and the product was extracted with Et$_2$O (3×20 ml). The combined organic phases were dried with Na$_2$SO$_4$ and the solvent was removed under reduced pressure. Purification by flash chromatography (SiO$_2$, eluting with hexane-EtOAc (90:10 to 80:20)) gave Intermediate 2 as a colourless oil as a mixture of trans-trans and trans-cis isomers (fraction major (trans-cis)/minor (trans-trans): 2/1) which was used without any other purification (1.10 g, 5.70 mmol, 70%).

R$_f$=0.60 (hexane-EtOAc 70:30); $^1$H NMR (500 MHz, CDCl$_3$, δ/ppm): 5.58 (2H, dq, J=1.0, 6.5 Hz, 2CH for the trans-trans isomer), 5.35 (2H, dq, J=1.0, 6.5 Hz, 2CH for the trans-cis isomer), 4.59 (2H, br s, 2NH), 3.14 (4H, br s, 2H-3'), 1.84-1.81 (2H, m, 2OH), 1.76-1.75 (4H, m, 2H-1'), 1.67-1.59 (24H, m, 8CH$_3$), 1.53-1.49 (4H, m, 2H-2'), 1.43 (18H, s, 2C(CH$_3$)$_3$); $^{13}$C NMR (125 MHz, CDCl$_3$, δ/ppm): 156.1 (C(O)), 140.0 (C$_q$CH$_3$), 139.5 (C$_q$CH$_3$), 138.0 (C$_q$CH$_3$), 122.7 (CH for the trans-cis isomer), 122.6 (CH for the trans-cis isomer), 118.3 (CH for the trans-trans isomer), 80.6 (C(CH$_3$)$_3$), 79.5 (C-4), 79.0 (C-4), 41.1 (C-3'), 36.8 (C-1'), 35.0 (C-1'), 28.4 (C(CH$_3$)$_3$), 24.5 (C-2'), 24.2 (C-2'), 23.4 (CH$_3$), 22.8 (CH$_3$), 14.7 (CH$_3$), 14.4 (CH$_3$), 13.2 (CH$_3$), 12.6 (CH$_3$); HRMS (ESI+) m/z: Calculated for C$_{17}$H$_{31}$NNaO$_3$ (M+Na$^+$): 320.2196, found: 320.2200. Spectroscopic data consistent with literature values (M. Ito, N. Tejima, M. Yamamura, Y. Endo and T. Ikariya, *Organometallics*, 2010, 29, 1886-1889).

Intermediate 3: N-Boc-4-(4'-Aminobutyl)-3,5-dimethyl-hepta-2,5dien-4-ol

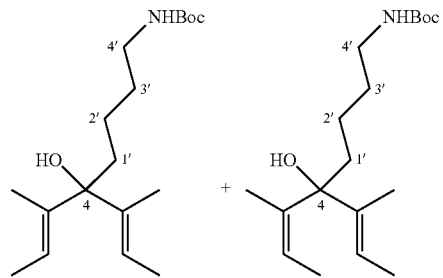

Lithium wire (4.37 mg, 63.0 mmol) was washed with hexane, cut into small pieces and suspended in Et$_2$O (10 ml). 2-Bromo-2-butene (1.3 ml, 13 mmol, mixture of cis and trans isomers) was added in one portion to the mixture and stirred until the reaction started, observed by the reflux of the solvent; another aliquot of 2-bromo-2-butene (2.0 ml, 20 mmol) in Et$_2$O (10 ml) was added dropwise and the suspension was stirred for 2 hours at RT. A solution of N-Boc-2-piperidinone (3.00 g, 15.0 mmol) in Et$_2$O (20 ml) was added dropwise, the mixture was stirred for 1 hour and quenched with careful addition of saturated aqueous NH$_4$Cl (60 ml). The phases were separated and the product was extracted with Et$_2$O (2×30 ml). The combined organic phases were dried with Na$_2$SO$_4$ and the solvent was removed under reduced pressure. Purification by flash chromatography (SiO$_2$, eluting with hexane-EtOAc (90:10)) gave Intermediate 3 as a colourless oil as a mixture of trans-trans and trans-cis isomers (fraction major (trans-cis)/minor (trans-trans): 3/2) which was used without any other purification (940 mg, 3.00 mmol, 20%).

R$_f$=0.50 (hexane-EtOAc 70:30); $^1$H NMR (500 MHz, CDCl$_3$, δ/ppm): 5.57 (2H, q, J=6.5 Hz, 2CH for the trans-trans isomer), 5.34 (2H, dq, J=1.3, 7.5 Hz, 2CH for the trans-cis isomer), 4.54 (2H, br s, 2NH), 3.12 (4H, br s, 2H-4'), 1.84-1.71 (6H, m, 2H-1' and 2OH), 1.69-1.60 (24H, m, 8CH$_3$), 1.53-1.46 (8H, m, 4CH$_2$), 1.44 (18H, s, 2C(CH$_3$)$_3$); $^{13}$C NMR (125 MHz, CDCl$_3$, δ/ppm): 156.1 (C(O) N), 140.2 (C$_q$CH$_3$), 139.6 (C$_q$CH$_3$), 138.1 (C$_q$CH$_3$), 122.5 (CH for the trans-cis isomer), 122.4 (CH for the trans-cis isomer), 118.9 (CH for the trans-trans isomer), 118.1 (CH for the trans-trans isomer), 80.8 (C(CH$_3$)$_3$), 79.4 (C-4), 79.1 (C-4), 40.4 (C-4'), 39.4 (C-1'), 37.6 (C-1'), 28.4 (C(CH$_3$)$_3$), 23.4 (CH$_3$), 22.8 (CH$_3$), 20.7 (CH$_2$), 20.5 (CH$_2$), 14.8 (CH$_3$), 14.4 (CH$_3$), 13.4 (CH$_3$), 13.2 (CH$_3$), 12.6 (CH$_3$), 12.4 (CH$_3$); IR (v$_{max}$, neat, cm$^{-1}$): 3364 (N—H and O—H), 2975, 2933, 2865, 1695 (C=O), 1515, 1454, 1366, 1251, 1172, 1003; HRMS (ESI+) m/z: Calculated for C$_{18}$H$_{33}$NNaO$_3$ (M+Na$^+$): 334.2353, found: 334.2357.

Intermediate 4: N-Boc-N-Methyl-4-(3'-aminopropyl)-3,5-dimethyl-hepta-2,5-dien-4-ol

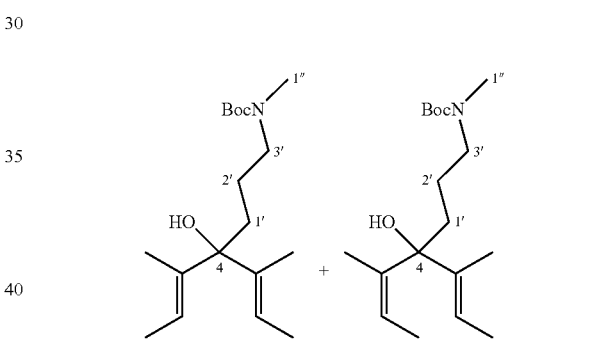

Lithium wire (150 mg, 22.0 mmol) was washed with hexane, cut into small pieces and suspended in Et$_2$O (10 ml). A solution of 2-bromo-2-butene (1.2 ml, 12 mmol, mixture of cis and trans isomers) in Et$_2$O (10 ml) was added dropwise and the suspension was stirred for 2 hours at RT. A solution of methyl N-Boc-N-methyl-4-aminobutanoate (1.20 g, 5.19 mmol) in Et$_2$O (10 ml) was added dropwise, stirred for 90 minutes at RT and quenched with careful addition of saturated aqueous NH$_4$Cl (40 ml). The phases were separated and the product was extracted with Et$_2$O (3×20 ml). The combined organic extracts were dried with Na$_2$SO$_4$ and the solvent was removed under reduced pressure. Purification by flash chromatography (SiO$_2$, eluting with hexane-EtOAc (90:10)) gave Intermediate 4 as a colourless oil in a 1:1 mixture of trans-trans and trans-cis isomers which was used without any other purification (540 mg, 1.74 mmol, 33%).

R$_f$=0.40 (hexane-EtOAc 80:20); $^1$H NMR (500 MHz, CDCl$_3$, δ/ppm): 5.62-5.56 (2H, m, 2CH for the trans-trans isomer), 5.42-5.30 (2H, m, 2CH for the trans-cis isomer), 3.27-3.24 (4H, m, 2H-3'), 2.87 (6H, br s, 2H-1"), 1.86-1.76 (4H, m, 2H-1'), 1.74 (2H, s, 2OH), 1.69-1.61 (18H, m, 6CH$_3$), 1.62-1.59 (4H, m, 2CH$_2$), 1.46 (24H, s, 2CH$_3$ and 2C(CH$_3$)$_3$); $^{13}$C NMR (125 MHz, CDCl$_3$, δ/ppm): 156.0

(C(O)N), 140.1 (C$_q$CH$_3$), 139.6 (C$_q$CH$_3$), 138.1 (C$_q$CH$_3$), 122.5 (CH), 119.0 (CH), 118.2 (CH), 80.7 (C(CH$_3$)$_3$), 79.1 (C-4), 51.6 (C-3'), 34.0 (C-1"), 29.7 (C-1'), 28.4 (C(CH$_3$)$_3$), 23.4 (CH$_3$), 22.8 (CH$_3$), 21.9 (C-2'), 14.8 (CH$_3$), 14.4 (CH$_3$), 13.4 (CH$_3$), 13.2 (CH$_3$), 12.6 (CH$_3$), 12.4 (CH$_3$); IR (ν$_{max}$, neat, cm$^{-1}$): 3474 (O—H), 2973, 2931, 1759 (C=O), 1695 (C=C), 1481, 1454, 1395, 1365, 1171; HRMS (ESI+) m/z: Calculated for C$_{18}$H$_{33}$NNaO$_3$ (M+Na$^+$): 334.2353, found: 334.2349.

Intermediate 5: 4-(3'-Dimethylaminopropyl)-3,5-dimethyl-hepta-2,5-dien-4-ol

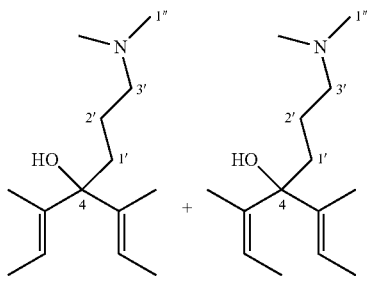

Lithium wire (530 mg, 76.0 mmol) was washed with hexane, cut into small pieces and suspended in Et$_2$O (10 ml). 2-Bromo-2-butene (1.5 ml, 15 mmol, mixture of cis and trans isomers) was added in one portion to the mixture and stirred until the reaction started, observed by the reflux of the solvent; another aliquot of 2-bromo-2-butene (2.5 ml, 25 mmol) in Et$_2$O (15 ml) was added dropwise and the suspension was stirred for 2 hours at RT. A solution of ethyl N,N-Dimethyl-4-aminobutanoate (2.80 g, 18.0 mmol) in Et$_2$O (15 ml) was added dropwise, stirred for 60 minutes at RT and quenched with careful addition of saturated aqueous NH$_4$Cl (50 ml). The phases were separated and the product was extracted with Et$_2$O (2×40 ml). The combined organic phases were dried with Na$_2$SO$_4$ and the solvent was removed under reduced pressure. Purification by flash chromatography (SiO$_2$, eluting with hexane-EtOAc (60:40 to 0:100)) gave Intermediate 5 as a colourless oil as a 1:1 mixture of trans-trans and trans-cis isomers which was used without any other purification (1.70 g, 7.54 mmol, 41%).

R$_f$=0.38 (DCM-MeOH 80:20); $^1$H NMR (500 MHz, CDCl$_3$, δ/ppm): 5.65 (2H, q, J=5.7 Hz, 2CH for the trans-trans isomer), 5.58 (1H, q, J=6.5 Hz, CH for the trans-cis isomer), 5.40 (1H, q, J=7.3 Hz, CH for the trans-cis isomer), 2.33-2.28 (4H, m, 2CH$_2$), 2.24 (6H, s, 2H-1"), 2.20 (6H, s, 2H-1"), 2.07-1.91 (4H, m, 2CH$_2$), 1.83-1.61 (18H, m, 6CH$_3$), 1.59-1.51 (4H, m, 2CH$_2$), 1.49-1.46 (6H, m, 2CH$_3$); $^{13}$C NMR (125 MHz, CDCl$_3$, δ/ppm): 139.8 (C$_q$CH$_3$), 139.0 (C$_q$CH$_3$), 138.8 (C$_q$CH$_3$), 122.9 (CH for the trans-cis isomer), 118.5 (CH for the trans-trans isomer), 117.5 (CH for the trans-cis isomer), 79.8 (C-4), 78.9 (C-4), 60.6 (C-3), 45.1 (C-1"), 37.6 (C-1'), 36.4 (C-1'), 23.6 (CH$_3$), 22.1 (CH$_2$), 21.9 (CH$_2$), 14.8 (CH$_3$), 13.5 (CH$_3$), 13.3 (CH$_3$), 12.5 (CH$_3$), 12.4 (CH$_3$); IR (ν$_{max}$, neat, cm$^{-1}$): 3394 (O—H), 2944, 2919, 2859, 2821, 2779, 1459, 1378, 1039, 1014; HRMS (ESI+) m/z: Calculated for C$_{14}$H$_{28}$NO (M+H$^+$): 226.2165, found: 226.2167.

Intermediate 6: N,N-Dimethyl-3-(tetramethylcyclopentadienyl)propan-1-amine hydrochloride

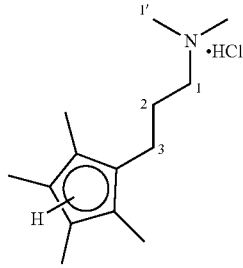

To a stirred solution of Intermediate 5 (970 mg, 4.30 mmol) in methanol (2.5 ml) was added a 2 M solution of HCl in Et$_2$O (2.6 ml, 5.2 mmol). The solution was stirred at room temperature for 2 hours and the solvent was removed under reduced pressure. The resulting yellow precipitate (1.14 g) was used in the following reactions without any other purification. Purification of a small amount of crude material (478 mg) by flash chromatography (SiO$_2$, eluting with DCM-MeOH (90:10)) gave Intermediate 6 as a pale yellow solid in a mixture of isomers used for characterization (239 mg, 0.984 mmol, 55%).

R$_f$=0.50 (DCM-MeOH 90:10); mp 117.5-118.6° C. (DCM-Et$_2$O); $^1$H NMR (500 MHz, CDCl$_3$, δ/ppm): 8.54 (1H, br s, NH), 2.73-2.66 (2H, m, H-1), 2.68-2.41 (1H, m, CH), 2.59-2.53 (6H, m, 2H-1'), 2.48-2.23 (2H, m, CH$_2$), 1.92-1.63 (2H, m, CH$_2$), 1.80-1.75 (9H, m, 3CH$_3$), 0.98 (3H, d, J=7.5 Hz, CH$_3$); $^{13}$C NMR (125 MHz, CDCl$_3$, δ/ppm): 139.7 (C$_q$CH$_3$), 139.6 (C$_q$CH$_3$), 139.0 (C$_q$CH$_3$), 136.7 (C$_q$CH$_3$), 136.4 (C$_q$CH$_3$), 136.1 (C$_q$CH$_3$), 134.5 (C$_q$CH$_3$), 133.9 (C$_q$CH$_3$), 132.9 (C$_q$CH$_3$), 58.6 (C-1), 58.2 (C-1), 55.3 (CH), 51.6 (CH), 49.1 (CH), 43.7 (C-1'), 43.6 (C-1'), 43.5 (CH$_2$), 43.3 (CH$_2$), 25.8 (CH$_2$), 25.1 (CH$_2$), 24.7 (CH$_2$), 23.3 (CH$_2$), 22.9 (CH$_2$), 14.2 (CH$_3$), 11.9 (CH$_3$), 11.8 (CH$_3$), 11.6 (CH$_3$), 11.3 (CH$_3$), 11.0 (CH$_3$); IR (ν$_{max}$, neat, cm$^{-1}$): 3403 (N—H), 2961, 2856, 2763, 2580, 2517, 2479, 1655, 1487, 1443, 1377, 1172, 1058, 1041, 1020, 1006; HRMS (ESI+) m/z: Calculated for C$_{14}$H$_{26}$N (M+H$^+$): 208.2060, found: 208.2062.

Intermediate 7: Ethyl 4-(2'-1H",1H",2H",2H"-perfluorodecyloxyacetamido)butanoate

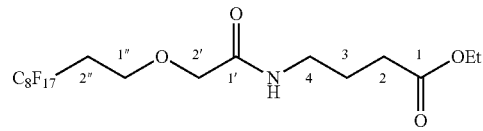

To a stirred suspension of DMAP (3.48 g, 28.5 mmol), N-(3-dimethylaminopropyl)-N'-ethylcarbodiimide hydrochloride (2.73 g, 14.3 mmol) and ethyl 4-aminobutanoate hydrochloride (1.59 g, 9.50 mmol) in DCM (160 ml) at 0° C. was added 1H'1H',2H',2H'-perfluorodecyloxyacetic acid in small aliquots (4.96 g, 9.50 mmol). The reaction mixture was warmed at RT and stirred for 18 hours. The solvent was removed under reduced pressure, the residue was dissolved in EtOAc (100 ml) and 1 M aqueous HCl (100 ml) and the two phases were separated. The product was extracted with EtOAc (3×100 ml) and the combined organic extracts were washed with brine (100 ml) and dried with $Na_2SO_4$. The solvent was removed under reduced pressure to afford Intermediate 7 as a colourless oil (5.77 g, 9.09 mmol, 96%).

$^1$H NMR (500 MHz, $CDCl_3$, δ/ppm): 6.67 (1H, br s, NH), 4.13 (2H, q, J=7.0 Hz, $OCH_2$), 3.98 (2H, s, H-2'), 3.83 (2H, t, J=6.4 Hz, H-1"), 3.35 (2H, q, J=7.0 Hz, H-4), 2.52-2.42 (2H, m, H-2"), 2.36 (2H, t, J=7.2 Hz, H-2), 1.87 (2H, ap quint, J=7.1 Hz, H-3), 1.25 (3H, t, J=7.0 Hz, $CH_3$); $^{13}$C NMR (125 MHz, $CDCl_3$, δ/ppm): 173.2 (C-1 or C-1'), 168.9 (C-1 or C-1'), 70.5 (C-2'), 63.5 (C-1"), 60.5 ($OCH_2$), 38.3 (C-4), 31.7 (C-2), 31.4 (t, J=21.7 Hz, C-2"), 24.6 (C-3), 14.1 ($CH_3$), 8 carbons (7×$CF_2$, 1×$CF_3$) not observed; $^{19}$F NMR (282 MHz, $CDCl_3$, δ/ppm): −80.8 (t, J=10.0 Hz), −113.2 (quint, J=14.4 Hz), −121.6, −121.9, −122.7, −123.6, −126.1, 1 fluorous not observed; IR ($v_{max}$, neat, cm$^{-1}$): 3339 (N—H), 2938, 1732 (C=O), 1666 (C=O), 1536, 1446, 1372, 1348, 1325, 1235, 1199, 1144, 1116, 1029; HRMS (ESI+) m/z: Calculated for $C_{18}H_{19}F_{17}NO_4$ (M+H$^+$): 636.1037, found: 636.1041.

Intermediate 8: Ethyl 4-((2'-1H",1H",2H",2H"-perfluorodecyloxyethyl)amino)butanoate

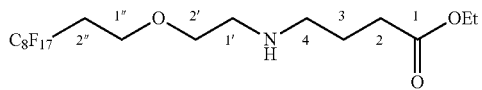

To a stirred solution of intermediate 7 (2.20 g, 3.47 mmol) and 2-fluoropyridine (328 μl, 3.82 mmol) in DCM (8.0 ml) at −78° C. was added dropwise trifluoromethanesulfonic anhydride (613 μl, 3.64 mmol). The solution was stirred at −78° C. for 10 minutes and then warmed at 0° C. Triethylsilane (610 μl, 3.82 mmol) was added dropwise, the solution was stirred at 0° C. for 10 minutes and for 5 hours at RT. Diethyl 2,6-dimethyl-1,4-dihydropyridine-3,5-dicarboxylate (1.23 g, 4.86 mmol) was added and the resulting mixture was stirred for 15 hours, before quenching with DCM (15 ml) and saturated aqueous $NaHCO_3$ (10 ml). The two phases were separated and the product was extracted with DCM (2×30 ml). The combined organic phases were dried with $Na_2SO_4$ and the solvent was removed under reduced pressure. Purification by flash chromatography ($SiO_2$, eluting with DCM-MeOH (95:5)) gave Intermediate 8 as a colourless oil (688 mg, 1.11 mmol, 32%).

$R_f$=0.35 (DCM-MeOH 90:10); $^1$H NMR (500 MHz, $CDCl_3$, δ/ppm): 4.12 (2H, q, J=7.0 Hz, $OCH_2$), 3.75 (2H, t, J=6.8 Hz, H-1"), 3.61 (2H, t, J=5.0 Hz, H-2'), 3.35 (1H, br s, NH), 2.84 (2H, t, J=5.0 Hz, H-1'), 2.73 (2H, t, J=7.2 Hz, H-4), 2.47-2.38 (2H, m, H-2"), 2.73 (2H, t, J=7.2 Hz, H-2), 1.87 (2H, ap quint, J=7.2 Hz, H-3), 1.24 (3H, t, J=7.0 Hz, $CH_3$); $^{13}$C NMR (125 MHz, $CDCl_3$, δ/ppm): 173.4 (C-1), 69.8 (C-2'), 62.9 (C-1"), 60.4 ($OCH_2$), 48.8 (C-4 or C-1'), 48.6 (C-4 or C-1'), 32.0 (C-2), 31.5 (t, J=21.3 Hz, C-2"), 24.6 (C-3), 14.1 ($CH_3$), 8 carbons (7×$CF_2$, 1×$CF_3$) not observed; $^{19}$F NMR (282 MHz, $CDCl_3$, δ/ppm): −80.8 (t, J=9.9 Hz), −113.4, −121.7, −121.9, −122.7, −123.6, −126.1, 1 fluorous not observed; IR ($v_{max}$, neat, cm$^{-1}$): 3342 (N—H), 2935, 1729 (C=O), 1656, 1543, 1444, 1370, 1348, 1199, 1145, 1134, 1016, 1029; HRMS (ESI+) m/z: Calculated for $C_{18}H_{20}F_{17}NNaO_3$ (M+Na$^+$): 644.1064, found: 644.1066.

Intermediate 9: Ethyl 4-(N-Boc-(2'-1H",1H",2H",2H"-perfluorodecyloxyethyl)amino)butanoate

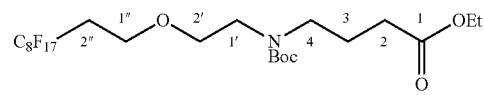

To a stirred solution of di-tert-butyl dicarbonate (600 mg, 2.73 mmol) in DCM (8.0 ml) at 0° C. was added a solution of Intermediate 8 (1.54 g, 2.49 mmol) in DCM (4.0 ml). The solution was stirred at 0° C. for 30 minutes and then at RT for 16 hours. The solvent was removed under reduced pressure and a purification by flash chromatography ($SiO_2$, eluting with hexane-EtOAc (85:15)) gave Intermediate 9 as a colourless oil (1.30 g, 1.80 mmol, 72%).

$R_f$=0.36 (hexane-EtOAc 80:20); $^1$H NMR (500 MHz, $CDCl_3$, δ/ppm): 4.12 (2H, q, J=7.0 Hz, $OCH_2$), 3.72 (2H, t, J=6.7 Hz, H-1"), 3.57 (2H, br s, H-1' or H-2'), 3.37 (2H, br s, H-1' or H-2'), 3.27 (2H, br s, H-4), 2.44-2.32 (2H, m, H-2"), 2.28 (2H, t, J=7.3 Hz, H-2), 1.84 (2H, ap quint, J=7.3 Hz, H-3), 1.45 (9H, s, $C(CH_3)_3$), 1.25 (3H, t, J=7.0 Hz, $CH_3$); $^{13}$C NMR (125 MHz, $CDCl_3$, δ/ppm): 173.2 (C-1), 155.6 (C(O)N), 79.6 ($C(CH_3)_3$), 69.9 & 69.7 ($CH_2$, rotamers), 62.9 ($CH_2$), 60.3 ($CH_2$), 47.7 & 47.2 ($CH_2$, rotamers), 46.9 ($CH_2$), 31.6 (t, J=21.2 Hz, C-2"), 31.5 (C-2), 28.4 ($C(CH_3)_3$), 23.9 & 23.5 ($CH_2$, rotamers), 14.2 ($CH_3$), 8 carbons (7×$CF_2$, 1×$CF_3$) not observed; $^{19}$F NMR (282 MHz, $CDCl_3$, δ/ppm): −80.8 (t, J=10.0 Hz), −113.4 (quint, J=15.5 Hz), −121.7, −121.9, −122.7, −123.6, −126.1, 1 fluorous not observed; IR ($v_{max}$, neat, cm$^{-1}$): 2980, 2935, 1736 (C=O), 1729, 1693 (C=O), 1656, 1543, 1479, 1444, 1413, 1370, 1367, 1348, 1236, 1201, 1199, 1144, 1134, 1132, 1116, 1030; HRMS (ESI+) m/z Calculated for $C_{23}H_{29}F_{17}NO_5$ (M+H$^+$): 722.1769, found: 722.1778.

Intermediate 10: 4-(N-Boc-(2"-1H'",1H'",2H'",2H'"-Perfluorodecyloxyethyl)aminopropyl)-3,5-dimethyl-hepta-2,5-dien-4-ol

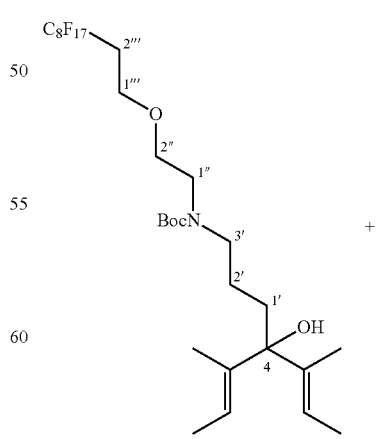

-continued

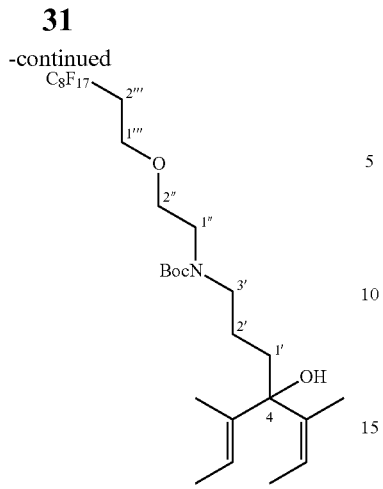

Lithium wire (300 mg, 43.2 mmol) was washed with hexane, cut into small pieces and suspended in Et$_2$O (10 ml). 2-Bromo-2-butene (1.0 ml, 10 mmol, mixture of cis and trans isomers) was added in one portion to the mixture and stirred until the reaction started, observed by the reflux of the solvent; another aliquot of 2-bromo-2-butene (1.33 ml, 13.0 mmol) diluted in Et$_2$O (10 ml) was added dropwise and the suspension was stirred for 2 hours at RT. The concentration of the organolithium was determined by titration with menthol (1.0 mmol) and 2,2'-bipyridyl (0.1 mmol). Intermediate 9 (1.35 g, 1.87 mmol) was dissolved in Et$_2$O (10 ml) and cooled at −78° C. The titrated organolithium (7.48 mmol) was added dropwise and the solution was stirred for 30 minutes at −78° C. before warming up to RT for 60 minutes. Saturated aqueous NH$_4$Cl (15 ml) was added and the two phases were separated. The aqueous phase was extracted with Et$_2$O (3×50 ml), the combined organic extracts were dried with Na$_2$SO$_4$ and the solvent was removed under reduced pressure. Purification by flash chromatography (SiO$_2$, eluting with hexane-EtOAc (90:10 to 85:15)) gave Intermediate 10 as a pale yellow oil as a 1:1 mixture of trans-trans and trans-cis isomers (849 mg, 1.08 mmol, 58%). A pure fraction of trans-trans isomer has been obtained after purification by chromatography and it has been used for characterisation.

R$_f$=0.36 (hexane-EtOAc 80:20); $^1$H NMR (500 MHz, CDCl$_3$, δ/ppm): 5.63-5.59 (2H, m, H-2 and H-6), 3.75-3.70 (2H, m, H-1'''), 3.57 (2H, br s, H-1" or H-2"), 3.37 (2H, br s, H-1" or H-2"), 3.26 (2H, br s, H-3'), 2.486-2.33 (2H, m, H-2'''), 1.86-1.58 (10 OH, m, 2CH$_2$ and 2CH$_3$), 1.55-1.44 (15H, m, 2CH$_3$ and C(CH$_3$)$_3$); $^{13}$C NMR (125 MHz, CDCl$_3$, δ/ppm): 155.7 (C(O)N), 138.1 (C$_q$CH$_3$), 118.9 (CH), 80.3 (C-4), 79.4 (C(CH$_3$)$_3$), 69.8 (CH$_2$), 62.9 (C-1'''), 48.8 (CH$_2$), 46.7 (CH$_2$), 31.6 (t, J=21.2 Hz, C-2'''), 28.4 (C(CH$_3$)$_3$), 22.9 (CH$_2$), 12.3 (CH$_3$), 11.6 (CH$_3$), 9 carbons (1×CH$_2$, 7×CF$_2$, 1×CF$_3$) not observed; $^{19}$F NMR (282 MHz, CDCl$_3$, δ/ppm): −80.7 (t, J=9.7 Hz), −113.4, −121.7, −121.9, −122.7, −123.6, −126.1, 1 fluorous not observed; IR (ν$_{max}$, neat, cm$^{-1}$): 3449 (O—H), 2976, 1674 (C=O), 1479, 1416, 1367, 1237, 1202, 1170, 1144, 1006; HRMS (ESI+) m/z: Calculated for C$_{29}$H$_{38}$F$_{17}$NNaO$_4$ (M+Na$^+$): 810.2422, found: 810.2417.

Intermediate 11: (R)—N-Boc-4-(3'-Amino-3'-isopropyl)propyl-3,5-dimethyl-hepta-2,5-dien-4-ol

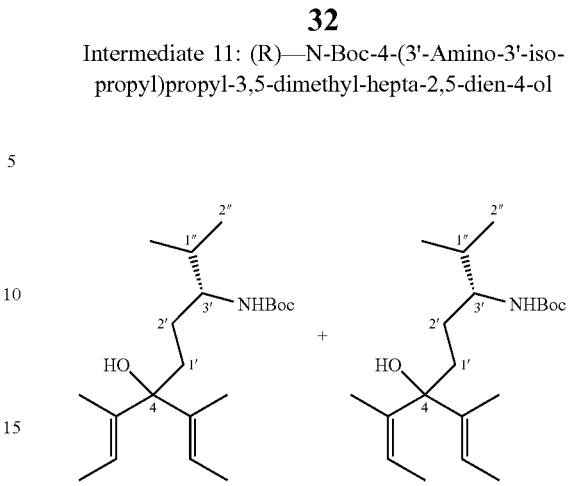

Lithium wire (300 mg, 43.2 mmol) was washed with hexane, cut into small pieces and suspended in Et$_2$O (10 ml). 2-Bromo-2-butene (1.0 ml, 10 mmol, mixture of cis and trans isomers) was added in one portion to the mixture and stirred until the reaction started, observed by the reflux of the solvent; another aliquot of 2-bromo-2-butene (1.3 ml, 13 mmol) in Et$_2$O (10 ml) was added dropwise and the suspension was stirred for 2 hours at RT. The concentration of the organolithium was determined by titration with menthol (1.0 mmol) and 2,2'-bipyridyl (0.1 mmol). (R)—N-t-Butoxycarbonyl-5-isopropyl-2-pyrrolidinone (prepared according to Smrcina et al, Tetrahedron, 1997, 53, 12867) (500 mg, 2.20 mmol) was diluted in Et$_2$O (6.0 ml) and cooled at 0° C. The titrated organolithium (4.40 mmol) was added dropwise, the solution was stirred at 0° C. for 30 minutes before warming up to RT for 60 minutes. Saturated aqueous NH$_4$Cl (30 ml) was carefully added and the two phases were separated. The product was extracted with Et$_2$O (2×30 ml). The combined organic phases were dried with Na$_2$SO$_4$ and the solvent was removed under reduced pressure. Purification by flash chromatography (SiO$_2$, eluting with hexane-EtOAc (90:10)) gave Intermediate 11 as a colourless oil in a mixture of trans-trans and trans-cis isomers (fraction major (trans-cis)/minor (trans-trans): 3/1) which was used without further purification (184 mg, 0.542 mmol, 25%).

R$_f$=0.74 (hexane-EtOAc 80:20); [α]$_D$=+7.8 (c=1.0, CHCl$_3$); $^1$H NMR (500 MHz, CDCl$_3$, δ/ppm): 5.57 (2H, q, J=6.2 Hz, 2CH for the trans-trans isomer), 5.43-5.27 (2H, m, 2CH for the trans-cis isomer), 4.30 (2H, br s, 2NH), 3.49-3.37 (2H, m, 2H-3'), 1.96-1.51 (30H, m, 8CH$_3$ and 2CH$_2$ and 2H-1"), 1.43 (18H, s, 2C(CH$_3$)$_3$), 1.39-1.16 (4H, m, 2CH$_2$), 0.91-0.85 (12H, m, 4H-2"); $^{13}$C NMR (125 MHz, CDCl$_3$, δ/ppm): 156.2 (C(O)), 140.2 (C$_q$CH$_3$), 139.7 (C$_q$CH$_3$), 138.2 (C$_q$CH$_3$), 122.6 (CH), 122.5 (CH), 122.4 (CH), 118.1 (CH), 80.8 (C(CH$_3$)$_3$), 79.5 (C-4), 78.8 (C-4), 56.1 (C-3'), 36.3 (CH$_2$), 34.3 (CH), 32.5 (CH$_2$), 28.4 (C(CH$_3$)$_3$), 27.0 (CH$_2$), 26.6 (CH$_2$), 23.5 (CH$_2$), 22.8 (CH$_3$), 19.2 (CH$_2$), 17.8 (CH$_2$), 14.8 (CH$_3$), 14.7 (CH$_3$), 14.4 (CH$_3$), 13.2 (CH$_3$), 12.6 (CH$_3$); HRMS (ESI+) m/z: Calculated for C$_{20}$H$_{37}$NNaO$_3$ (M+Na$^+$): 362.2666, found: 362.2672.

Intermediate 12: 4-(3'-Diethylaminopropyl)-3,5-dimethyl-hepta-2,5-dien-4-ol

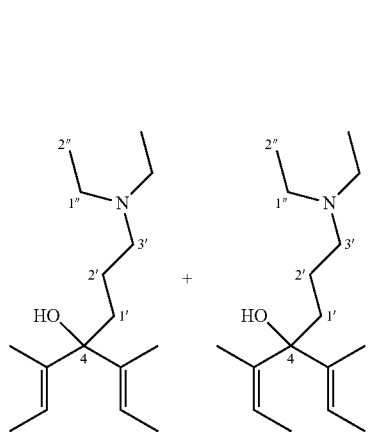

Lithium wire (470 mg, 67.0 mmol) was washed with hexane, cut into small pieces and suspended in Et$_2$O (15 ml). 2-Bromo-2-butene (1.6 ml, 16 mmol, mixture of cis and trans isomers) was added in one portion to the mixture and stirred until the reaction started, observed by the reflux of the solvent; another aliquot of 2-bromo-2-butene (2.0 ml, 20 mmol) in Et$_2$O (15 ml) was added dropwise and the suspension was stirred for 2 hours at RT. A solution of ethyl N,N-diethyl-4-aminobutanoate (3.00 g, 16.0 mmol) in Et$_2$O (10 ml) was added dropwise, stirred for 90 minutes at RT and quenched with careful addition of saturated aqueous NH$_4$Cl (100 ml). The phases were separated and the product was extracted with Et$_2$O (2×40 ml). The combined organic extracts were dried with Na$_2$SO$_4$ and the solvent was removed under reduced pressure. Purification by flash chromatography (SiO$_2$, eluting with hexane-EtOAc (80:20 to 0:100)) gave Intermediate 12 as a colourless oil as a 1:1 mixture of trans-trans and trans-cis isomers which was used without any other purification (3.70 g, 14.7 mmol, 92%).

$R_f$=0.39 (DCM-MeOH 90:10); $^1$H NMR (500 MHz, CDCl$_3$, δ/ppm): 5.63 (2H, q, J=6.7 Hz, 2CH for the trans-trans isomer), 5.59-5.55 (1H, m, CH for the trans-cis isomer), 5.38 (1H, q, J=7.2 Hz, CH for the trans-cis isomer), 2.56-2.48 (8H, m, 4H-1"), 2.45-2.35 (4H, m, 2H-3'), 2.04-1.87 (4H, m, 2CH$_2$), 1.78-1.73 (4H, m, 2CH$_2$), 1.64-1.46 (24H, m, 8CH$_3$), 1.04-0.99 (12H, m, 4H-2"); $^{13}$C NMR (125 MHz, CDCl$_3$, δ/ppm): 139.9 (C$_q$CH$_3$), 139.3 (C$_q$CH$_3$), 122.5 (CH for the trans-cis isomer), 118.3 (CH for the trans-trans isomer), 117.4 (CH for the trans-cis isomer), 79.7 (C-4), 79.0 (C-4), 54.4 (C-3'), 54.1 (C-3'), 45.8 (C-1"), 45.6 (C-1"), 37.5 (C-1'), 36.4 (C-1'), 23.7 (CH$_3$), 21.8 (CH$_2$), 21.6 (CH$_2$), 14.8 (CH$_3$), 14.2 (CH$_3$), 13.4 (CH$_3$), 13.2 (CH$_3$), 12.6 (CH$_3$), 10.5 (C-2'), 10.2 (C-2"); IR ($v_{max}$, neat, cm$^{-1}$): 3408 (O—H), 2970, 2813, 2813, 1455, 1377, 1293, 1195, 1066; HRMS (ESI+) m/z: Calculated for C$_{16}$H$_{32}$NO (M+H$^+$): 254.2478, found: 254.2484.

Intermediate 13: N,N-Diethyl-3-(tetramethylcyclopentadienyl)propan-1-amine

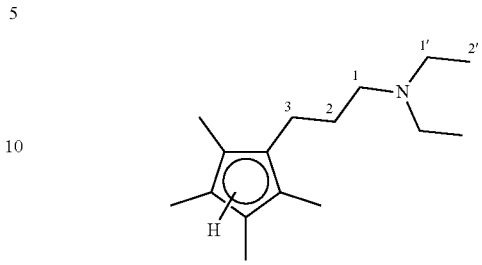

Prepared by a slightly modified version of the general method for the synthesis of cyclopentadienyls reported by Ito et al. (Organometallics, 2010, 29, 1886) as follows. To a stirred solution of intermediate 12 (1.29 g, 5.09 mmol) in methanol (3.0 ml) was added a 2 M solution of HCl in Et$_2$O (3.0 ml, 6.0 mmol). The resulting solution was stirred at room temperature for 4 hours and the solvent was removed under reduced pressure. Purification by flash chromatography (Al$_2$O$_3$ pH 9.5 t 0.5, eluting with DCM-MeOH (99:1)) gave Intermediate 13 as a pale yellow oil in an unresolved mixture of three isomers (705 mg, 2.99 mmol, 60%).

$R_f$=0.60 (Neutral aluminium oxide, DCM-MeOH 95:5); $^1$H NMR (500 MHz, CDCl$_3$, δ/ppm): 2.65-2.40 (1H, m, CH), 2.52 (4H, q, J=7.3 Hz, 2H-1'), 2.47-2.41 (2H, m, H-1), 2.35-2.11 (2H, m, H-3), 1.82-1.77 (9H, m, 3CH$_3$), 1.75-1.78 (2H, m, H-2), 1.05-0.96 (9H, m, CH$_3$ and 2H-2'); $^{13}$C NMR (125 MHz, CDCl$_3$, δ/ppm): 142.2 (C$_q$CH$_3$), 138.4 (C$_q$CH$_3$), 138.3 (C$_q$CH$_3$), 138.1 (C$_q$CH$_3$), 135.6 (C$_q$CH$_3$), 135.3 (C$_q$CH$_3$), 134.5 (C$_q$CH$_3$), 134.0 (C$_q$CH$_3$), 133.6 (C$_q$CH$_3$), 55.9 (CH), 53.4 (CH$_2$), 53.1 (CH$_2$), 52.7 (CH$_2$), 52.0 (CH$_2$), 51.5 (CH), 49.4 (CH), 46.9 (C-1'), 27.8 (CH$_2$), 26.7 (CH$_2$), 25.6 (CH$_2$), 24.3 (CH$_2$), 23.7 (CH$_2$), 22.4 (CH$_2$), 21.0 (CH$_2$), 14.2 (CH$_3$), 14.1 (CH$_3$), 11.8 (CH$_3$), 11.7 (CH$_3$), 11.6 (CH$_3$), 11.1 (CH$_3$), 11.0 (CH$_3$); IR ($v_{max}$, neat, cm$^{-1}$): 2968, 2934, 2870, 2799, 1742, 1656, 1445, 1381, 1294, 1201, 1070; HRMS (ESI+) m/z: Calculated for C$_{16}$H$_{30}$N (M+H$^+$): 236.2373, found: 236.2376.

Intermediate 14: N-Boc-4-(4'-Aminobutyl)-3,5-dimethyl-hepta-2,5-dien-4-ol

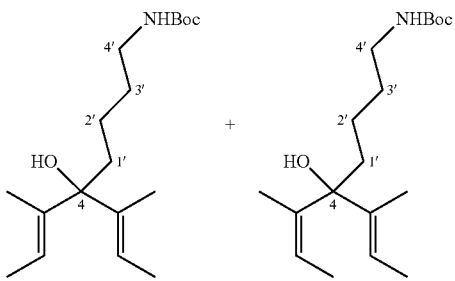 [SMILES: C/C=C(\C)C(O)(CCCCNC(=O)OC(C)(C)C)/C(C)=C/C ; C/C=C(/C)C(O)(CCCCNC(=O)OC(C)(C)C)/C(C)=C/C]

Lithium wire (437 mg, 63.0 mmol) was washed with hexane, cut into small pieces and suspended in Et$_2$O (10 ml). 2-Bromo-2-butene (1.3 ml, 13 mmol, mixture of cis and trans isomers) was added in one portion to the mixture and stirred until the reaction started, observed by the reflux of the solvent; another aliquot of 2-bromo-2-butene (2.0 ml, 20 mmol) in Et$_2$O (10 ml) was added dropwise and the suspension was stirred for 2 hours at RT. A solution of N-Boc-2-piperidinone (3.00 g, 15.0 mmol) in Et$_2$O (20 ml) was added dropwise, the mixture was stirred for 1 hour and quenched with careful addition of saturated aqueous NH$_4$Cl (60 ml). The phases were separated and the product was extracted with Et$_2$O (2×30 ml). The combined organic phases were dried with Na$_2$SO$_4$ and the solvent was removed under reduced pressure. Purification by flash chromatography (SiO$_2$, eluting with hexane-EtOAc (90:10)) gave Intermediate 14 as a colourless oil as a mixture of trans-trans and trans-cis isomers (fraction major (trans-cis)/ minor (trans-trans): 3/2) which was used without any other purification (940 mg, 3.00 mmol, 20%).

R$_f$=0.50 (hexane-EtOAc 70:30); $^1$H NMR (500 MHz, CDCl$_3$, δ/ppm): 5.57 (2H, q, J=6.5 Hz, 2CH for the trans-trans isomer), 5.34 (2H, dq, J=1.3, 7.5 Hz, 2CH for the trans-cis isomer), 4.54 (2H, br s, 2NH), 3.12 (4H, br s, 2H-4'), 1.84-1.71 (6H, m, 2H-1' and 2OH), 1.69-1.60 (24H, m, 8CH$_3$), 1.53-1.46 (8H, m, 4CH$_2$), 1.44 (18H, s, 2C (CH$_3$)$_3$); $^{13}$C NMR (125 MHz, CDCl$_3$, δ/ppm): 156.1 (C(O)N), 140.2 (C$_q$CH$_3$), 139.6 (C$_q$CH$_3$), 138.1 (C$_q$CH$_3$), 122.5 (CH for the trans-cis isomer), 122.4 (CH for the trans-cis isomer), 118.9 (CH for the trans-trans isomer), 118.1 (CH for the trans-trans isomer), 80.8 (C(CH$_3$)$_3$), 79.4 (C-4), 79.1 (C-4'), 40.4 (C-4'), 39.4 (C-1'), 37.6 (C-1'), 28.4 (C(CH$_3$)$_3$), 23.4 (CH$_3$), 22.8 (CH$_3$), 20.7 (CH$_2$), 20.5 (CH$_2$), 14.8 (CH$_3$), 14.4 (CH$_3$), 13.4 (CH$_3$), 13.2 (CH$_3$), 12.6 (CH$_3$), 12.4 (CH$_3$); IR (ν$_{max}$, neat, cm$^{-1}$): 3364 (N—H and O—H), 2975, 2933, 2865, 1695 (C=O), 1515, 1454, 1366, 1251, 1172, 1003; HRMS (ESI+) m/h: Calculated for C$_{18}$H$_{33}$NNaO$_3$ (M+Na$^+$): 334.2353, found: 334.2357.

Intermediate 15: (S)-tert-Butyl 2-{(4E/Z)-3-[(2E)-but-2-en-2-yl]-3-hydroxy-4-methylhex-4-en-1-yl}pyrrolidine-1-carboxylate

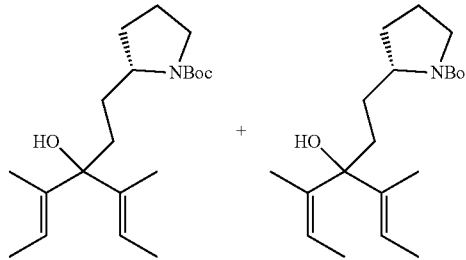

Lithium wire (300 mg, 43.2 mmol) was washed with hexane, cut into small pieces and suspended in Et$_2$O (10 ml). 2-Bromo-2-butene (1.0 ml, 10 mmol, mixture of cis and trans isomers) was added in one portion to the mixture and stirred until the reaction started, observed by the reflux of the solvent. Following this the remainder of the 2-bromo-2-butene (1.3 ml, 13 mmol) in Et$_2$O (10 ml) was added dropwise and the suspension was stirred for 1 hour at RT. The concentration of the organolithium was determined by titration with menthol (1.0 mmol) and 2,2'-bipyridyl (0.1 mmol). (2S)—N-t-Butoxycarbonyl-2-(3'-methoxy-3'-oxo-1'-propyl)pyrrolidine (Org. Lett., 2008, 10, 3045) (100 mg, 0.40 mmol) was diluted in Et$_2$O (3.0 ml) and cooled at −78° C. The titrated organolithium (1.60 mmol) was added dropwise, the solution was stirred for 5 minutes before warming up to RT and stirring for 90 minutes. Saturated aqueous NH$_4$Cl (25 ml) was carefully added and the two phases were separated. The product was extracted with Et$_2$O (3×20 ml). The combined organic phases were dried with Na$_2$SO$_4$ and the solvent was removed under reduced pressure. Purification by flash chromatography (SiO$_2$, eluting with hexane-EtOAc (80:20)) gave Intermediate 15 as a colourless oil in a 3:1 mixture of trans-trans and trans-cis isomers which was used without further purification (91 mg, 0.27 mmol, 61%).

R$_f$=0.32 (hexane-EtOAc 80:20); [α]$_D$=−30.5 (c=1.0, CHCl$_3$); $^1$H NMR (500 MHz, CDCl$_3$, δ/ppm): 5.61 (2H, q, J=6.6, 2CH for trans-trans isomer), 5.40-5.31 (2H, m, 2CH for the trans-cis isomer), 3.43-3.38 (2H, m, 2 NCH), 3.36-3.31 (4H, m, 4NHCH$_2$), 1.93-1.77 (10H, m, 2×CH$_3$ and 2×CH$_2$), 1.73-1.55 (30H, m, 10×CH$_3$), 1.35-1.25 (4H, m, 2×CH$_2$); $^{13}$C NMR (125 MHz, CDCl$_3$, δ/ppm): 154.8, 139.5, 138.3, 137.8, 122.5, 122.5, 118.9, 78.9, 57.5, 56.9, 46.4, 46.1, 33.1, 30.8, 28.7, 28.5, 23.7, 23.4, 23.2, 14.8, 14.4, 13.4, 13.2, 12.3 (one C signal missing from C$_q$OH); HRMS (ESI+) m/r Calculated for C$_{20}$H$_{35}$NNaO$_3$ (M+Na$^+$): 360.2515, found: 360.2509.

Metal Complex Synthesis

Example 1: RhCl$_2$[η$^5$:η$^1$-C$_5$(CH$_3$)$_4$(CH$_2$)$_3$N(CH$_2$CH$_2$OCH$_2$CH$_2$C$_8$F$_{17}$)H]

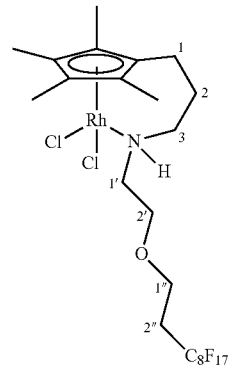

To a stirred solution of Intermediate 10 (386 mg, 0.490 mmol) in methanol (4.0 ml) was added RhCl$_3$.hydrate (51 mg, 0.25 mmol). The mixture was heated at reflux for 20 hours and the solvent was removed under reduced pressure. Purification by flash chromatography (SiO$_2$, eluting with DCM-MeOH (97:3 to 95:5)) gave the title compound as a red solid (74 mg, 88 μmol, 35%).

R$_f$=0.53 (DCM-MeOH 97:3); mp 133.3-134.6° C. (DCM-hexane, v/v=1/2); $^1$H NMR (500 MHz, CDCl$_3$, δ/ppm): 3.85-3.76 (1H, m, CH$_2$), 3.73-3.49 (4H, 2CH$_2$), 2.91-2.84 (1H, m, CH$_2$), 2.79-2.67 (2H, m, CH$_2$), 2.45-2.31 (2H, m, H-2"), 2.25-1.91 (4H, m, 2CH$_2$), 1.76 (3H, s, CH$_3$), 1.73 (3H, s, CH$_3$), 1.67 (3H, s, CH$_3$), 1.64 (3H, s, CH$_3$); $^{13}$C NMR (125 MHz, CDCl$_3$, δ/ppm): 103.0 (d, J=7.5 Hz, C$_q$Rh), 94.3 (d, J=8.8 Hz, C$_q$Rh), 93.2 (d, J=8.0 Hz, C$_q$Rh), 92.0 (d, J=9.1 Hz, C$_q$Rh), 85.1 (d, J=9.6 Hz, C$_q$Rh), 69.0 (C-3), 62.7 (CH$_2$), 50.7 (CH$_2$), 48.3 (CH$_2$), 31.4 (t, J=21.2 Hz, C-2'), 27.0 (CH$_2$), 19.4 (CH$_2$), 9.9 (CH$_3$), 9.4 (CH$_3$), 9.1 (CH$_3$), 9.1 (CH$_3$), 8 carbons (7×CF$_2$, 1×CF$_3$) not observed; $^{19}$F NMR (282 MHz, CDCl$_3$, δ/ppm): −80.8 (t, J=9.8 Hz), −113.3, −121.6, −121.9, −122.7, −123.5, −126.1, 1 fluorous not observed; IR (ν$_{max}$, neat, cm$^{-1}$): 3272 (N—H), 2918, 1487, 1440, 1370, 1331, 1243, 1200, 1145, 1114, 1006; HRMS (ESI+) m/z: Calculated for C$_{24}$H$_{27}$F$_{17}$$^{35}$ClNORh (M–Cl⁻, 100%): 806.0559, found: 806.0552, calculated for $C_{24}H_{27}F_{17}{}^{37}ClNORh$ (M–Cl⁻, 35%): 808.0539, found: 808.0533; Anal. Calcd. For $C_{24}H_{27}Cl_2F_{17}NORh$: C, 34.22; H, 3.23; N, 1.66. Found C, 34.40; H, 3.20; N, 1.60.

Example 2: $[Rh(\{\eta^5:\eta^1-C_5(CH_3)_4(CH_2)_3NH_2\}\{CH_3CN\}_2][SbF_6]_2$

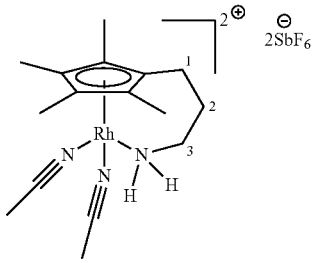

To a stirred solution of known rhodium complex $[Cl_2Rh\{\eta^5:\eta^1-C_5(CH_3)_4(CH_2)_3NH_2\}]$(Ito et al, Organometallics, 2010, 29, 1886) 2 (50 mg, 0.14 mmol) in acetonitrile (4.0 ml) was added silver hexafluoroantimonate (96 mg, 0.28 mmol). The mixture was heated at 70° C. for 24 hours, the crude was filtered through a pad of Celite®, washed with MeCN and the solvent was removed under reduced pressure. Purification by crystallization from MeCN-Et₂O (v/v=1/2) gave the title compound as a yellow powder (71 mg, 90 μmol, 61%). Single crystals were achieved by recrystallization from MeCN-Et₂O (v/v=1/2).

mp >250° C. (MeCN); ¹H NMR (500 MHz, DMSO, δ/ppm): 4.22 (2H, br s, NH₂), 2.59 (2H, br s, H-3), 2.17-2.11 (2H, m, H-1), 2.06-2.01 (8H, m, H-2 and 2CH₃CN), 1.70 (6H, s, 2CH₃), 1.44 (6H, s, 2CH₃); ¹³C NMR (125 MHz, DMSO, δ/ppm): 119.0 (C≡N), 102.7-101.4 (m, $C_q$Rh), 86.1-85.2 (m, $C_q$Rh), 41.3 (C-3), 29.8 (C-2), 18.7 (C-1), 7.4 (CH₃), 7.2 (CH₃), 2.1 (CH₃CN), one carbon ($C_q$Rh) not observed; IR ($v_{max}$, neat, cm⁻¹): 3328 (N—H), 3284 (N—H), 2321, 2291, 1594, 1455, 1370, 1163, 1083, 1021; HRMS (ESI+) m/z: Calculated for $C_{12}H_{20}F_6NRh^{121}Sb$ (M–[SbF₆⁻]-2MeCN, 100%): 515.9593, found: 515.9588; calculated for $C_{12}H_{20}F_6NRh^{123}Sb$ (M–[SbF₆⁻]-2MeCN, 68%): 517.9598, found: 517.9590; Anal. Calcd. For $C_{16}H_{26}F_{12}N_3RhSb_2$: C, 23.02; H, 3.14; N, 5.03. Found C, 23.20; H, 3.10; N, 4.90.

Example 3: $IrCl_2[\eta_5:\eta^1-C_5(CH_3)_4(CH_2)_3NH_2]$

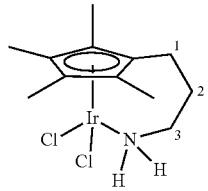

To a stirred suspension of IrCl₃.hydrate (670 mg, 2.24 mmol) and NaHCO₃ (190 mg, 2.24 mmol) in methanol (15 ml) was added Intermediate 2 (1.34 g, 4.48 mmol). Microwave heating was applied to the reaction mixture with a set temperature of 130° C. for 2 hours with a pressure of 120 psi and, after cooling at RT, the solvent was removed under reduced pressure. Purification by flash chromatography (SiO₂, eluting with DCM-MeOH (98:2)) gave the title compound as a yellow solid (427 mg, 0.968 mmol, 44%). Single crystals were achieved by recrystallization from DCM-hexane (v/v=1/3).

$R_f$=0.67 (DCM-MeOH 90:10); mp >250° C. (DCM-hexane, v/v=1/3); ¹H NMR (500 MHz, CDCl₃, δ/ppm): 3.94 (2H, brs, NH₂), 2.72-2.68 (2H, m, H-3), 2.18 (2H, t, J=6.3 Hz, H-1), 1.96-1.91 (2H, m, H-2), 1.78 (6H, s, 2CH₃), 1.67 (6H, s, 2CH₃); ¹³C NMR (125 MHz, CDCl₃, δ/ppm): 90.8 ($C_q$Ir), 88.7 ($C_q$Ir), 41.9 (C-3), 30.7 (C-2), 19.2 (C-1), 9.2 (CH₃), 9.0 (CH₃), one carbon ($C_q$Ir) not observed; IR ($v_{max}$, neat, cm⁻¹): 3234 (N—H), 3153 (N—H), 2948, 2877, 1593, 1444, 1376, 1269, 1240, 1165, 1083, 1038; HRMS (ESI+) m/z: Calculated for $C_{12}H_{20}{}^{35}Cl^{193}IrN$ (M–Cl⁻, 50%): 404.0885, found: 404.0883; calculated for $C_{12}H_{20}{}^{37}Cl^{191}IrN$ and $C_{12}H_{20}{}^{35}Cl^{192}IrN$ (M–Cl⁻, 100%): 406.0900, found: 406.0901; calculated for $C_{13}H_{22}{}^{37}Cl^{193}IrN$ (M–Cl⁻, 26%): 408.0879, found: 408.0878; Anal. Calcd. For $C_{12}H_{20}Cl_2IrN$: C, 32.65; H, 4.57; N, 3.17; Cl, 16.06. Found C, 32.95; H, 4.50; N, 3.00, Cl, 16.00.

Example 4: $IrCl_2[\eta_5:\eta^1-C_5(CH_3)_4(CH_2)_3N(CH_3)H]$

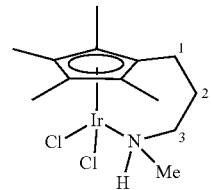

To a stirred suspension of IrCl₃.hydrate (70 mg, 0.23 mmol) and NaHCO₃ (20 mg, 0.23 mmol) in methanol (3.0 ml) was added the intermediate 4 (143 mg, 0.46 mmol). Microwave heating was applied to the reaction mixture with a set temperature of 140° C. for 2 hours with a pressure of 200 psi and, after cooling at RT, the solvent was removed under reduced pressure. Purification by flash chromatography (SiO₂, eluting with DCM-MeOH (98:2)) gave the title compound as a yellow solid (32 mg, 0.070 mmol, 30%). Single crystals were achieved by slow recrystallization from DCM.

$R_f$=0.47 (DCM-MeOH 90:10); mp 186.4-187.0° C. (DCM-hexane); ¹H NMR (500 MHz, CDCl₃, δ/ppm): 4.22 (1H, br s, NH), 2.86-2.81 (1H, m, $H_a$-3), 2.77-2.73 (1H, m, He-3), 2.72 (3H, d, J=6.0 Hz, NCH₃), 2.24-2.17 (1H, m, CH₂), 2.15-2.10 (2H, m, CH₂), 2.00-1.93 (1H, m, CH₂), 1.71 (3H, s, CH₃), 1.70 (3H, s, CH₃), 1.66 (3H, s, CH₃), 1.64 (3H, s, CH₃); ¹³C NMR (125 MHz, CDCl₃, δ/ppm): 97.5 ($C_q$Ir), 85.7 ($C_q$Ir), 85.4 ($C_q$Ir), 53.3 (C-3), 39.6 (NCH₃), 26.1 (CH₂), 19.3 (CH₂), 9.3 (CH₃), 9.2 (CH₃), 9.1 (CH₃), 9.0 (CH₃), two carbons ($C_q$Ir) not observed; IR ($v_{max}$, neat, cm⁻¹): 3178 (N—H), 2990, 2970, 2923, 1738, 1455, 1374, 1228, 1217, 1064, 1028; HRMS (ESI+) m/z: Calculated for $C_{13}H_{22}{}^{35}Cl^{191}IrN$ (M–Cl⁻, 50%): 418.1041, found: 418.1044; calculated for $C_{13}H_{22}{}^{37}Cl^{191}IrN$ and $C_{13}H_{22}{}^{35}Cl^{193}IrN$ (M–Cl⁻, 100%): 420.1056, found: 420.1052; calculated for $C_{13}H_{22}{}^{37}Cl^{193}IrN$ (M–Cl⁻, 23%): 422.1035, found: 422.1029; Anal. Calcd. For $C_{13}H_{22}Cl_2IrN$: C, 34.28; H, 4.87; N, 3.08; Cl 15.57. Found C, 34.40; H, 4.80; N, 3.00; Cl, 15.30.

Example 5: $Ir_2Cl_4[\eta^5-C_5(CH_3)_4(CH_2)_3NMe_2 \cdot HCl]_2$

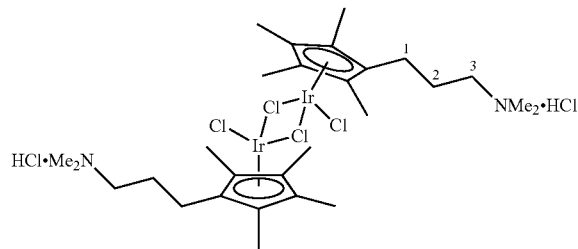

To a stirred suspension of $IrCl_3$.hydrate (100 mg, 0.334 mmol) in methanol (3.0 ml) was added the Intermediate 6 (321 mg, 1.32 mmol). Microwave heating was applied to the reaction mixture with a set temperature of 120° C. for 1 hour with a pressure of 90 psi. From the resulting mixture, the orange solid was filtered and dried under reduced pressure to give the title compound as an orange powder (155 mg, 0.153 mmol, 93%). The formation of the hydrochloride salt was determined by comparing the NMR signals with a similar complex reported in the literature (Organometallics, 2010, 29, 1886)

$^1H$ NMR (500 MHz, DMSO, δ/ppm): 10.11 (2H, br s, NH), 3.11-3.08 (4H, m, 2H-3), 2.72 (12H, s, 4NCH$_3$), 2.10 (4H, t, J=8.3 Hz, 2H-1), 1.84-1.79 (4H, m, 2H-2), 1.70 (12H, s, 4CH$_3$), 1.64 (12H, s, 4CH$_3$); $^{13}$C NMR (125 MHz, DMSO, δ/ppm): 94.1 ($C_q$Ir), 92.1 ($C_q$Ir), 89.9 ($C_q$Ir), 56.1 (C-3), 42.0 (NCH$_3$), 22.1 (C-2), 20.2 (C-1), 8.3 (CH$_3$), 8.2 (CH$_3$); IR ($v_{max}$, neat, cm$^{-1}$): 3011, 1453, 1406, 1375, 1031; HRMS (ESI+) m/z: Calculated for $C_{28}H_{48}{}^{35}Cl_2{}^{37}Cl{}^{191}Ir_2N_2$ and $C_{28}H_{48}{}^{35}Cl_3{}^{191}Ir{}^{193}IrN_2$ (M−[2HCl]−Cl$^-$, 63%): 901.2102, found: 901.2112; calculated for $C_{28}H_{48}{}^{35}Cl{}^{37}Cl_2{}^{191}Ir_2N_2$, $C_{28}H_{48}{}^{35}Cl_2{}^{37}Cl{}^{191}Ir{}^{193}IrN_2$ and $C_{28}H_{48}{}^{35}Cl{}^{37}Cl{}^{193}Ir_2N_2$ (M−[2HCl]−Cl$^-$, 100%): 903.2106, found: 903.2109; calculated for $C_{28}H_{48}{}^{37}Cl_3{}^{191}Ir_2N_2$, $C_{28}H_{48}{}^{35}Cl{}^{37}Cl_2{}^{191}Ir{}^{193}IrN_2$ and $C_{28}H_{48}{}^{35}Cl_2{}^{37}Cl{}^{193}Ir_2N_2$ (M−[2HCl]−Cl$^-$, 65%): 905.2097, found: 905.2102; Anal. Calcd. For $C_{28}H_{50}Cl_6Ir_2N_2$: C, 33.24; H, 4.98; N, 2.77; Cl, 21.02. Found C, 33.10; H, 4.90; N, 2.60; Cl, 20.60.

Example 6: $IrCl_2[\eta^5:\eta^1-C_5(CH_3)_4(CH_2)_3N(CH_3)N(CH_3)_2]$

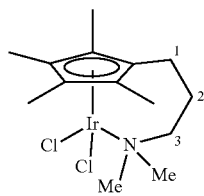

To a suspension of Example 5 (107 mg, 0.106 mmol) in DCM (10 ml) was added potassium tert-butoxide (25 mg, 0.22 μmol) and the reaction mixture was stirred at room temperature for 15 hours. The mixture was filtered through a pad of Celite®, washed with DCM and the solvent was removed under reduced pressure. Crystallization from DCM-hexane gave the title compound as an orange solid (93 mg, 0.20 mmol, 90%). Single crystals were achieved by slow recrystallization from DCM-hexane (v/v=1/2).

$R_f$=0.90 (DCM-MeOH 90:10); mp 198.3-199.5° C. (DCM-hexane, v/v=1/2); $^1$H NMR (500 MHz, CDCl$_3$, δ/ppm): 2.77 (6H, s, 2NCH$_3$), 2.60-2.58 (2H, m, H-3), 2.15-2.08 (4H, m, 2CH$_2$), 1.60 (6H, s, 2CH$_3$), 1.59 (6H, s, 2CH$_3$); $^{13}$C NMR (125 MHz, CDCl$_3$, δ/ppm): 89.1 ($C_q$Ir), 84.7 ($C_q$Ir), 80.6 ($C_q$Ir), 64.2 (C-3), 52.7 (NCH$_3$), 25.3 (CH$_2$), 19.0 (CH$_2$), 9.3 (CH$_3$), 9.1 (CH$_3$); IR ($v_{max}$, neat, cm$^{-1}$): 2917, 1477, 1448, 1435, 1375, 1029, 1002; HRMS (ESI+) m/z: Calculated for $C_{14}H_{24}{}^{37}Cl{}^{191}IrN$ (M−Cl$^-$, 49%): 432.1198, found: 432.1197; calculated for $C_{14}H_{24}{}^{37}Cl{}^{191}IrN$ and $C_{14}H_{24}{}^{35}Cl{}^{193}IrN$ (M−Cl$^-$, 100%): 434.1213, found: 434.1215; calculated for $C_{14}H_{24}{}^{37}Cl{}^{193}IrN$ (M−Cl$^-$, 27%): 436.1195, found: 436.1193; Anal. Calcd. For $C_{14}H_{24}Cl_2IrN$: C, 35.82; H, 5.15; N, 2.98; Cl, 15.10. Found C, 36.20; H, 5.15; N, 2.90; Cl, 14.75.

Example 7: $IrI_2[\eta^5:\eta^1-C_5(CH_3)_4(CH_2)_3NH_2]$

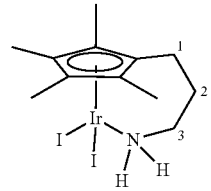

To a stirred solution of Example 3 (70 mg, 0.16 mmol) in degassed acetone (10 ml) was added sodium iodide (52 mg, 0.35 mmol). The reaction mixture was heated at reflux for 18 hours, cooled to RT and the solvent was removed under reduced pressure. The residue was dissolved in DCM (20 ml) and water (15 ml) and the two phases were separated. The product was extracted with DCM (2×20 ml) and the combined organic phases were washed with brine (40 ml) and dried with Na$_2$SO$_4$. The solvent was removed under reduced pressure. Purification by crystallization from DCM-hexane (v/v=1/2) gave the title compound as an orange solid (72 mg, 0.12 mmol, 75%).

$R_f$=0.88 (DCM-MeOH 90:10); mp >250° C. (DCM); $^1$H NMR (500 MHz, CDCl$_3$, δ/ppm): 3.92 (2H, br s, NH$_2$), 2.58-2.54 (2H, m, H-3), 2.20 (2H, t, J=6.3 Hz, H-1), 2.05 (6H, s, 2CH$_3$), 1.92 (6H, s, 2CH$_3$), 1.85-1.81 (2H, m, H-2); $^{13}$C NMR (125 MHz, CDCl$_3$, δ/ppm): 89.8 ($C_q$Ir), 89.7 ($C_q$Ir), 81.1 ($C_q$Ir), 42.5 (C-3), 29.1 (C-2), 19.3 (C-1), 12.2 (CH$_3$), 10.1 (CH$_3$); IR ($v_{max}$, neat, cm$^{-1}$): 3214 (N—H), 3139 (N—H), 2908, 1579, 1458, 1371, 1309, 1262, 1157, 1070, 1022; HRMS (ESI+) m/z: Calculated for $C_{12}H_{20}I{}^{191}IrN$ (M−I$^-$, 64%): 496.0241, found: 496.0237; calculated for $C_{12}H_{20}I{}^{193}IrN$ (M−I$^-$, 100%): 498.0264, found: 498.0263; Anal. Calcd. For $C_{12}H_{20}I_2IrN$: C, 23.09; H, 3.23; N, 2.24. Found C, 23.55; H, 3.30; N, 2.20. Elemental analysis data for C outside the range (+0.4), but best value to date.

Example 8: $IrI_2[\eta^5:\eta^1\text{-}C_5(CH_3)_4(CH_2)_3N(CH_3)_2]$

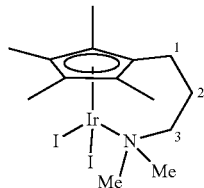

To a stirred solution of Example 6 (93 mg, 0.20 mmol) in degassed acetone (12 ml) was added sodium iodide (66 mg, 0.44 mmol). The reaction mixture was heated at reflux for 17 hours, it was cooled to room temperature and the solvent was removed under reduced pressure. The residue was dissolved in DCM (30 ml) and water (30 ml) and the two phases were separated. The product was extracted with DCM (2×30 ml), the combined organic phases were dried with $Na_2SO_4$ and the solvent was removed under reduced pressure. Purification by crystallization from DCM-hexane (v/v=1/2) gave the title compound as bright red crystals (125 mg, 0.192 mmol, 96%).

mp 203.0-204.7° C. (CHCl$_3$); H NMR (500 MHz, CDCl$_3$, δ/ppm): 3.13 (6H, s, 2NCH$_3$), 2.57 (2H, br s, H-3), 2.05 (4H, s, 2CH$_2$), 1.87 (6H, s, 2CH$_3$), 1.82 (6H, s, 2CH$_3$); $^{13}$C NMR (125 MHz, CDCl$_3$, δ/ppm): 88.0 ($C_q$Ir), 86.7 ($C_q$Ir), 85.1 ($C_q$Ir), 64.9 (C-3), 58.9 (NCH$_3$), 24.9 (CH$_2$), 18.4 (CH$_2$), 12.4 (CH$_3$), 11.0 (CH$_3$); IR ($v_{max}$, neat, cm$^{-1}$): 2906, 1452, 1439, 1374, 1364, 1029; HRMS (ESI+) m/z: Calculated for $C_{14}H_{24}I^{191}IrN$ (M−I$^−$, 54%): 524.0554, found: 524.0551; calculated for $C_{14}H_{24}I^{193}IrN$ (M−I$^−$, 100%): 526.0578, found: 526.0574; Anal. Calcd. For $C_{14}H_{24}I_2IrN$: C, 25.78; H, 3.71; N, 2.15; I, 38.91. Found C, 26.15; H, 3.70; N, 2.00; I, 38.45. Elemental analysis data for I outside the range (+0.4), but best value to date.

Example 9: (R)—$IrCl_2[\eta^5:\eta_1\text{-}C_5(CH_3)_4(CH_2)_2(CH(CH(CH_3)_2)NH_2]$

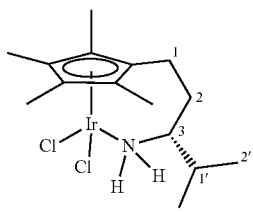

To a stirred suspension of IrCl$_3$·hydrate (80 mg, 0.27 mmol) and NaHCO$_3$ (23 mg, 0.27 mmol) in methanol (3.0 ml) was added Intermediate 11 (184 mg, 0.542 mmol). Microwave heating was applied to the reaction mixture with a set temperature of 125° C. for 2 hours with a pressure of 130 psi and, upon cooling down to RT, the solvent was removed under reduced pressure. Purification by flash chromatography (SiO$_2$, eluting with DCM-MeOH (97:3)) followed by crystallisation from DCM-hexane (v/v=1/3) gave the title compound as a yellow solid (35 mg, 0.072 mmol, 27%). Single crystals were achieved by recrystallization from DCM-hexane (v/v=1/3).

$R_f$=0.71 (DCM-MeOH 95:5); [α]$_D$=−12.18 (c=1.0, CHCl$_3$); mp 250.8-252.9° C. (decomposition, DCM-hexane, v/v=1/3); $^1$H NMR (500 MHz, CDCl$_3$, δ/ppm): 4.08 (1H, br s, NH), 3.27 (1H, br s, NH), 2.43-2.30 (2H, m, H-3 and H$_A$-1), 2.19-2.02 (2H, m, H$_B$-1 and H$_A$-2), 1.94-1.82 (1H, m, H-1'), 1.78 (3H, s, CH$_3$), 1.77 (3H, s, CH$_3$), 1.69 (6H, s, 2CH$_3$), 1.57-1.42 (1H, m, He-2), 0.98-0.95 (6H, m, 2H-2'); $^{13}$C NMR (125 MHz, CDCl$_3$, δ/ppm): 90.6 ($C_q$Ir), 90.2 ($C_q$Ir), 90.0 ($C_q$Ir), 59.2 (C-3), 33.4 (C-2), 33.3 (C-1'), 20.3 (C-1), 18.2 (C-2'), 18.1 (C-2'), 9.3 (CH$_3$), 9.1 (CH$_3$), 9.0 (CH$_3$), 8.9 (CH$_3$), two carbons ($C_q$Ir) not observed; IR ($v_{max}$, neat, cm$^{-1}$): 3299 (N—H), 3207 (N—H), 2962, 2920, 2876, 1575, 1478, 1455, 1369, 1338, 1282, 1261, 1186, 1168, 1102, 1059, 1034; HRMS (ESI+) m/z: Calculated for $C_{15}H_{26}^{37}Cl^{191}IrN$ and $C_{15}H_{26}^{35}Cl^{193}IrN$ (M−Cl$^−$, 100%): 448.1369, found: 448.1368; Anal. Calcd. For $C_{15}H_{26}Cl_2IrN$: C, 37.26; H, 5.42; N, 2.90; Cl, 14.67. Found C, 37.60; H, 5.40; N, 2.80; Cl, 14.40.

Example 10: $[Ir\{\eta^5:\eta^1\text{-}C_5(CH_3)_4(CH_2)_3NH_2\}\{bipyridyl\}][Cl]_2$

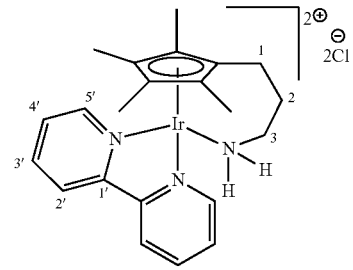

To a stirred solution of Example 3 (70 mg, 0.16 mmol) in chloroform (3.0 ml) was added 2,2'-bipyridyl (25 mg, 0.16 mmol). The reaction mixture was stirred overnight at RT and the solvent was slowly evaporated to half of its volume. The resulting precipitate was filtered to give the title compound as pale yellow crystals (90 mg, 0.15 mmol, 94%). Single crystals were achieved by slow crystallization from chloroform.

mp 197.6-199.2° C. (decomposition, CHCl$_3$); $^1$H NMR (500 MHz, MeOD, δ/ppm): 8.92 (2H, d, J=5.7 Hz, 2H-5'), 8.65 (2H, d, J=8.0 Hz, 2H-2'), 8.30 (2H, ap dt, J=8.0, 1.4 Hz, 2H-3'), 7.84 (2H, ddd, J=8.0, 5.7, 1.3 Hz, 2H-4'), 2.49-2.45 (2H, m, H-3), 2.44-2.41 (2H, m, H-1), 1.96-1.92 (2H, m, H-2), 1.80 (6H, s, 2CH$_3$), 1.41 (6H, s, 2CH$_3$); $^{13}$C NMR (125 MHz, MeOD, δ/ppm): 157.4 (C-1'), 153.6 (C-5'), 142.5 (C-3'), 130.6 (C-4'), 126.0 (C-2'), 101.2 ($C_q$Ir), 97.5 ($C_q$Ir), 80.3 ($C_q$Ir), 43.1 (C-3), 29.7 (C-2), 19.4 (C-1), 8.2 (CH$_3$), 8.1 (CH$_3$); IR ($v_{max}$, neat, cm$^{-1}$): 3448 (N—H), 3365 (N—H), 3116, 3043, 1698, 1607, 1472, 1446, 1314, 1210, 1162, 1076, 1033; HRMS (ESI+) m/z: Calculated for $C_{22}H_{28}^{191}IrN_3$ (M−2Cl$^−$, 56%): 262.5939, found: 262.5944; calculated for $C_{22}H_{28}^{193}IrN_3$ (M−2Cl$^−$, 100%): 263.5951, found: 263.5960; Anal. Calcd. For $C_{22}H_{28}Cl_2IrN_3$·2H$_2$O: C, 41.70; H, 5.09; N, 6.63; Cl, 11.19. Found C, 41.60; H, 5.40; N, 6.20; Cl, 11.20. Elemental analysis data for N outside the range (t 0.4), but best value to date.

Example 11: [Ir{η⁵:η¹-C₅(CH₃)₄(CH₂)₃NH₂}{CH₃CN}₂][SbF₆]₂

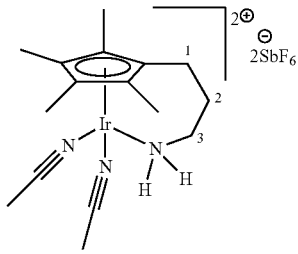

To a stirred solution of example 3 (120 mg, 0.272 mmol) in acetonitrile (8.0 ml) was added silver hexafluoroantimonate (200 mg, 0.582 mmol). The mixture was stirred at RT for 4 hours, the crude was filtered through a pad of Celite®, washed with MeCN and the solvent was removed under reduced pressure. Purification by precipitation from DCM gave the title compound as a pale yellow powder (174 mg, 0.188 mmol, 70%). Single crystals were achieved by recrystallization from MeCN-Et₂O (v/v=1/4).

mp >250° C. (MeCN-Et₂O, v/v=1/4); ¹H NMR (500 MHz, CD₃CN, δ/ppm): 4.38 (2H, br s, NH₂), 2.60-2.56 (2H, m, H-3), 2.30-2.25 (2H, m, H-1), 1.97 (6H, s, 2CH₃CN), 1.92-1.87 (2H, m, H-2), 1.86 (6H, s, 2CH₃), 1.65 (6H, s, 2CH₃); ¹³C NMR (125 MHz, CD₃CN, δ/ppm): 100.6 (C$_q$Ir), 98.9 (C$_q$Ir), 81.4 (C$_q$Ir), 42.7 (C-3), 29.8 (C-2), 18.9 (C-1), 9.4 (CH₃), 9.1 (CH₃), two carbons (C≡N and CH₃CN) not observed; IR (ν$_{max}$, neat, cm⁻¹): 3313 (N—H), 3274 (N—H), 2946, 2315, 1654, 1597, 1457, 1365, 1279, 1191, 1083, 1030; HRMS (ESI+) m/z: Calculated for C₁₂H₂₀F₆N¹⁹¹Ir¹²¹Sb (M−[SbF₆⁻]-2MeCN, 43%): 604.0139, found: 604.0139; calculated for C₁₂H₂₀F₆N¹⁹¹Ir¹²³Sb and C₁₂H₂₀F₆N¹⁹³I¹²¹Sb (M−[SbF₆⁻]-2MeCN, 100%): 606.0156, found: 606.0157; calculated for C₁₂H₂₀F₆N¹⁹³Ir¹²³Sb (M−[SbF₆⁻]-2MeCN, 53%): 608.0167, found: 608.0164; Anal. Calcd. For C₁₆H₂₆F₁₂N₃IrSb₂: C, 20.80; H, 2.84; N, 4.55. Found C, 21.20; H, 2.80; N, 4.50.

Example 12: Rh₂Cl₄[η⁵-C₅(CH₃)₄(CH₂)₃NEt₂·HCl]₂

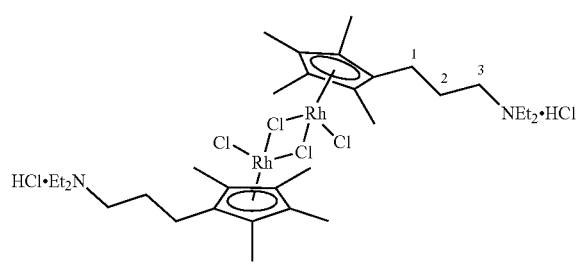

To a stirred solution of intermediate 13 (182 mg, 0.672 mmol) in methanol (5.0 ml) was added RhCl₃.hydrate (70 mg, 0.33 mmol). The reaction mixture was heated at reflux for 22 hours, cooled to room temperature and the solvent removed under reduced pressure. Crystallization from DCM-hexane (v/v=1/3) gave the title compound as a red solid (130 mg, 0.147 mmol, 89%). The formation of the hydrochloride salt was determined by comparing the NMR signals with a similar complex reported in the literature. (Organometallics, 2010, 29, 1886)

mp >250° C. (MeOH); ¹H NMR (500 MHz, DMSO, δ/ppm): 10.14 (2H, br s, 2NH), 3.09-3.06 (12H, m, 6NCH₂), 2.22 (4H, t, J=8.3 Hz, 2H-1), 1.84-1.80 (4H, m, 2H-2), 1.70 (12H, s, 4CH₃), 1.63 (12H, s, 4CH₃), 1.19 (12H, t, J=7.3 Hz, 4NCH₂CH₃); ¹³C NMR (125 MHz, DMSO, δ/ppm): 100.1 (d, J=8.8 Hz, C$_q$Rh), 99.1 (d, J=7.5 Hz, C$_q$Rh), 97.9 (d, J=8.0 Hz, C$_q$Rh), 50.2 (NCH₂), 46.0 (NCH₂), 21.4 (C-2), 20.5 (C-1), 8.6 (CH₃), 8.4 (CH₃), one carbon (CH₃) not observed; IR (ν$_{max}$, neat, cm⁻¹): 3214, 3140, 2933, 2856, 2756, 2724, 1581, 1491, 1453, 1370, 1355, 1309, 1263, 1157, 1114, 1070, 1023; Anal. Calcd. For C₃₂H₅₈Cl₆N₂Rh₂: C, 43.22; H, 6.57; N, 3.15. Found C, 43.65; H, 6.35; N, 2.90. Elemental analysis data for C outside the expected range (t 0.4), but best value to date.

Example 13: RhCl₂[η⁵:η¹-C₅(CH₃)₄(CH₂)₃N(CH₂CH₃)H]

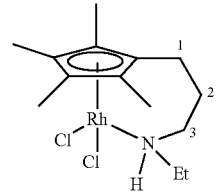

To a suspension of Example 12 (40 mg, 50 μmol) in DCM (5.0 ml) was added potassium tert-butoxide (11 mg, 0.10 mmol). The mixture was stirred at room temperature for 72 hours, filtered through a pad of Celite®, washed with DCM and the solvent was removed under reduced pressure. Purification by flash chromatography (SiO₂, eluting with DCM-MeOH (99:1)) gave the title compound as an orange solid (6 mg, 16 μmol, 16%).

R$_f$=0.57 (DCM-MeOH 90:10); mp 175.1-176.4° C. (DCM); ¹H NMR (500 MHz, CDCl₃, δ/ppm): 3.58-3.53 (1H, m, H$_A$-3), 3.30 (1H, br s, NH), 2.84-2.73 (2H, m, NCH₂), 2.68-2.61 (1H, m, He-3), 2.19-1.99 (4H, m, 2CH₂), 1.77 (3H, s, CH₃), 1.72 (3H, s, CH₃), 1.67 (3H, s, CH₃), 1.62 (3H, s, CH₃), 1.10 (3H, t, J=7.3 Hz, CH₃); ¹³C NMR (125 MHz, CDCl₃, δ/ppm): 105.1 (d, J=7.5 Hz, C$_q$Rh), 94.8 (d, J=8.8 Hz, C$_q$Rh), 93.1 (d, J=8.8 Hz, C$_q$Rh), 90.1 (d, J=7.5 Hz, C$_q$Rh), 83.8 (d, J=8.8 Hz, C$_q$Rh), 45.3 (NCH₂), 44.6 (NCH₂), 26.0 (C-2), 19.3 (C-1), 13.7 (CH₃), 9.9 (CH₃), 9.4 (CH₃), 9.3 (CH₃), 9.2 (CH₃); IR (ν$_{max}$, neat, cm⁻¹): 3469 (N—H), 3217 (N—H), 2917, 1651, 1448, 1374, 1063, 1028; HRMS (ESI+) m/h: Calculated for C₁₄H₂₄³⁵ClNRh (M−Cl⁻, 100%): 344.0640, found: 344.0640.

Example 14: Rh₂Cl₄[η⁵-C₅(CH₃)₄(CH₂)₄NH₃Cl]₂

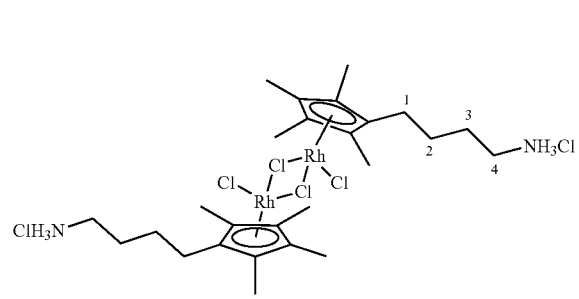

To a stirred solution of intermediate 14 (298 mg, 0.964 mmol) in methanol (8.0 ml) was added RhCl$_3$.hydrate (100 mg, 0.478 mmol). The reaction mixture was heated at reflux for 22 hours, then cooled to room temperature and the solvent was removed under reduced pressure. Crystallization from MeOH-Et$_2$O (v/v=1/2) gave the title compound as an orange solid (65 mg, 0.081 mmol, 34%). The formation of the hydrochloride salt was determined by comparing the NMR signals with a similar complex reported in the literature. (Organometallics, 2010, 29, 1886)

$^1$H NMR (500 MHz, DMSO, δ/ppm): 8.05 (6H, br s, 2NH$_3$), 2.75 (4H, br s, 2H-4), 2.15 (4H, br s, 2H-1), 1.67 (12H, s, 4CH$_3$), 1.63-1.57 (16H, m, 2CH$_2$ and 4CH$_3$), 1.48 (4H, br s, 2CH$_2$); $^{13}$C NMR (125 MHz, DMSO, δ/ppm): 99.4 (d, J=7.5 Hz, C$_q$Rh), 99.3 (d, J=7.5 Hz, C$_q$Rh), 99.1 (d, J=7.5 Hz, C$_q$Rh), 38.3 (C-4), 26.9 (CH$_2$), 23.9 (CH$_2$), 22.7 (C-1), 8.7 (CH$_3$), 8.6 (CH$_3$); IR ($v_{max}$, neat, cm$^{-1}$): 3370 (N—H), 3100 (N—H), 2965, 2914, 1706, 1591, 1567, 1479, 1400, 1367, 1024; HRMS (ESI+) m/z: Calculated for C$_{26}$H$_{44}$N$_2$Rh$_2$$^{35}$Cl$_3$ (M-[2HCl]—Cl$^-$, 100%): 695.0675, found: 695.0673, calculated for C$_{26}$H$_{44}$N$_2$Rh$_2$$^{35}$Cl$_2$$^{37}$Cl (M-[2HCl]—Cl$^-$, 100%): 697.0649, found: 697.0647; calculated for C$_{26}$H$_{44}$N$_2$Rh$_2$$^{35}$Cl$^{37}$Cl$_2$ (M-[2HCl]—Cl$^-$, 33%): 699.0627, found: 699.0620.

Example 15: RhCl$_2$[η$^5$:η$^1$-C$_5$(CH$_3$)$_4$(CH$_2$)$_4$NH$_2$]

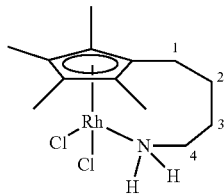

To a stirred solution of example 14 (52 mg, 0.065 mmol) in DCM (10 ml) was added potassium tert-butoxide (16 mg, 0.14 mmol) and the mixture was stirred at room temperature for 72 hours. It was filtered through a pad of Celite®, washed with DCM and the solvent was removed under reduced pressure. Purification by flash chromatography (SiO$_2$, eluting with DCM-MeOH (97:3)) gave the title compound as an orange solid (14 mg, 38 μmol, 29%).

R$_f$=0.53 (DCM-MeOH 90:10); $^1$H NMR (500 MHz, CDCl$_3$, δ/ppm): 3.23-3.19 (2H, m, H-4), 2.87 (2H, br s, NH$_2$), 2.11-2.09 (2H, m, CH$_2$), 2.07-2.01 (2H, m, CH$_2$), 1.86-1.79 (2H, m, CH$_2$), 1.66 (6H, s, 2CH$_3$), 1.64 (6H, s, 2CH$_3$); $^{13}$C NMR (125 MHz, CDCl$_3$, δ/ppm): 100.9 (d, J=11.3 Hz, C$_q$Rh), 96.7 (d, J=10.0 Hz, C$_q$Rh), 89.3 (d, J=10.0 Hz, C$_q$Rh), 43.9 (C-4), 28.9 (CH$_2$), 22.9 (CH$_2$), 21.5 (CH$_2$), 9.7 (CH$_3$), 9.0 (CH$_3$); HRMS (ESI+) m/z: Calculated for C$_{13}$H$_{22}$NRh$^{35}$Cl (M-Cl$^-$, 100%): 330.0490, found: 330.0492, calculated for C$_{13}$H$_{22}$NRh$^{37}$Cl (M-Cl$^-$, 33%): 332.0461, found: 332.0457.

Example 16: RhI$_2$[η$^5$:η$^1$-C$_5$(CH$_3$)$_4$(CH$_2$)$_3$NH$_2$]

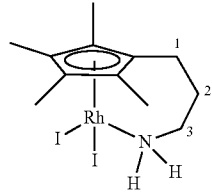

To a stirred solution of the known (Organometallics, 2010, 29, 1886) rhodium complex RhCl$_2$[η$^5$:η$^1$-C$_5$(CH$_3$)$_4$(CH$_2$)$_3$NH$_2$] (30 mg, 85 μmol) in degassed acetone (5.0 ml) was added sodium iodide (28 mg, 0.19 mmol). The reaction mixture was heated at reflux for 20 hours, then cooled to RT and the solvent was removed under reduced pressure. The residue was dissolved in DCM (15 ml), washed with water (2×15 ml) and brine (15 ml). The organic phase was dried with Na$_2$SO$_4$ and the solvent was removed under reduced pressure. Purification by flash chromatography (SiO$_2$, eluting with DCM-MeOH (98:2)) gave the title compound as a dark red solid (27 mg, 0.050 mmol, 60%).

R$_f$=0.87 (DCM-MeOH 90:10); mp >250° C. (DCM-hexane, v/v=1/2); $^1$H NMR (500 MHz, CDCl$_3$, δ/ppm): 3.17 (2H, br s, NH$_2$), 2.56-2.53 (2H, m, H-3), 2.17-2.13 (2H, m, H-1), 2.14 (6H, s, 2CH$_3$), 2.00 (6H, s, 2CH$_3$), 1.94-1.89 (2H, m, H-2); $^{13}$C NMR (125 MHz, CDCl$_3$, δ/ppm): 97.5 (d, J=7.5 Hz, C$_q$Rh), 97.0 (d, J=7.5 Hz, C$_q$Rh), 90.5 (d, J=7.5 Hz, C$_q$Rh), 40.0 (C-3), 28.8 (C-2), 19.5 (C-1), 12.7 (CH$_3$), 10.6 (CH$_3$); IR ($v_{max}$, neat, cm$^{-1}$): 3223 (N—H), 3149 (N—H), 2942, 2908, 1580, 1458, 1370, 1354, 1145, 1129, 1015, 924; HRMS (ESI+) m/z: Calculated for C$_{12}$H$_{20}$NRhI (M-I$^-$): 407.9690, found: 407.9693; Anal. Calcd. For C$_{12}$H$_{20}$I$_2$NRh: C, 26.96; H, 3.77; N, 2.62. Found C, 27.50; H, 3.80; N, 2.50. Elemental analysis data for C outside the expected range (t 0.4), but best value to date.

Example 17: (R)—IrCl$_2$[η$^5$:η$^1$-C$_5$(CH$_3$)$_4$(CH$_2$)$_2$CH{CH$_2$CH$_2$CH$_2$}NH]

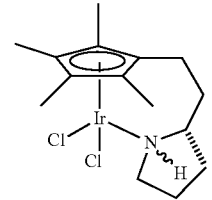

A stirred suspension of IrCl$_3$ hydrate (70 mg, 0.20 mmol) and NaHCO$_3$ (19.7 mg, 0.20 mmol) was prepared in methanol (3.0 mL) and put under nitrogen. The intermediate 15 (158 mg, 0.50 mmol) was added to the suspension. Microwave heating was applied at a set temperature of 125 OC for 2 hours with a pressure of 130 psi. Following this, the solvent was removed under reduced pressure. Purification by silica gel chromatography (eluent DCM/MeOH, 95:5) gave a yellow solid (42.9 mg, 0.10 mmol, 38%). Single crystals were achieved by recrystallization using DCM/hexane (v/v=1:3).

R$_f$=0.51 (DCM/MeOH, 95:5). mp (decomposition) 250.6-251.5° C. (DCM-hexane, v/v=1/3). $^1$H NMR (500 MHz, CDCl₃, δ/ppm): (mixture of diastereomers) 4.59-4.57 (1H, m, NH), 3.78-3.72 (1H, m, CH$_2$), 3.43-3.29 (2H, m, CH$_2$), 3.12-3.07 (1H, m, NCH), 2.87-2.77 (1H, m, CH$_2$), 2.66-2.58 (1H, m, CH), 2.41-1.78 (14H, m, 14CH$_2$), 1.73-1.71 (24H, m, 24CH$_3$), 1.53-1.46 (2H, m, CH$_2$) (missing 1×NH signal); $^{13}$C NMR (125 MHz, CDCl$_3$, δ/ppm): (mixture of diastereomers) 95.2 (C$_q$Ir), 93.0 (C$_q$Ir), 91.6 (C$_q$Ir), 89.9 (C$_q$Ir), 89.0 (C$_q$Ir), 88.6 (C$_q$Ir), 85.0 (C$_q$Ir), 81.9 (C$_q$Ir), 63.8 (NCH), 59.8 (NCH), 49.8 (CH$_2$), 48.6 (CH$_2$), 35.0 (CH$_2$), 31.4 (CH$_2$), 31.3 (CH$_2$), 31.2 (CH$_2$), 23.2 (CH$_2$), 22.9 (CH$_2$), 20.4 (CH$_2$), 20.2 (CH$_2$), 9.2 (Cp*CH$_3$), 9.1 (Cp*CH$_3$), 9.1 (Cp*CH$_3$), 9.1 (Cp*CH$_3$), 9.0 (Cp*CH$_3$), 9.0 (Cp*CH$_3$), 8.9 (Cp*CH$_3$), 8.9 (Cp*CH$_3$), missing 2 C$_q$Ir signals. IR (v$_{max}$, neat, cm$^{-1}$): 3427, 3150, 2959, 2920, 2854, 1451, 1368, 700; HRMS (ESI+) m/z: Calculated for C$_{15}$H$_{24}$$^{35}$Cl$^{191}$IrN (M–Cl$^-$, 50%): 444.1204, found: 444.1198; calculated for C$_{15}$H$_{24}$$^{37}$Cl$^{191}$IrN and C$_{15}$H$_{24}$$^{35}$Cl$^{193}$IrN (M–Cl$^-$, 100%): 446.1201, found: 446.1213; calculated for C$_{15}$H$_{24}$$^{37}$Cl$^{193}$IrN (M–Cl$^-$, 26%): 448.1197, found: 448.1195; Analysis calculated for C$_{15}$H$_{24}$Cl$_2$IrN: C, 37.42%; H, 5.02%; N, 2.91%. Found: C, 37.00%; H, 4.90%; N, 2.80%.

Example 18: [Ir({η$^5$:η$^1$-C$_5$(CH$_3$)$_4$(CH$_2$)NH$_2$}{2,4-difluoro-N-phenylpicolinamide}][PF$_6$]

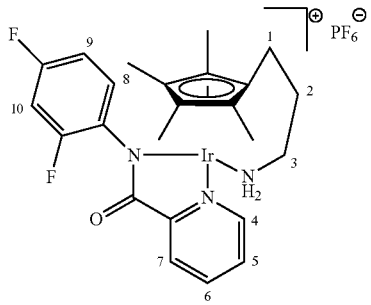

A suspension of Example 3 (50 mg, 0.11 mmol) and 2,4-difluoro-N-phenylpicolinamide (30.4 mg, 0.13 mmol) in ethanol (20 ml) was stirred and refluxed for 30 minutes. NH$_4$PF$_6$ (42.4 mg, 0.26 mmol) in ethanol (10 ml) was added and the mixture was refluxed overnight. After cooling to RT, the remaining solids were filtered, and the solvent removed from the filtrate under reduced pressure. Purification by precipitation from EtOH/hexane gave the title compound as a bright yellow powder (63.5 mg, 0.0848 mmol, 77%). Single crystals were achieved by recrystallisation from MeOH/Et$_2$O.

$^1$H NMR (500 MHz, CD$_3$OD, δ/ppm): 8.80 (1H, d, J=5.3 Hz, H-4), 8.27 (1H, td, J=7.7, 1.3 Hz, H-6), 8.15 (1H, d, J=7.9 Hz, H-7), 7.86 (1H, ddd, J=7.4, 5.7, 1.4 Hz, H-5), 7.41-7.12 (2H, m, H-8, H-10), 7.08 (1H, br s, H-9), 2.81 (1H, br s, H-3), 2.52-2.44 (2H, m, H-3, H-1), 2.24 (1H, m, H-1), 2.09 (1H, m, H-2), 1.88, (3H, s, CH$_3$), 1.85 (1H, br s, H-2), 1.57 (3H, s, CH$_3$), 1.45 (3H, s, CH$_3$), 0.89 (3H, s, CH$_3$); $^{13}$C NMR (125 MHz, CD$_3$OD, δ/ppm): 211.0 (CO), 154.5 (C$_q$-Py), 152.9 (C-4), 141.9 (C-6), 130.8 (C-5), 128.1 (C-7), 112.8 (C-9), 105.4 (C-10), 98.1 (C-8), 91.4 (C$_q$—Ir), 86.2 (C$_q$—Ir), 43.7 (C-3), 30.3 (C-2), 19.9 (C-1), 8.6 (CH$_3$), the other carbon atoms are not observed; IR (v$_{max}$, neat, cm$^{-1}$): 3589 (N—H), 3111 (N—H), 1629, 1603, 1501, 840, 557; HRMS (ESI+) m/z: Calculated for C$_{24}$H$_{27}$F$_2$$^{191}$IrN$_3$O (M–PF$_6$$^-$, 60%): 602.1728, found: 602.1722; calculated for C$_{24}$H$_{27}$F$_2$$^{193}$IrN$_3$O (M–PF$_6$$^-$, 100%): 604.1751, found: 604.1749.

Example 19: [Ir{η$^5$:η$^1$-C$_5$(CH$_3$)$_4$(CH$_2$)$_3$NH$_2$}{4-fluoro-N-phenyl-2-methylthiopicolinamide}][PF$_6$]$_2$

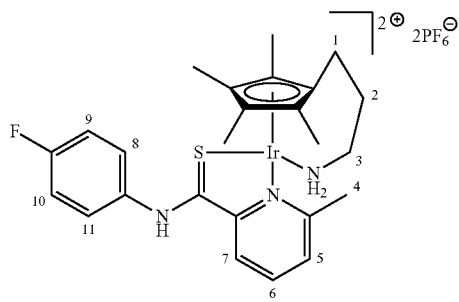

A suspension of Example 3 (50 mg, 0.11 mmol) and 4-fluoro-N-phenyl-2-methylthiopicolinamide (32 mg, 0.13 mmol) in ethanol (20 ml) was stirred and refluxed for 30 minutes. NH$_4$PF$_6$ (42.4 mg, 0.26 mmol) in ethanol (10 ml) was added and the mixture was refluxed overnight. After cooling to RT, the remaining solids were filtered, and the solvent removed from the filtrate under reduced pressure. Purification by precipitation from EtOH/hexane gave the title compound as a bright orange powder (78.6 mg, 0.10 mmol, 94%). Single crystals were achieved by recrystallisation from EtOH/hexane.

$^1$H NMR (500 MHz, CD$_3$OD, δ/ppm): 8.14 (1H, dd, J=7.9, 1.1 Hz, H-7), 8.01 (1H, t, J=7.8 Hz, H-6), 7.74 (1H, dd, J=7.7, 1.5 Hz, H-5), 7.17 (4H, m, H-8-11), 2.99 (3H, s, CH$_3$-4), 2.82 (1H, m, H-3), 2.38 (2H, m, H-3, H-1), 2.17 (1H, m, H-1), 2.10 (3H, s, CH$_3$), 2.01 (1H, m, H-2), 1.84 (1H, m, H-2), 1.61 (3H, s, CH$_3$), 1.43 (3H, s, CH$_3$), 1.36 (3H, s, CH$_3$); $^{13}$C NMR (125 MHz, CD$_3$OD, δ/ppm): 197.0 (CS), 163.6 (C$_q$—F), 140.8 (C-6), 129.1 (C-5), 124.7 (C-7), 123.3 (C-8, C-11), 116.6 (C-9, C-10), 91.1 (C$_q$—Ir), 88.5 (C$_q$—Ir), 88.0 (C$_q$—Ir), 81.9 (C$_q$—Ir), 44.7 (C-3), 30.5 (C-2), 29.9 (CH$_3$-4), 20.0 (C-1), 10.7 (CH$_3$), 9.4 (CH$_3$), 9.1 (CH$_3$), 8.3 (CH$_3$), the other carbon atoms are not observed; IR (v$_{max}$, neat, cm$^{-1}$): 3315 (N—H), 3271 (N—H), 3128, 3044, 1601, 1543, 1509, 1470, 1405, 1237, 1190, 1162, 1044, 837, 762, 556; HRMS (ESI+) m/z: Calculated for C$_{25}$H$_{30}$F$^{193}$IrN$_3$S (M–H-2PF$_6$$^-$, 60%): 614.1750, found: 614.1737; calculated for C$_{25}$H$_{30}$F$^{193}$IrN$_3$S (M–H-2PF$_6$$^-$, 100%): 616.1774, found: 616.1762.

Example 20: [Ir{η$^5$:η$^1$-C$_5$(CH$_3$)$_4$(CH$_2$)$_3$NH$_2$}{dppm}][BF$_4$]$_2$

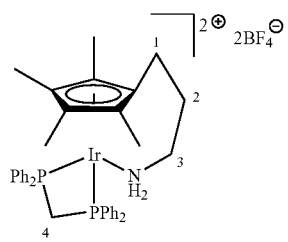

A suspension of Example 3 (50 mg, 0.11 mmol), bis(diphenylphosphino)methane (42.3 mg, 0.11 mmol) and NaBF$_4$ (24.2 mg, 0.22 mmol) in ethanol (10 ml) was stirred and heated to reflux overnight. After cooling to RT, the solvent was removed under reduced pressure and the residue treated with methanol and filtered. The solvent from the filtrate was removed again under reduced pressure. Purification by precipitation from MeOH/Et$_2$O gave the title compound as a pale yellow powder (72.7 mg, 0.078 mmol, 71%). Single crystals were achieved by recrystallisation from MeOH/Et$_2$O or MeCN/Et$_2$O.

$^1$H NMR (500 MHz, CD$_3$OD, δ/ppm): 7.74 (6H, m, Ph), 7.67 (6H, m, Ph), 7.58 (4H, m, Ph), 7.38 (4H, m, Ph), 5.49 (2H, s, H-4), 2.69 (2H, m, H-3), 2.33 (6H, t, J=4.0 Hz, 2CH$_3$), 2.23 (2H, m, H-1), 1.95 (2H, m, H-2), 1.26 (6H, m, 2CH$_3$); $^{13}$C NMR (125 MHz, CD$_3$OD, δ/ppm): 134.6 (Ph), 133.5 (Ph), 133.1 (Ph), 131.7 (Ph), 130.9 (Ph), 99.3 (C$_q$—Ir), 54.9 (C-4), 42.4 (C-3), 26.0 (C-2), 19.9 (C-1), 10.7 (CH$_3$), 9.1 (CH$_3$), the other carbon atoms are not observed; $^{31}$P NMR (121 MHz, CD$_3$OD, δ/ppm): −46.3; IR (ν$_{max}$, neat, cm$^{-1}$): 3391 (N—H), 1574, 1437, 1097, 1058, 721, 699, 650, 621, 541, 508; HRMS (ESI+) m/z: Calculated for C$_{37}$H$_{41}^{191}$IrNP$_2$ (M−H−2BF$_4^-$, 60%): 752.2320, found: 752.2335; calculated for C$_{37}$H$_{41}^{193}$IrNP$_2$ (M−H−2BF$_4^-$, 100%): 754.2343, found: 754.2341.

Example 21: [IrCl{η$^5$:η$^1$-C$_5$(CH$_3$)$_4$(CH$_2$)$_3$NH$_2$}{pyridine}][BF$_4$]

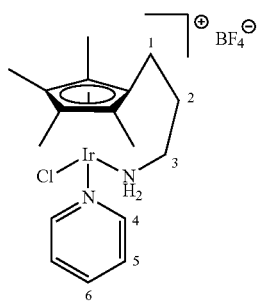

A suspension of Example 3 (50 mg, 0.11 mmol) and NaBF$_4$ (24.2 mg, 0.22 mmol) in ethanol (5 ml) was stirred, and pyridine (18 μl, 0.22 mmol) added. The mixture was heated to reflux overnight. After cooling to RT, the mixture was filtered and the solvent removed under reduced pressure. Purification by precipitation from MeOH/Et$_2$O gave the title compound as a pale yellow powder (43.6 mg, 0.076 mmol, 69%). Single crystals were achieved by recrystallisation from MeOH/Et$_2$O.

$^1$H NMR (500 MHz, CD$_3$OD, δ/ppm): 8.83 (2H, m, H-4), 8.04 (1H, tt, J=7.7, 1.6 Hz, H-6), 7.61 (2H, m, H-5), 2.86 (1H, m, H-3), 2.60 (1H, m, H-3), 2.34 (2H, m, H-1), 2.05 (2H, m, H-2), 1.76 (3H, s, CH$_3$), 1.66 (3H, s, CH$_3$), 1.62 (3H, s, CH$_3$), 1.15 (3H, s, CH$_3$); $^{13}$C NMR (125 MHz, CD$_3$OD, δ/ppm): 154.8 (C-4), 140.8 (C-6), 128.2 (C-5), 96.6 (C$_q$—Ir), 93.8 (C$_q$—Ir), 90.1 (C$_q$—Ir), 83.1 (C$_q$—Ir), 77.8 (C$_q$—Ir), 43.6 (C-3), 30.3 (C-2), 19.8 (C-1), 9.1 (CH$_3$), 8.8 (CH$_3$), 8.7 (CH$_3$), 8.2 (CH$_3$); IR (ν$_{max}$, neat, cm$^{-1}$): 3276 (N—H), 3221 (N—H), 1579, 1449, 1058, 1020, 767, 697, 551, 527, 518; HRMS (ESI+) m/z: Calculated for C$_{12}$H$_{20}$Cl$^{191}$IrN (M−Py−BF$_4^-$, 60%): 404.0890, found: 404.0879; calculated for C$_{12}$H$_{20}$Cl$^{193}$IrN (M−Py−BF$_4^-$, 100%): 406.0914, found: 406.0897.

Example 22: Iridium Catalyst—Effect of N-Substituents

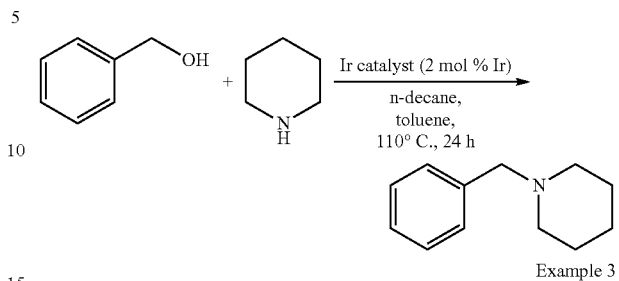

Example 3

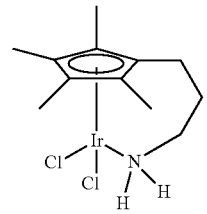

Example 4

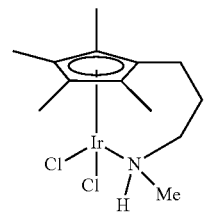

Example 6

Metal complexes of Examples 3, 4, and 6 were submitted to the reaction shown above along with a comparative example, metal complex [Cp*IrCl$_2$]$_2$. The yield for each of the metal complexes is measured over time and is shown in FIG. 1. The simple amino (Example 3) and methylamino (Example 4) metal complexes are almost equally active and much more active than [Cp*IrCl$_2$]$_2$. The tertiary amine-derived catalyst Example 6 has a slightly reduced rate compared to [Cp*IrCl$_2$]$_2$; however, the final conversion after 24 hours was comparable.

Example 23: Iridium Catalyst: Effect of Counterion

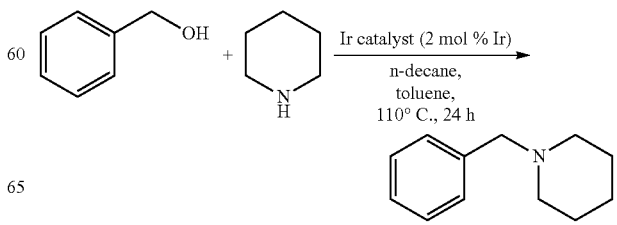

-continued

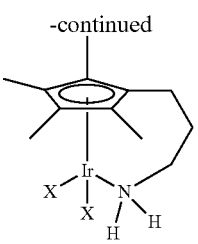

Example 3, X = Cl,
Example 7, X = I

Figure 2:
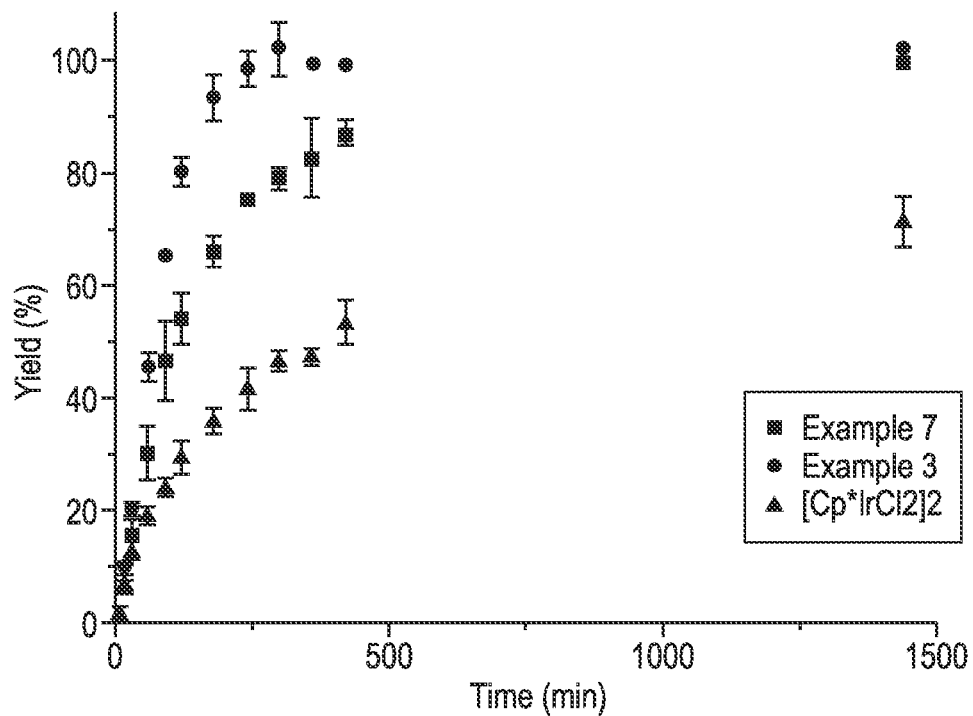
FIG. 2 is a graph showing the reaction rate of metal complexes of the invention with different counterions and a comparative complex.

Metal complexes of Example 3 and Example 7 were submitted to the above reaction, along with [Cp*IrCl$_2$]$_2$. The yield for each of the metal complexes is measured over time and is shown in FIG. 2. The dichloro complex is more active than the diiodo complex, presenting a higher reaction rate. However, both complexes provide a near identical final yield at 24 hours. Both Example 3 and Example 7 are significantly more active than the comparative complex [Cp*IrCl$_2$]z

Example 24: Comparison of Neutral Rhodium and Iridium Complexes

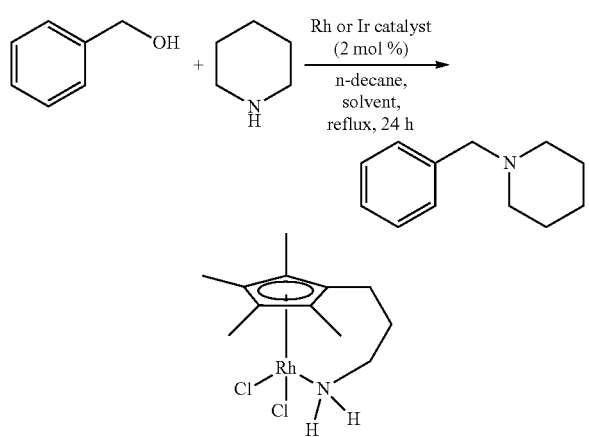

Figure 3A:
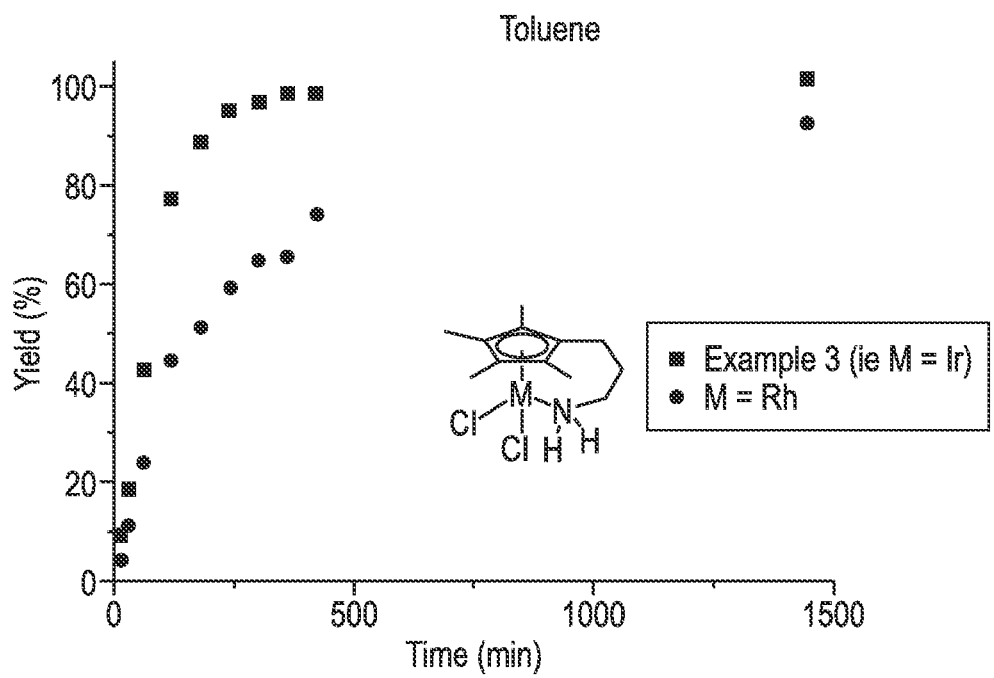
FIGS. 3a and 3b are graphs showing the reaction rate of an iridium complex and a rhodium complex in two different solvents.
Figure 3B:
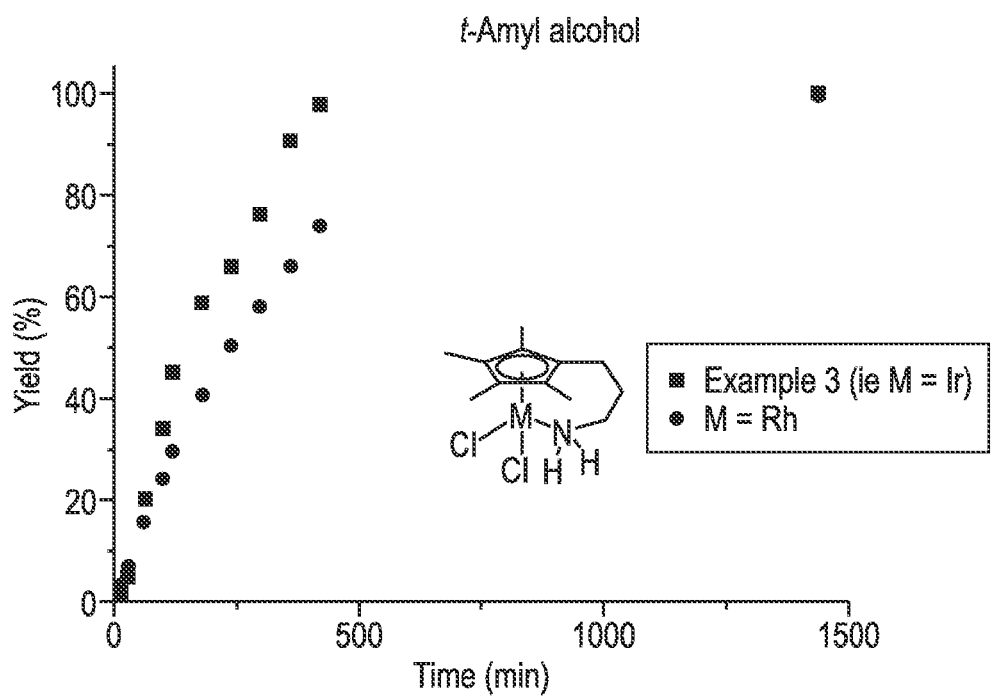

A metal complex of Example 3 was submitted to the above reaction in two different solvents, toluene and t-amyl alcohol. The equivalent known rhodium catalyst, shown in the scheme above, was submitted to the same reactions. The yield over time of the two reactions is shown in FIG. 3a (toluene) and FIG. 3b (t-amyl alcohol). The iridium catalyst of Example 3 is reliably more active than the equivalent rhodium complex, though the degree of differential performance shows some solvent sensitivity.

Example 25: Iridium Complex—Solvent Tolerance

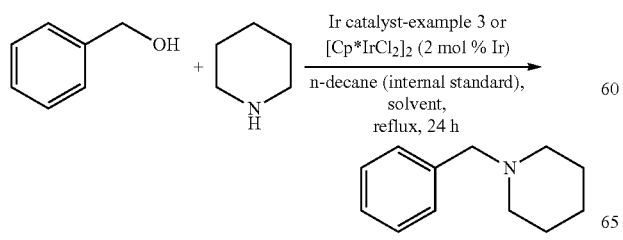

Figure 4:
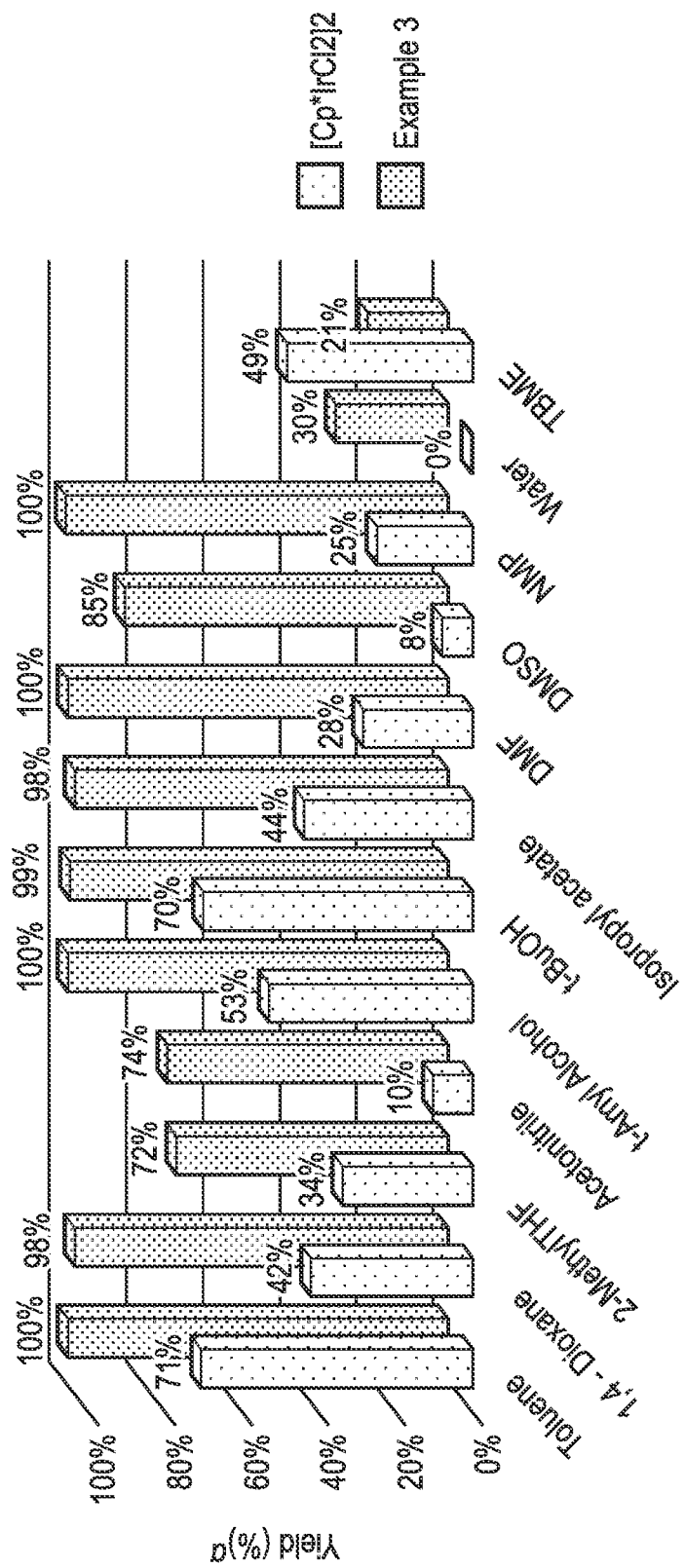
FIG. 4 is a bar chart showing the yields for an iridium complex of the invention and a comparative iridium complex in a range of solvents.

The metal complex of Example 3 and the comparative complex [Cp*IrCl$_2$]$_2$ were tested in a number of solvents with the reaction shown above. The final yield after 24 hours for the two complexes in each solvent is shown in FIG. 4. In all solvents (except for TBME) the final yield was higher for the metal complex of the present invention.

Figure 5:
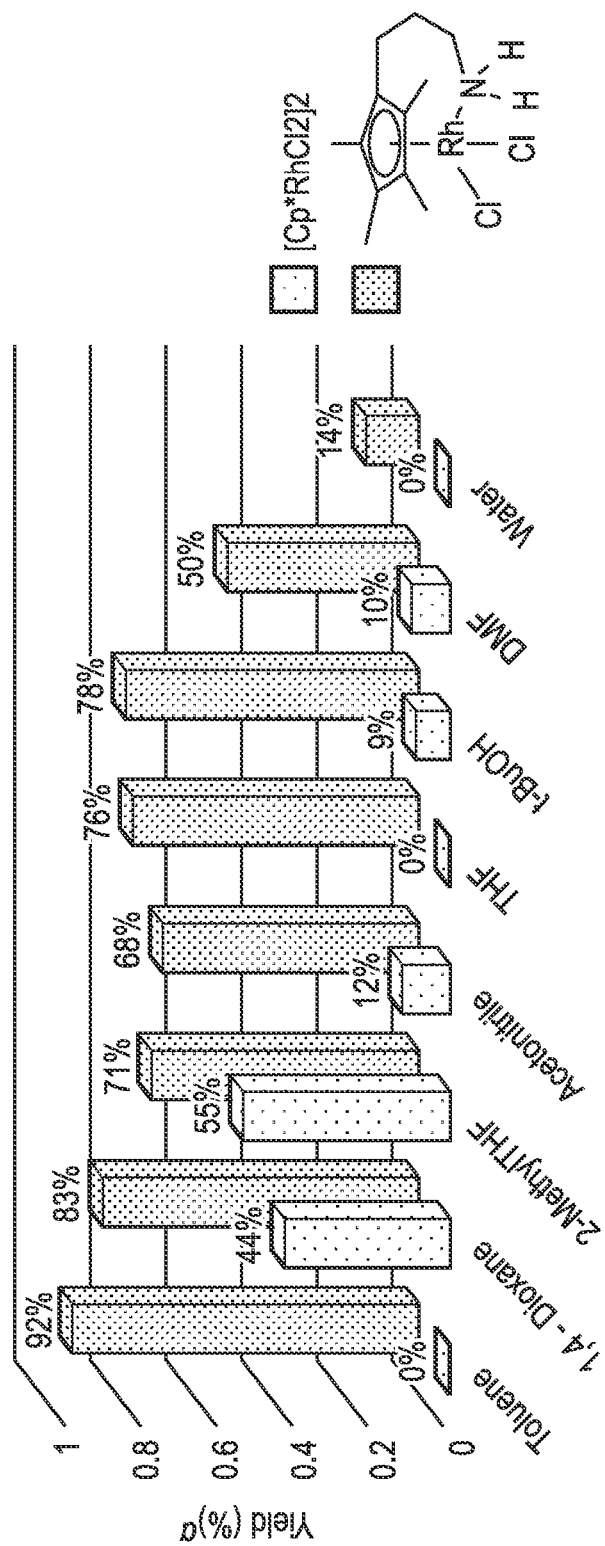
FIG. 5 is a bar chart showing the yields for a rhodium complex and a comparative rhodium complex in a range of solvents.
Figure 6A:
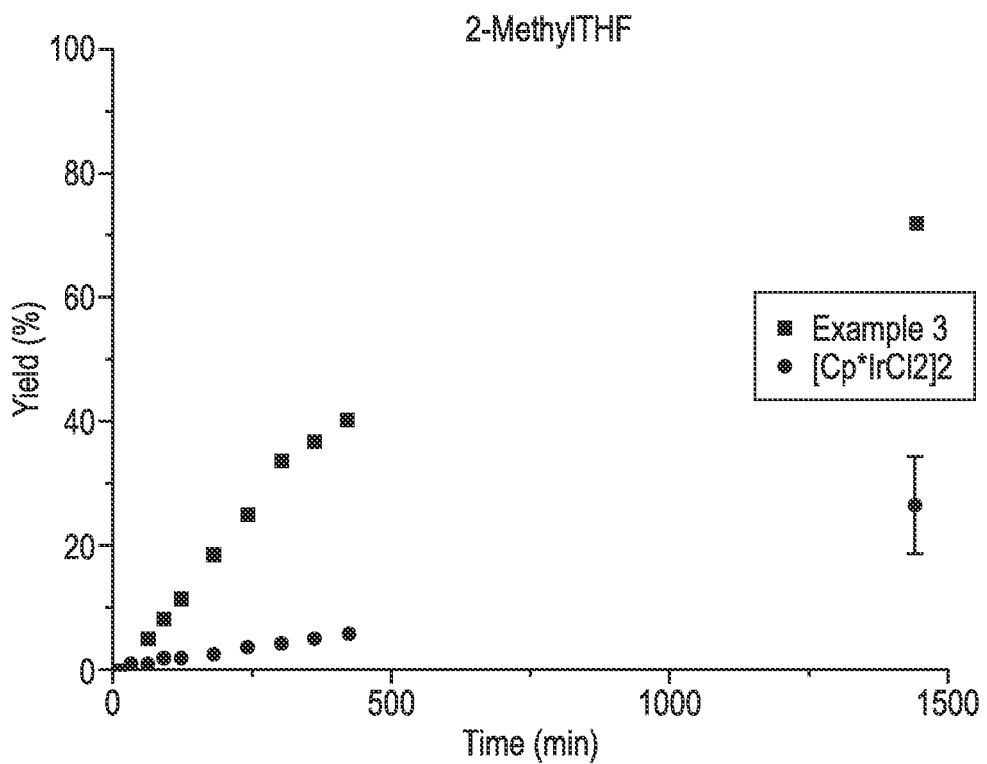
FIG. 6a-d are graphs showing the reaction rate of an iridium complex and a comparative iridium complex in different solvents.
Figure 6B:
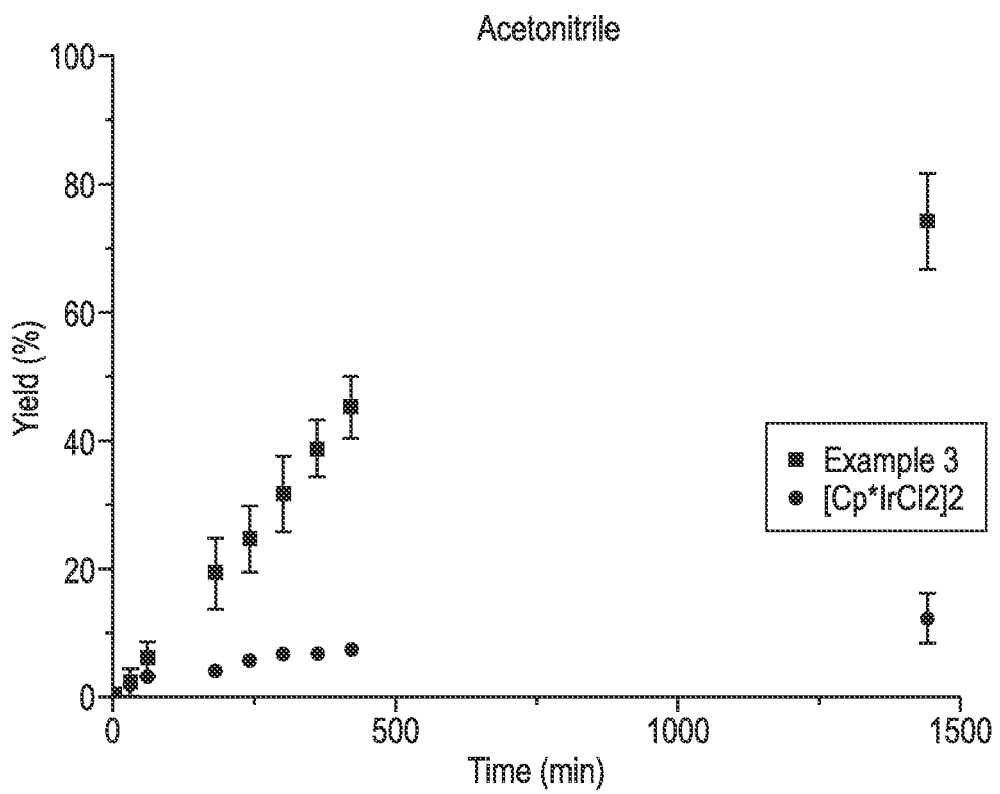
Figure 6C:
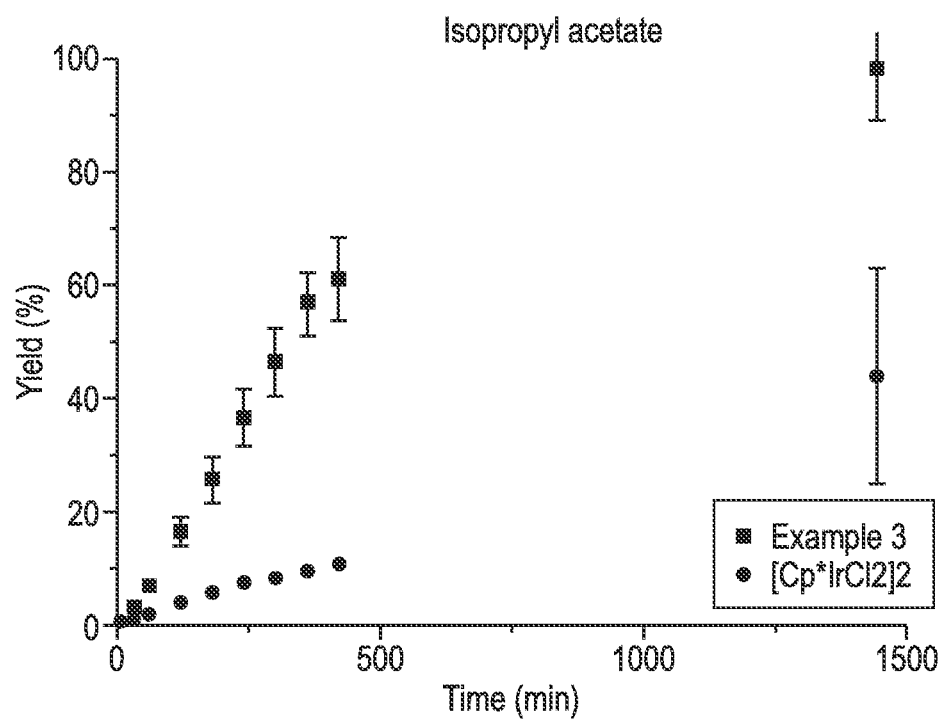
Figure 6D:
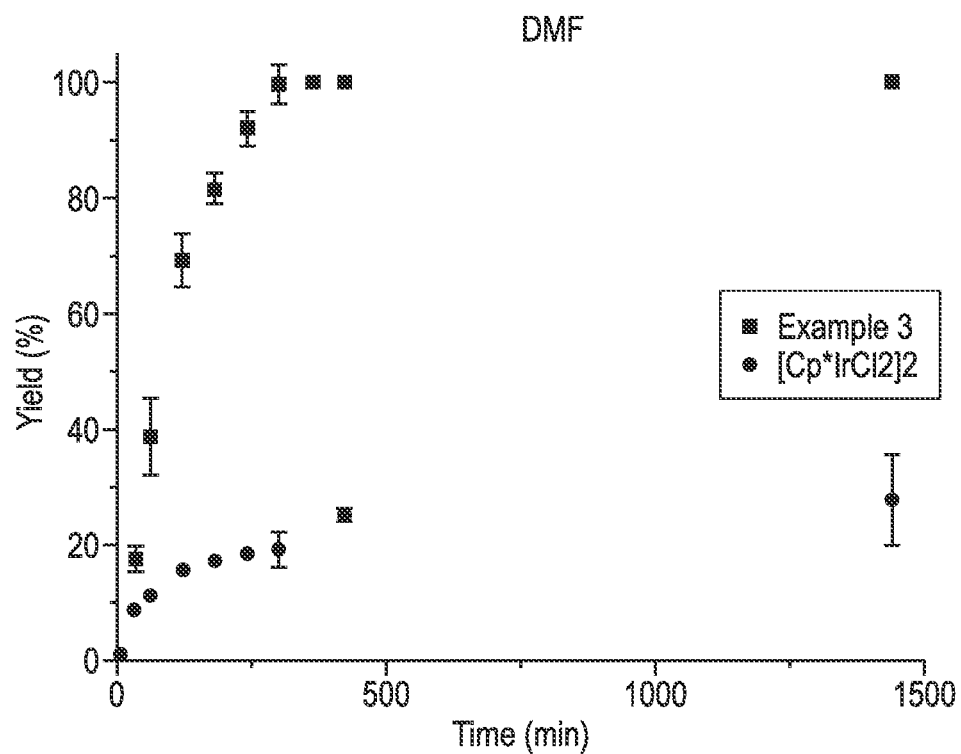

Similarly, the known rhodium metal complex of Example 13 was tested in a range of solvents in an identical reaction to that shown above but with different solvents. The yields are shown in FIG. 5. Comparing the yields for the rhodium catalyst to the iridium catalyst, the iridium complex of the present invention is significantly better than the equivalent rhodium complex.

FIGS. 6a-d show the yields over time for metal complex of Example 3 in a selection of the solvent systems tested above. The complex of Example 3 shows better solvent tolerance than [Cp*IrCl$_2$]$_2$, as measured both by absolute conversion at 24 h (FIG. 4) or individual kinetic analyses (FIG. 6a-d).

Example 26: Substrate Scope Using Iridium Catalysts

Figure 7:
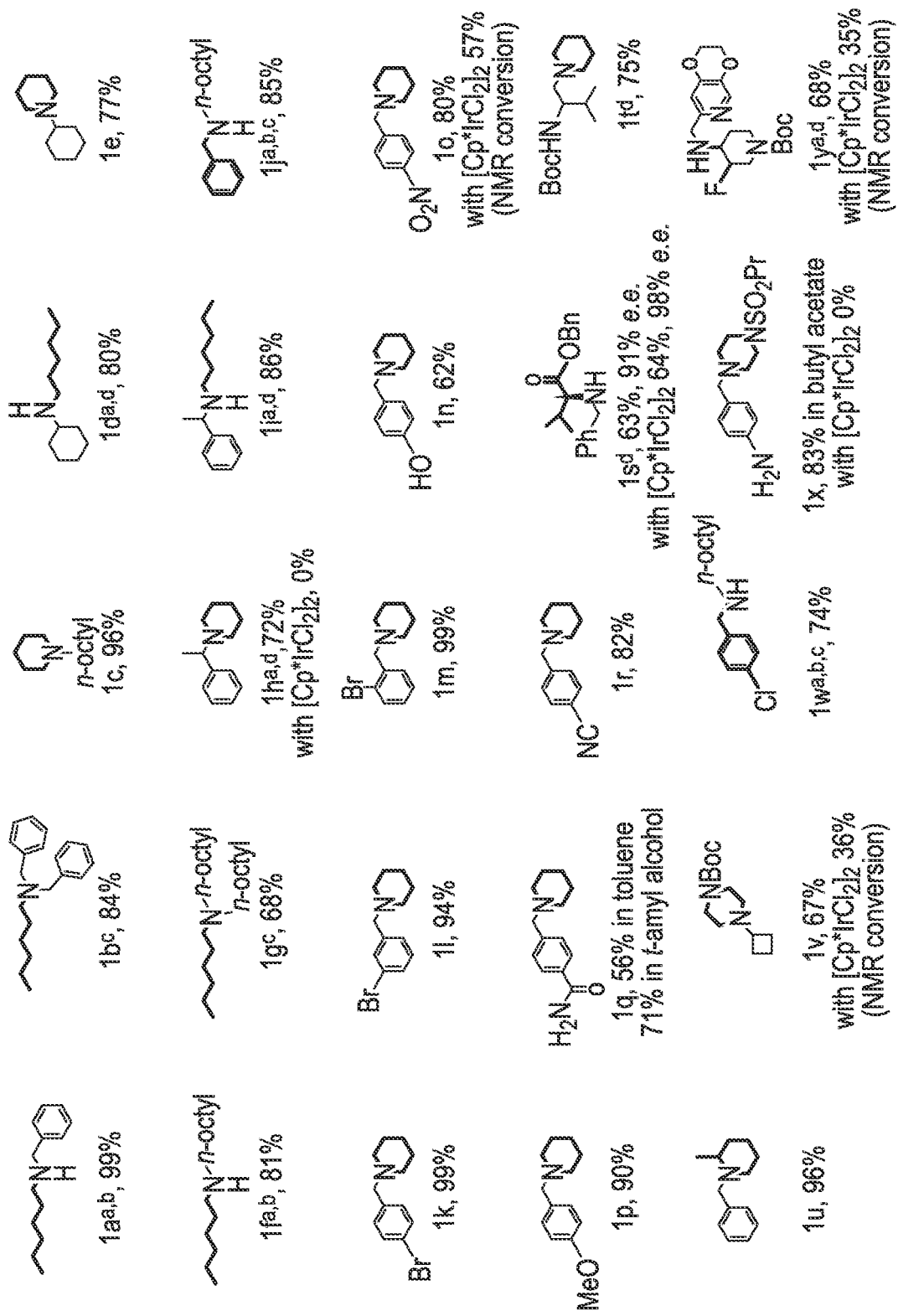
FIG. 7 shows some substrate scope and functional group tolerances of an iridium complex of the invention with some data for a comparative complex [Cp*IrCl$_2$]$_2$.

FIG. 7 shows the substrate tolerance and the yields for a range of functional groups. The reaction conditions are as follows:

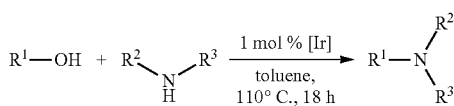

The following letters represent deviations from this general procedure for certain compounds as indicated in FIG. 7: reaction performed at 130° C.; [b] 2 eq of amine were used; [c] 2 eq of alcohol were used; [d] 2 mol % of iridium was used. Wide substrate scope is achieved by the complex of Example 3; superior performance to [Cp*IrCl$_2$]$_2$ is demonstrated explicitly in some cases.

Example 27: Comparison of Rhodium Neutral Versus Ionic Catalysts

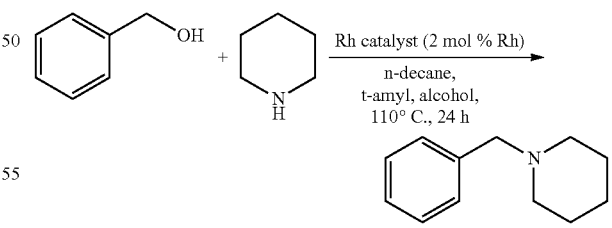

Known complex:

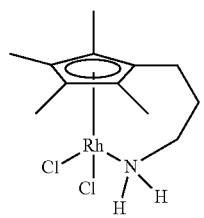

-continued

Example 2

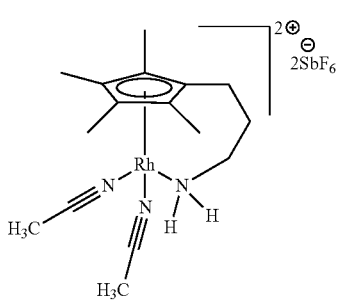

Figure 8:
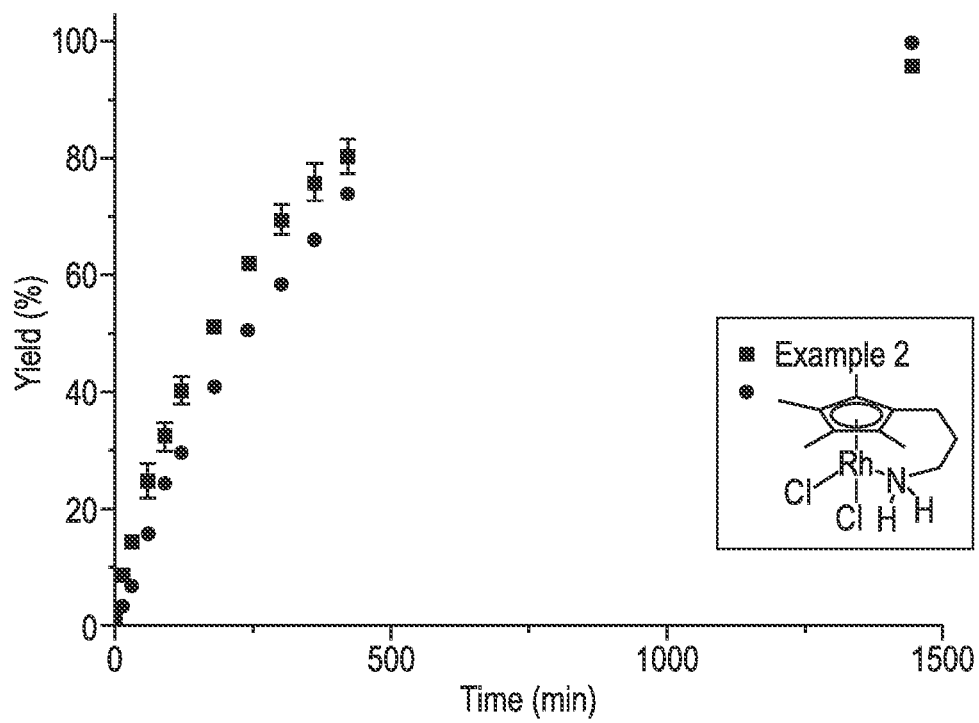
FIGS. 8 and 9 are graphs showing the reaction rate of neutral and ionic iridium complexes and neutral and ionic rhodium complexes.

The ionic rhodium complex of Example 2 and the rhodium complex first shown in Example 13 were submitted to the above reaction. A plot of the reaction rates is shown in FIG. 8. The ionic rhodium complex of Example 2 showed a higher reaction rate than the known neutral rhodium complex.

Example 28: Comparison of Iridium Neutral Versus Ionic Catalysts

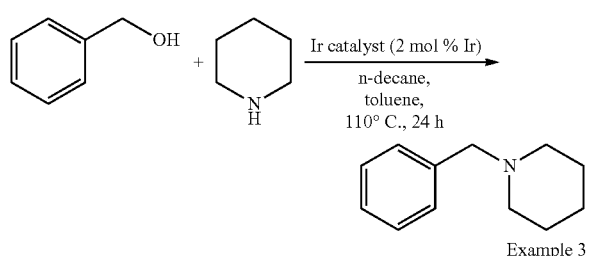

Example 3

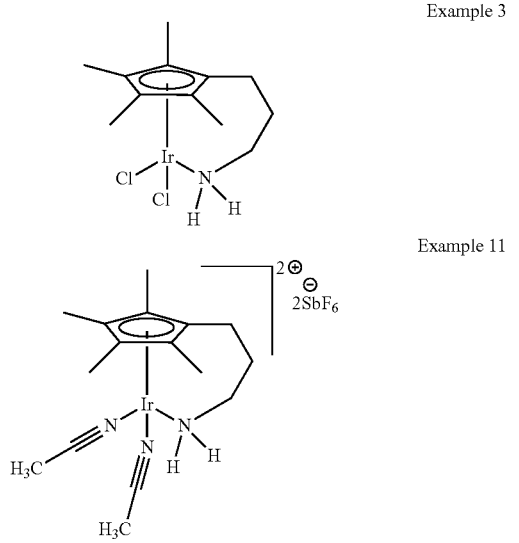

Example 11

Figure 9:
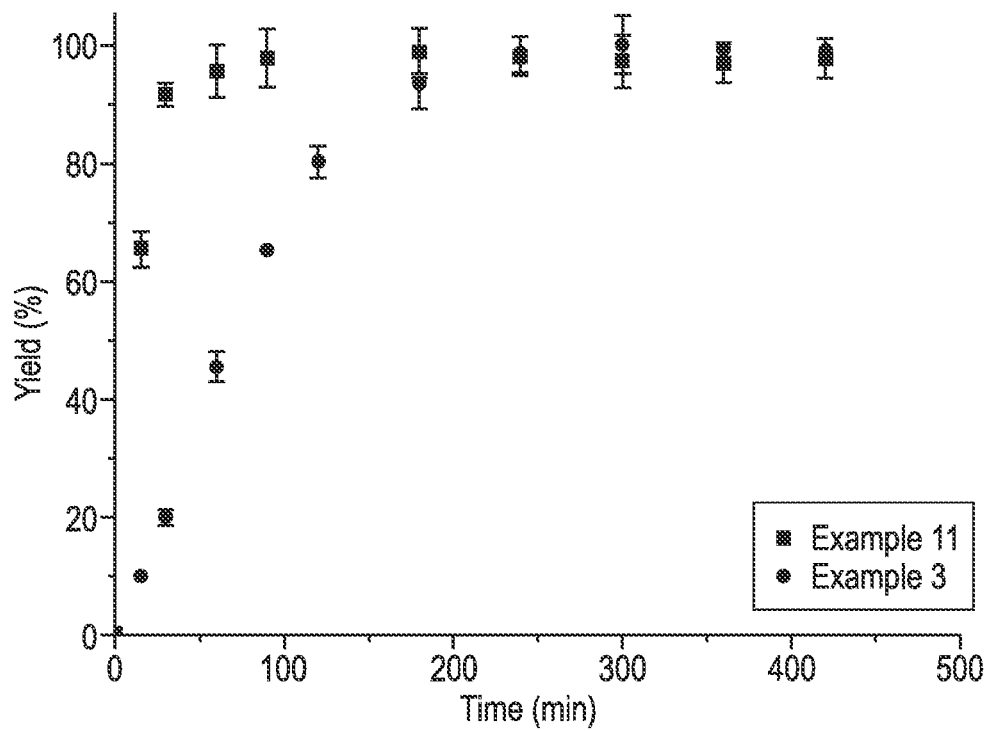

In a similar manner to Example 27 above, a neutral iridium complex (Example 3) and an ionic iridium complex (Example 11) were submitted to the above reaction. The reaction rates are shown in FIG. 9. The ionic iridium complex (Example 11) is significantly more active than the neutral dichloride complex, which in turn is significantly more active than the comparative complex [Cp*IrCl$_2$]$_2$, see FIGS. 1 and 2.

Example 29: Iridium Complex—Solvent Tolerance

Figure 10:
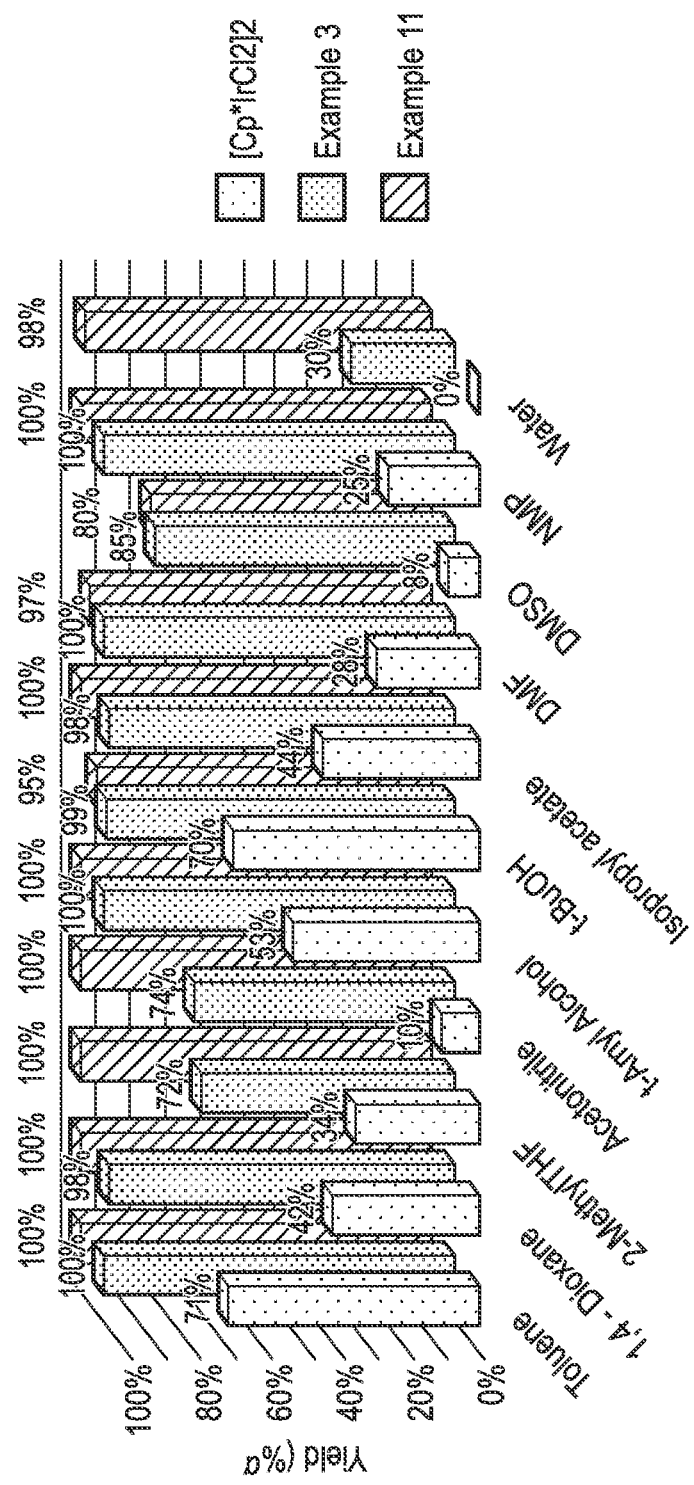
FIG. 10 is a bar chart showing the yields for iridium complexes of the invention and a comparative iridium complex in a range of solvents.

As in Example 14, the ionic complex of Example 11 was tested in a range of solvents. The final yield for reactions with the ionic complex after 24 hours are shown in FIG. 10 with a comparison to the results shown in FIG. 4 and Example 14. The ionic complex shows solvent compatibility at least as broad as the dichloride complex, and is usually more active.

Example 30: Temperature Performance of Iridium Catalyst

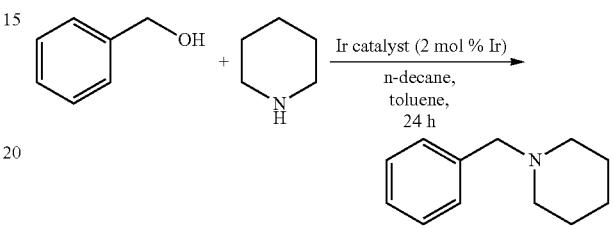

Figure 11A:
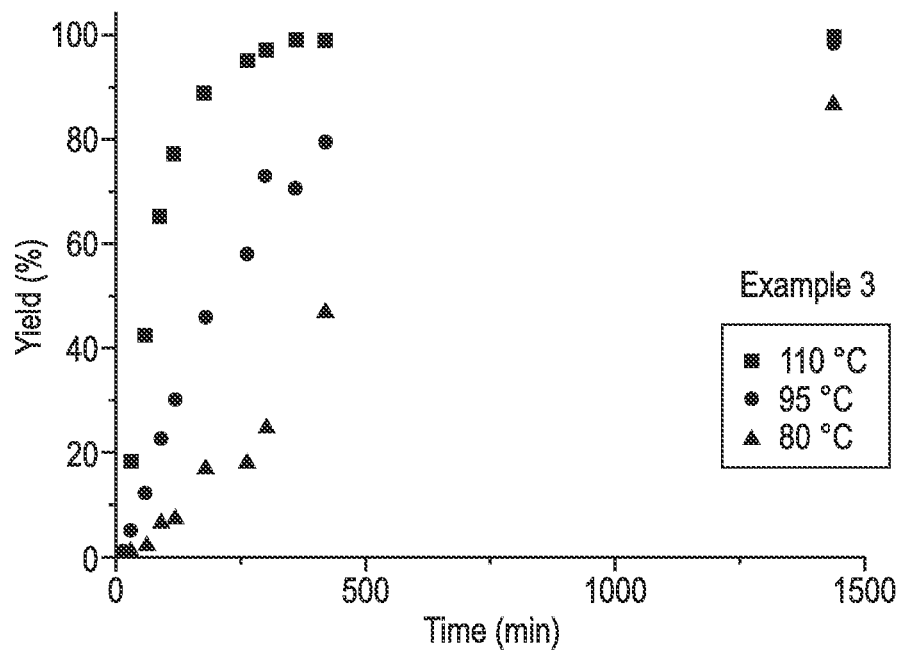
FIGS. 11a-c are graphs showing the temperature dependence of iridium complexes.
Figure 11B:
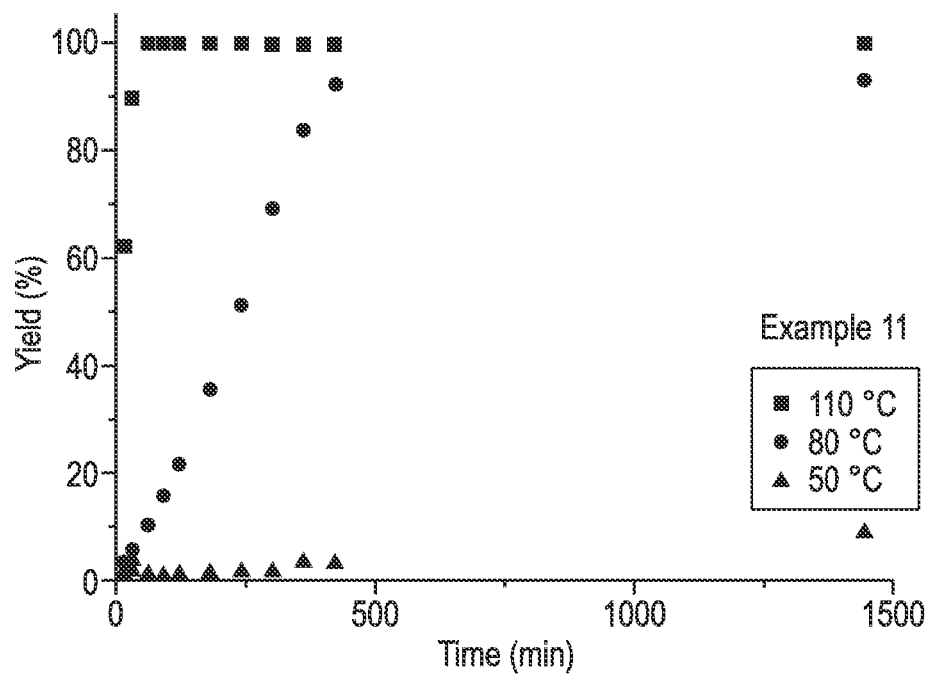
Figure 11C:
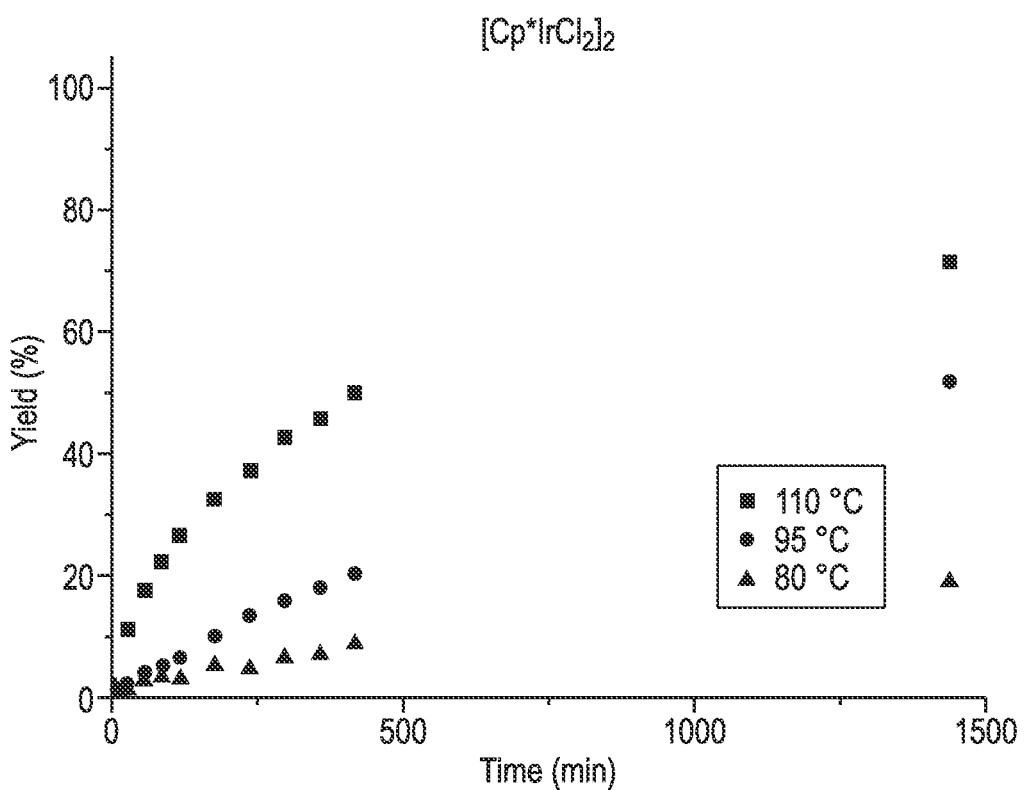

Iridium catalyst of Example 3, ionic complex of Example 11, and a comparative complex, [Cp*IrCl$_2$]$_2$, were subjected to the above reaction over a range of different temperatures. The resulting reaction rates are shown in FIGS. 11a (Example 3), 11b (Example 11) and 11c (comparative complex). The complex of Example 3 appears to be less sensitive to reaction at lower temperatures than the comparative complex, [Cp*IrCl$_2$]$_2$. The ionic complex (Example 11) shows good activity down to 80° C. with better activity at 80° C. than the comparative complex at 110° C.

Example 31 Iridium Complex—Performance at Low Catalyst Loading

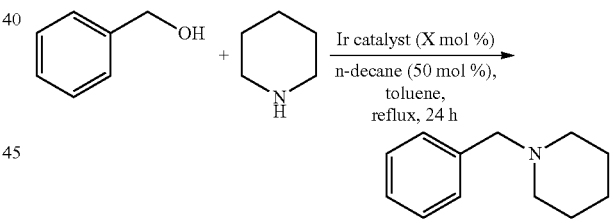

Figure 12:
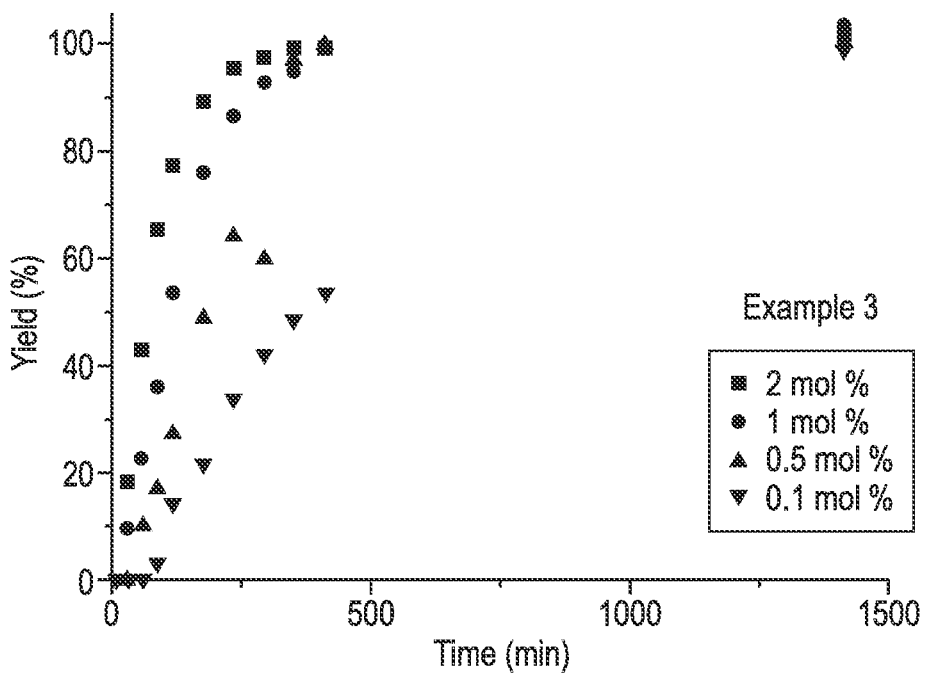
FIGS. 12 and 13 are graphs showing the reaction rate for different iridium complex loadings.
Figure 13:
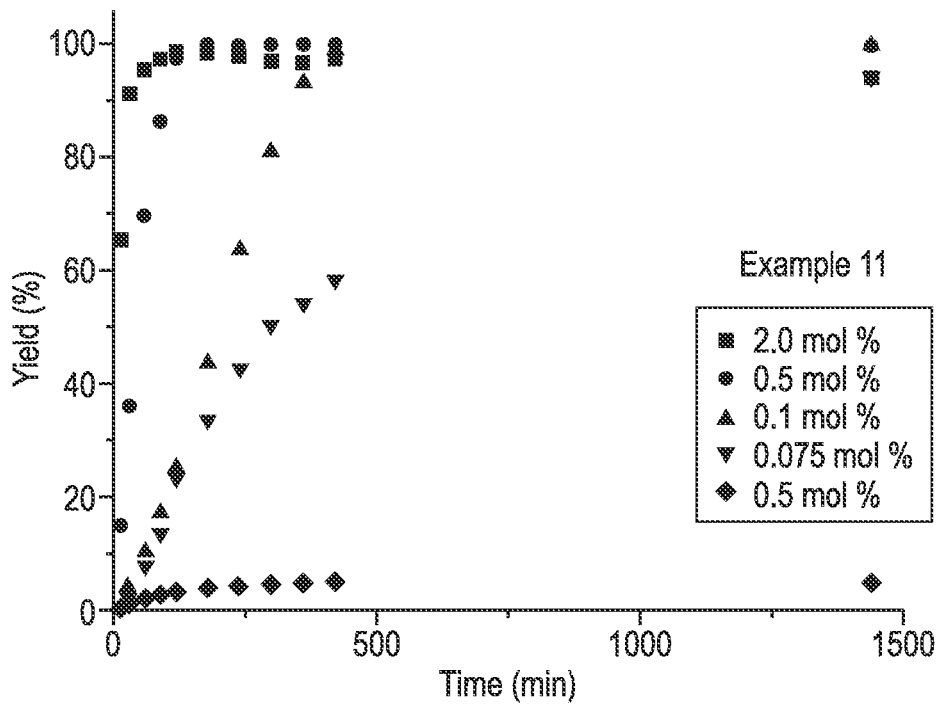

Under the reaction conditions shown above, the metal complexes of Examples 3 and 11 provided excellent (near complete) conversion at 24 h down to a loading of 0.1 mol % Ir and 0.075 mol % Ir, respectively. FIGS. 12 and 13 show the results. In contrast, the comparative complex, [Cp*IrCl$_2$]$_2$ is unable to achieve 100% conversion at 2 mol %, see FIGS. 1 and 2.

Example 32 Effect of n (Linker Length in Tether) on Catalytic Activity

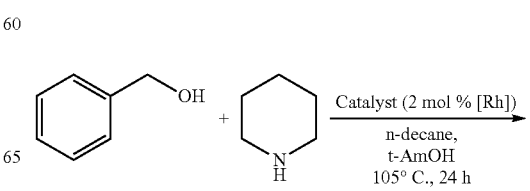

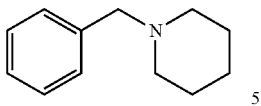

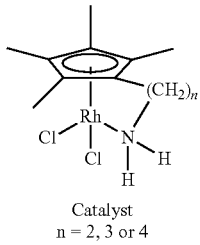

Catalyst
n = 2, 3 or 4

Figure 14:
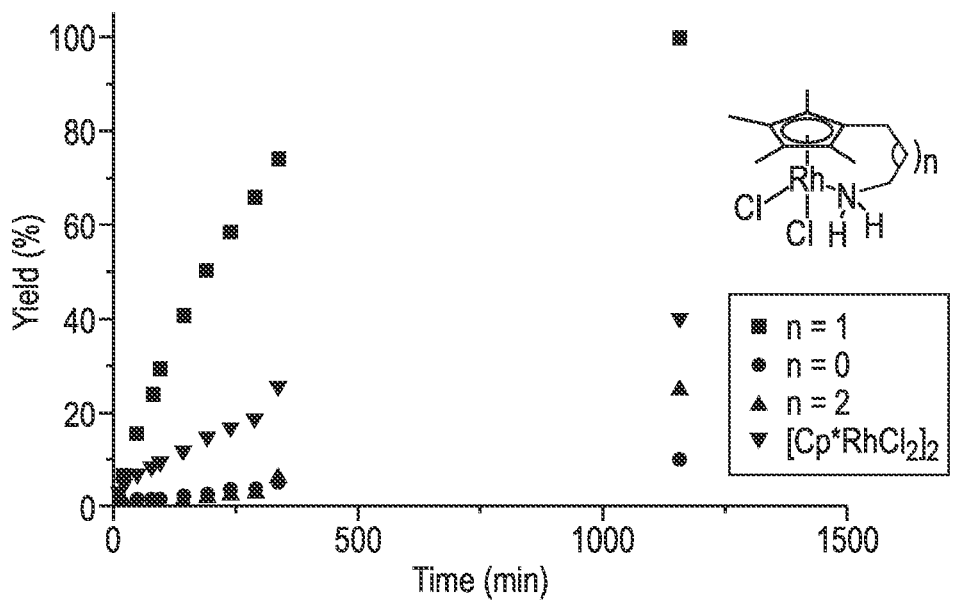
FIG. 14 is a graph showing the effect of chain length on catalytic activity.

The effect of chain length on catalytic activity of rhodium catalysts was investigated. Three catalysts with tethered ligands where the tether were different lengths (n=2, 3 and 4) were tested against a comparative rhodium dimer, [Cp*RhCl$_2$]$_2$. Complexes with a tether carbon chain length of 2, 3 and 4 carbon atoms were tested. The catalytic activity of the complex with three carbon atoms (n=3 (o=1 in FIG. 14)) in the tether chain was significantly better than the catalytic activity of other tested tethered ligands and the comparative dimer. The data is shown in FIG. 14

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:
1. A metal complex of formula (I)

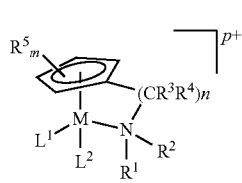

wherein
M is iridium;
L$^1$ and L$^2$ are independently selected from: a halogen, a nitrile, an amine, a phosphine, a phosphite, a sulfonate ester, a N-heterocyclic carbene or a 5 or 6 membered heterocyclic ring or L$^1$ and L$^2$ taken together are a bidentate ligand selected from: a diamine, a diphosphine, a diphosphite, a disulfonate ester, an amino acid or derivative thereof, an amino alcohol, aminosulfonamides, an N-heterocyclic carbene, a diketonate and substituted or unsubstituted bipyridine,
wherein L$^1$ and L$^2$ groups are unsubstituted or optionally substituted by halo, C$_{1-4}$ alkyl, C$_{1-4}$ haloalkyl, —OR$^A$, —NR$^A$R$^B$, —CN, —SO$_2$R$^A$;
R$^1$ is H;
R$^2$ is represented by H, substituted or unsubstituted: C$_{1-14}$ alkyl, C$_{1-14}$ haloalkyl, a C$_{3-8}$ carbocyclic ring, or a 3 to 8 membered heterocyclic ring, or a C$_{1-14}$ alkyl substituted with phenyl, a fluorous tag, or a solid support;
R$^3$ and R$^4$ are each independently selected from: H, halo, C$_{1-6}$ alkyl, C$_{1-6}$ haloalkyl, C$_{3-6}$ cycloalkyl, phenyl, a 5 or 6 membered heteroaryl ring and —OR$^{A1}$;
or R$^3$ and R$^4$ along with the shared, adjacent or non-adjacent carbon atoms to which they are attached together form a 3 to 8 membered carbocyclic ring,
or R$^2$ and one of R$^3$ and R$^4$, together with the atoms to which they are attached, form a 3 to 8 membered heterocyclic ring;
R$^5$ is selected from halo, C$_{1-6}$ alkyl, C$_{1-6}$ haloalkyl and C$_{3-6}$ cycloalkyl, C$_6$ aryl or 5 or 6 membered heteroaryl or two adjacent R$^5$ groups, together with the atoms to which they are attached, form a 5 or 6 membered carbocyclic ring;
p is 0 or 1 or more;
n is selected from 1 to 10;
m is selected from 0, 1, 2, 3 or 4; and
R$^A$, R$^B$ and R$^{A1}$ are at each occurrence independently selected from: H, C$_{1-6}$ alkyl or C$_{1-6}$ haloalkyl.
2. The metal complex of claim 1, wherein R$^3$ and R$^4$ are each independently selected from: H, halo, C$_{1-6}$alkyl, C$_{1-6}$haloalkyl, C$_{3-6}$ cycloalkyl, phenyl, or a 5 or 6 membered heteroaryl ring and —OR$^{A1}$;
or R$^3$ and R$^4$ along with the shared, adjacent or non-adjacent carbon atoms to which they are attached together form a 5 or 6 membered carbocyclic ring.
3. The metal complex of claim 1, wherein p is 0.
4. The metal complex of claim 1, wherein R$^5$ is C$_{1-6}$ alkyl.
5. The metal complex of claim 1, wherein m is 0 or 4.
6. The metal complex of claim 1 wherein
L$^1$ and L$^2$ are independently is a halogen, a nitrile, an amine, a phosphine or a 5 or 6 membered heterocyclic ring or
L$^1$ and L$^2$ taken together are a bidentate ligand selected from the group consisting of a diamine, a diphosphine, and substituted or unsubstituted bipyridine, wherein $L^1$ and $L^2$ groups are unsubstituted or optionally substituted by halo, $C_{1-4}$ alkyl, $C_{1-4}$ haloalkyl, $-OR^A$, $-NR^AR^B$, $-CN$, or $-SO_2R^A$.

7. The metal complex of claim 1 wherein $L^1$ and $L^2$ are independently halo, $C_{1-10}$ alkylnitriles, or a 5 or 6 membered heteroaryl ring or
$L^1$ and $L^2$ taken together are bipyridine or $C_{1-10}$ alkyldiphosphine.

8. The metal complex of claim 1, wherein $R^2$ is independently H, methyl, ethyl, phenyl, benzyl, iso-propyl, tert-butyl, a fluorous tag, a solid support or $R^2$ and one of $R^3$ and $R^4$ together with the atoms to which they are attached form a 5 or 6 membered heterocyclic ring.

9. The metal complex of claim 1 wherein n is 2, 3 or 4.

10. A catalytic hydrogen autotransfer process comprising adding the metal complex of claim 1 to a reaction mixture.

11. A metal complex may be a compound according to formula (II):

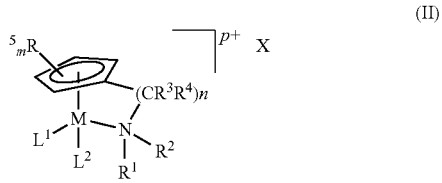

wherein X is 1, 2 or 3 anion molecules
and
M is iridium;
$L^1$ and $L^2$ are independently selected from: a halogen, a nitrile, an amine, a phosphine, a phosphite, a sulfonate ester, a N-heterocyclic carbene or a 5 or 6 membered heterocyclic ring or $L^1$ and $L^2$ taken together are a bidentate ligand selected from: a diamine, a diphosphine, a diphosphite, a disulfonate ester, an amino acid or derivative thereof, an amino alcohol, aminosulfonamides, an N-heterocyclic carbene, a diketonate and substituted or unsubstituted bipyridine,
wherein $L^1$ and $L^2$ groups are unsubstituted or optionally substituted by halo, $C_{1-4}$ alkyl, $C_{1-4}$ haloalkyl, $-OR^A$, $-NR^AR^B$, $-CN$, $-SO_2R^A$;
$R^1$ is H
$R^2$ is represented by H, substituted or unsubstituted: $C_{1-14}$ alkyl, $C_{1-14}$ haloalkyl, $C_{3-8}$ carbocyclic ring, or a 3 to 8 membered heterocyclic ring, or a $C_{1-14}$ alkyl substituted with phenyl, a fluorous tag, or a solid support;
$R^3$ and $R^4$ are each independently selected from: H, halo, $C_{1-6}$ alkyl, $C_{1-6}$ haloalkyl, $C_{3-6}$ cycloalkyl, phenyl, a 5 or 6 membered heteroaryl ring and $-OR^{A1}$;
or $R^3$ and $R^4$ along with the shared, adjacent or non-adjacent carbon atoms to which they are attached together form a 3 to 8 membered carbocyclic ring,
or $R^2$ and one of $R^3$ and $R^4$, together with the atoms to which they are attached, form a 3 to 8 membered heterocyclic ring;
$R^5$ is selected from halo, $C_{1-6}$ alkyl, $C_{1-6}$ haloalkyl and $C_{3-6}$ cycloalkyl, $C_6$ aryl or 5 or 6 membered heteroaryl or two adjacent R groups, together with the atoms to which they are attached, form a 5 or 6 membered carbocyclic ring;
p is 1 or more;
n is selected from 1 to 10;
m is selected from 0, 1, 2, 3 or 4; and $R^A$, $R^B$ and $R^{A1}$ are at each occurrence independently selected from: H, $C_{1-6}$ alkyl or $C_{1-6}$ haloalkyl.

12. The metal complex of claim 11, wherein $R^3$ and $R^4$ are each independently selected from: H, halo, $C_{1-6}$ alkyl, $C_{1-6}$ haloalkyl, $C_{3-6}$ cycloalkyl, phenyl, or a 5 or 6 membered heteroaryl ring and $-OR^{A1}$;
or $R^3$ and $R^4$ along with the shared, adjacent or non-adjacent carbon atoms to which they are attached together form a 5 or 6 membered carbocyclic ring.

13. The metal complex of claim 11, wherein X is a monoanionic, dianionic or trianionic molecule.

14. The metal complex of claim 11, wherein p is 2.

15. The metal complex of claim 11, wherein X is a hydroxide, fluoride, chloride, bromide, iodide, acetate, formate, fluorate, fluorite, bromate, bromite, iodate, iodite, chlorate, chlorite, hydrogen carbonate, hypofluorite, hypochlorite, hypobromite, hypoiodite, perfluorate, perchlorate, perbromate, periodate, chromate, cyanate, cyanide, dihydrogen phosphate, dihydrogen phosphite, nitrate, hydrogen oxalate, hydrogen sulfate, hydrogen sulfite, permanganate, nitrite, thiocyanate, hydride, hexafluorophosphate, hexafluoroantiminate, tetrafluoroborate, peroxide, $[B[3,5-(CF_3)_2C_6H_3]_4]^-$, $B(C_6F_5)_4^-$, $Al(OC(CF_3)_3)_4^-$, sulfate, sulfite, sulfide, persulfate, thiosulfate, hyposulfite, hydrogen phosphate, hydrogen phosphite, metasilicate, carbonate, percarbonate, oxalate, benzoate, tartrate, borate, boride, citrate, hypophosphite, nitride, phosphate, phosphide, or phosphite.

16. A metal complex of claim 11, wherein the compound is

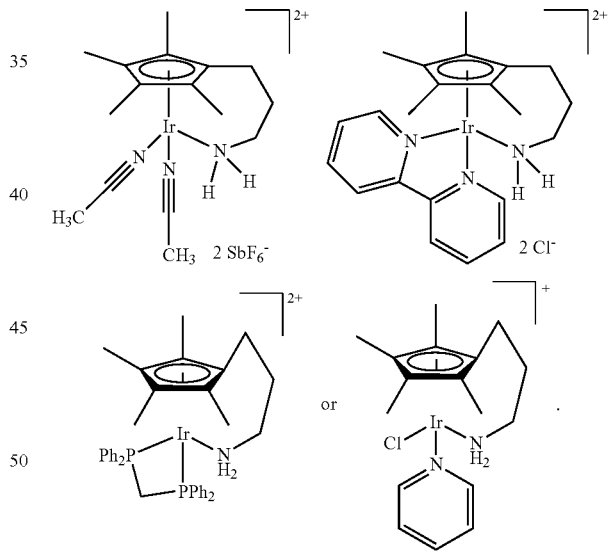

17. A metal complex wherein the complex is

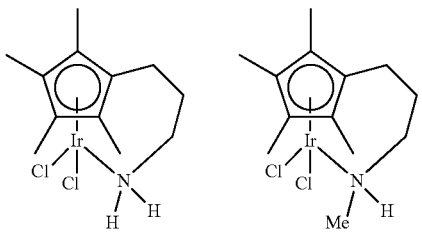

-continued
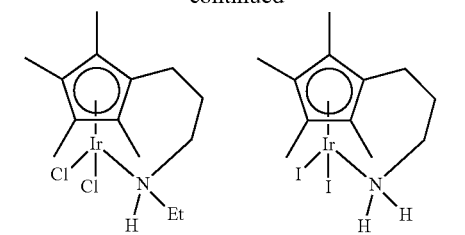
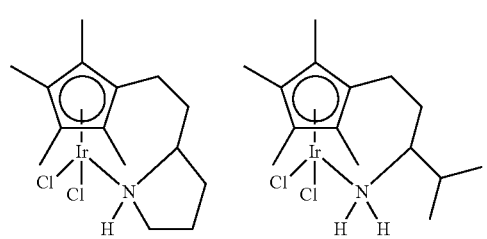
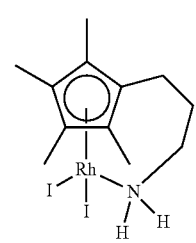
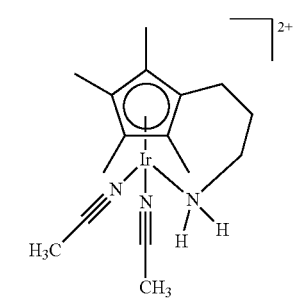
-continued
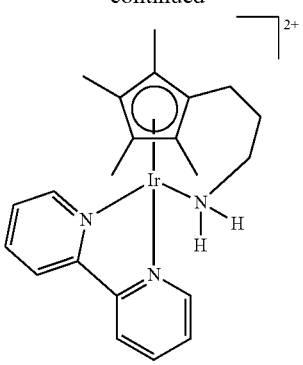
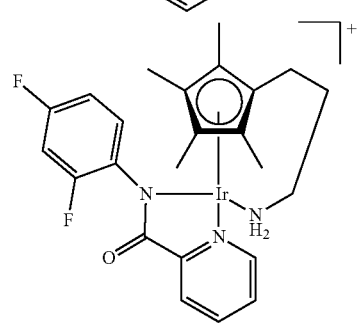
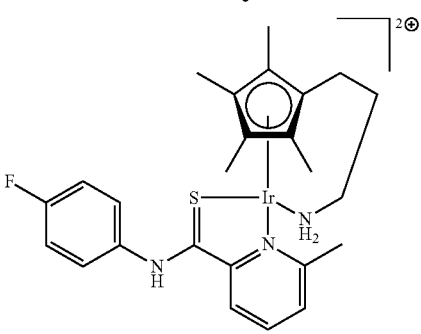
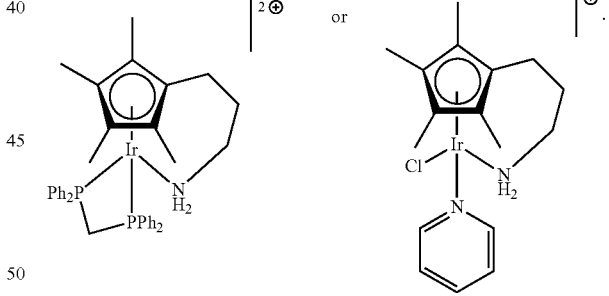
* * * * *